US012754709B2

(12) United States Patent
Baker et al.

(10) Patent No.: US 12,754,709 B2
(45) Date of Patent: Oct. 6, 2026

(54) USER INPUT ROUTING SYSTEMS AND RELATED METHODS

(71) Applicant: Promethean Limited, Blackburn (GB)

(72) Inventors: James E. Baker, Denver, CO (US); Andrew Edwardson, Whalley (GB); Paul Wareing, Catterall (GB)

(73) Assignee: Promethean Limited, Blackburn (GB)

( * ) Notice: Subject to any disclaimer, the term of this patent is extended or adjusted under 35 U.S.C. 154(b) by 505 days.

(21) Appl. No.: 17/840,389

(22) Filed: Jun. 14, 2022

(65) Prior Publication Data

US 2022/0382407 A1 Dec. 1, 2022

Related U.S. Application Data

(63) Continuation-in-part of application No. 16/253,135, filed on Jan. 21, 2019, now abandoned.

(51) Int. Cl.
*G06F 3/14* (2006.01)
*G06F 9/451* (2018.01)
*G09G 5/14* (2006.01)

(52) U.S. Cl.
CPC ............ *G06F 3/1454* (2013.01); *G06F 9/452* (2018.02); *G06F 2203/0383* (2013.01); *G09G 5/14* (2013.01)

(58) Field of Classification Search
CPC ................... G06F 3/1454; G06F 9/452; G06F 2203/0383; G09G 5/14
See application file for complete search history.

(56) References Cited

U.S. PATENT DOCUMENTS

| | | | | |
|---|---|---|---|---|
| 5,276,883 | A | 1/1994 | Halliwell | |
| 5,731,801 | A * | 3/1998 | Fukuzaki | G06F 3/0488 715/842 |

(Continued)

FOREIGN PATENT DOCUMENTS

| | | | |
|---|---|---|---|
| CN | 101950243 | A | 1/2011 |
| CN | 102257424 | | 11/2011 |

(Continued)

OTHER PUBLICATIONS

Final Office Action, dated Dec. 14, 2021, from corresponding U.S. Appl. No. 16/253,135.

(Continued)

*Primary Examiner* — Justin R. Blaufeld
(74) *Attorney, Agent, or Firm* — Thomas | Horstemeyer, LLP

(57) ABSTRACT

An interactive display system, according to particular embodiments, comprises: (1) one or more interactive display devices, which may, for example, include any suitable interactive display device; and (2) one or more connected computing devices operatively coupled to the one or more interactive display devices (e.g., via any suitable wireless and/or wired connection). In some embodiments, the one or more interactive display devices are configured to display data (e.g., video data, image data, etc.) from the one or more connected computing devices on at least a portion of a display screen of the one or more interactive display devices. In particular embodiments, the one or more interactive display devices are configured to pass one or more inputs received at the one or more interactive display devices to the one or more connected computing devices.

8 Claims, 33 Drawing Sheets

(56) References Cited

U.S. PATENT DOCUMENTS

| | | | | |
|---|---|---|---|---|
| 6,142,910 | A * | 11/2000 | Heuvelman | A63B 24/00 482/4 |
| 7,136,745 | B2 | 11/2006 | Tanaka et al. | |
| 8,300,023 | B2 | 10/2012 | Forutanpour et al. | |
| 8,591,039 | B2 | 11/2013 | Morrison et al. | |
| 8,659,658 | B2 | 2/2014 | Vassigh et al. | |
| 8,717,198 | B2 | 5/2014 | Choi et al. | |
| 8,799,994 | B2 | 8/2014 | Barton et al. | |
| 8,866,701 | B2 | 10/2014 | Momchilov et al. | |
| 8,924,970 | B2 | 12/2014 | Newell | |
| 8,982,072 | B2 | 3/2015 | Sim et al. | |
| 9,060,006 | B2 | 6/2015 | Yusupov et al. | |
| 9,210,213 | B2 | 12/2015 | Momchilov et al. | |
| 9,230,386 | B2 | 1/2016 | Roh et al. | |
| 9,268,405 | B2 | 2/2016 | Bailey et al. | |
| 9,268,466 | B2 | 2/2016 | Momchilov et al. | |
| 9,268,482 | B2 | 2/2016 | Wei et al. | |
| 9,317,240 | B2 | 4/2016 | Lee et al. | |
| 9,414,201 | B2 | 8/2016 | Choi et al. | |
| 9,542,087 | B2 | 1/2017 | Arai | |
| 9,588,637 | B2 | 3/2017 | Momchilov et al. | |
| 9,740,507 | B2 | 8/2017 | Pinto Gus et al. | |
| 9,746,919 | B2 * | 8/2017 | Seta | G06F 3/013 |
| 10,182,103 | B2 | 1/2019 | Koushik et al. | |
| 10,244,056 | B2 | 3/2019 | Pahlavan et al. | |
| 10,437,432 | B2 | 10/2019 | Arnaudov et al. | |
| 2004/0205492 | A1 * | 10/2004 | Newsome | G06F 16/9562 715/255 |
| 2006/0290680 | A1 * | 12/2006 | Tanaka | H04N 1/32539 345/173 |
| 2008/0093536 | A1 * | 4/2008 | Brower | G06F 3/0421 250/221 |
| 2009/0300510 | A1 * | 12/2009 | Gantman | H04L 67/08 715/740 |
| 2009/0313125 | A1 * | 12/2009 | Roh | G07F 9/02 345/173 |
| 2010/0070842 | A1 * | 3/2010 | Aymeloglu | G06F 40/197 715/255 |
| 2010/0188342 | A1 | 7/2010 | Dunn | |
| 2010/0259561 | A1 * | 10/2010 | Forutanpour | G06F 3/0238 345/173 |
| 2010/0295973 | A1 * | 11/2010 | Aubuchon | G02B 27/0075 348/241 |
| 2011/0138295 | A1 * | 6/2011 | Momchilov | G06F 9/452 715/740 |
| 2011/0148926 | A1 * | 6/2011 | Koo | H04N 21/4316 345/157 |
| 2011/0193939 | A1 * | 8/2011 | Vassigh | G06F 3/011 348/169 |
| 2012/0054671 | A1 * | 3/2012 | Thompson | G06F 3/04883 715/863 |
| 2012/0102549 | A1 * | 4/2012 | Mazzaferri | H04L 63/10 726/4 |
| 2012/0113151 | A1 * | 5/2012 | Nakano | G06F 3/005 345/682 |
| 2012/0144286 | A1 * | 6/2012 | Bank | G06F 3/0308 715/230 |
| 2012/0229411 | A1 * | 9/2012 | Arai | G06F 3/04817 345/173 |
| 2012/0306748 | A1 * | 12/2012 | Fleizach | G06F 3/0485 345/161 |
| 2013/0067331 | A1 * | 3/2013 | Glazer | H04L 65/70 715/719 |
| 2013/0219365 | A1 * | 8/2013 | Rago | H04L 63/10 717/125 |
| 2013/0285933 | A1 * | 10/2013 | Sim | G06F 3/04883 345/173 |
| 2013/0328779 | A1 * | 12/2013 | Butner | G06F 3/033 345/157 |
| 2013/0339908 | A1 * | 12/2013 | Bailey | G06F 3/0484 715/863 |
| 2014/0026057 | A1 | 1/2014 | Kimpton et al. | |
| 2014/0109022 | A1 * | 4/2014 | Wei | G06T 3/40 715/863 |
| 2014/0204063 | A1 | 7/2014 | Kaida | |
| 2015/0128017 | A1 * | 5/2015 | Fithian | G06F 40/134 715/205 |
| 2015/0160752 | A1 * | 6/2015 | Butner | G06F 3/0227 345/157 |
| 2015/0169051 | A1 * | 6/2015 | Seta | G06F 3/011 345/156 |
| 2015/0220242 | A1 * | 8/2015 | Guest | G06F 3/0354 715/740 |
| 2015/0278534 | A1 * | 10/2015 | Thiyagarajan | G06F 21/84 726/28 |
| 2015/0350286 | A1 * | 12/2015 | Dawson | G06F 21/34 715/719 |
| 2015/0381714 | A1 | 12/2015 | Hawkins | |
| 2016/0006800 | A1 | 1/2016 | Summers et al. | |
| 2016/0006803 | A1 | 1/2016 | Kumar | |
| 2016/0070466 | A1 * | 3/2016 | Chaudhri | H04M 1/724 715/765 |
| 2016/0189340 | A1 | 6/2016 | Cudak et al. | |
| 2016/0248838 | A1 | 8/2016 | Abiezzi et al. | |
| 2016/0291747 | A1 * | 10/2016 | Fischer | G06F 3/1446 |
| 2016/0342313 | A1 * | 11/2016 | Gross | G06F 3/04845 |
| 2017/0123649 | A1 * | 5/2017 | Clavel | G06F 3/0485 |
| 2017/0131863 | A1 | 5/2017 | Wheeler et al. | |
| 2017/0269771 | A1 * | 9/2017 | Nam | G06F 3/04886 |
| 2018/0146233 | A1 | 5/2018 | Satheesh et al. | |
| 2020/0104040 | A1 * | 4/2020 | Morris | G06F 3/04883 |
| 2021/0011622 | A1 * | 1/2021 | Bender | G06F 3/0482 |
| 2021/0219118 | A1 * | 7/2021 | Chen | H04N 21/4436 |
| 2022/0222029 | A1 * | 7/2022 | Morris | G06F 40/166 |
| 2022/0391158 | A1 * | 12/2022 | Lemmens | G06F 3/0486 |
| 2023/0161542 | A1 * | 5/2023 | Lee | G06F 3/1454 345/2.2 |
| 2023/0376131 | A1 * | 11/2023 | Zeung | G06F 3/038 |

FOREIGN PATENT DOCUMENTS

| | | | | |
|---|---|---|---|---|
| CN | 103229156 | | | 7/2013 |
| CN | 103294339 | | | 9/2013 |
| CN | 104765565 | A | | 7/2015 |
| CN | 105739876 | | | 7/2016 |
| CN | 107037873 | | | 8/2017 |
| CN | 108463784 | | | 8/2018 |
| EP | 2629193 | | | 8/2014 |
| JP | 08006705 | | | 1/1996 |
| JP | 2000089884 | | | 3/2000 |
| JP | 2000089884 | A | * | 3/2000 |
| JP | 2001117684 | | | 4/2001 |
| JP | 2001117684 | A | * | 4/2001 |
| KR | 20160069909 | | | 6/2016 |

OTHER PUBLICATIONS

Final Office Action, dated Jan. 16, 2020, from corresponding U.S. Appl. No. 16/253,135.

Final Office Action, dated Jan. 3, 2020, from corresponding U.S. Appl. No. 16/253,136.

International Search Report, dated Apr. 14, 2020, from corresponding International Application No. PCT/US2020/014394.

International Search Report, dated Jun. 9, 2020, from corresponding International Application No. PCT/US2020/014392.

Notice of Allowance, dated Jul. 29, 2020, from corresponding U.S. Appl. No. 16/253,136.

Office Action, dated Aug. 12, 2020, from corresponding U.S. Appl. No. 16/253,135.

Office Action, dated Jul. 8, 2019, from corresponding U.S. Appl. No. 16/253,135.

Office Action, dated Jul. 9, 2019, from corresponding U.S. Appl. No. 16/253,136.

Realvnc, Narkive.com, Archive of vnc-list@realvnc.com posting entitled "remote desktop open multiple times in nest windows," https://vnc-list.realvnc.narkive.com/4xjmgU3d/remote-desktop-open-multiple-times-in-nested-windows, Aug. 20, 2004.

(56) References Cited

OTHER PUBLICATIONS

Restriction Requirement, dated Apr. 1, 2019, from corresponding U.S. Appl. No. 16/253,135.
Restriction Requirement, dated Apr. 1, 2019, from corresponding U.S. Appl. No. 16/253,136.
Written Opinion of the International Searching Authority, dated Apr. 14, 2020, from corresponding International Application No. PCT/US2020/014394.
Written Opinion of the International Searching Authority, dated Jun. 9, 2020, from corresponding International Application No. PCT/US2020/014392.

* cited by examiner

USER INPUT ROUTING SYSTEMS AND RELATED METHODS

CROSS-REFERENCE TO RELATED APPLICATIONS

This application is a continuation-in-part of U.S. patent application Ser. No. 16/253,135, filed Jan. 21, 2019, entitled "Connected Computing Device Software Integration Systems and Methods," the disclosure of which is hereby incorporated herein by reference in its entirety.

BACKGROUND

Using an interactive display or other display device can be cumbersome, particularly when using multiple connected devices through a single display. Additionally, using a particularly large display screen for demonstration and/or teaching purposes can lead to physical fatigue as a result of the size of the display screen. Accordingly, there is a need for systems and methods that address these difficulties in addition to other deficiencies found in prior art systems.

SUMMARY

An interactive display system, according to various embodiments, comprises: (1) a display device having at least one display processor and a display screen; (2) one or more connected computing devices operatively connected to the display device, each of the one or more connected computing devices having a respective connected computing device processor; and (3) a user interface running on the display device configured to display a listing of software applications available on each of the one or more connected computing devices. In some embodiments, the at least one display processor is configured for: (1) receiving the listing of software applications available on each of the one or more connected computing devices; (2) displaying the listing of software applications on the display device; (3) receiving, via an input provided to the display device, a selection of a particular software application from the listing of software applications; (4) in response to receiving the selection of the particular software application: (A) identifying a particular connected computing device associated with the particular software application; (B) causing the particular connected computing device to run the particular software application; and (C) displaying the particular software application on at least a portion of the display screen while the particular software application is running on the connected computing device.

In some embodiments, the at least one display processor is further configured for: (A) receiving, on the interactive touch screen display input, a touch input at a first location; (B) determining, based at least in part on the first location, a final destination for the touch input; (C) in response to determining that the final destination is the interactive touch screen display device, processing the touch input; and (D) in response to determining that the final destination is the particular connected computing device, routing the touch input from the interactive touch screen display device to the particular connected computing device via the interactive touch screen display input for processing by respective connected computing device processor.

A computer-implemented data processing method for providing a unified listing of software applications available on a connected computing device operatively connected to a first computing device, in various embodiments, includes: (1) a connected computing device that comprises a connected computing device processor; and (2) a first computing device comprising a first computing device processor and a display screen. In various embodiments, the method comprises: (1) receiving, by the first computing device processor, a listing of one or more software applications available on the connected computing device; (2) displaying, by the first computing device processor, the listing of the one or more software applications on the display screen; (3) receiving, by the first computing device processor, a selection of a first software application of the one or more software applications; (4) causing, by the first computing device processor, the connected computing device processor to open the first software application on the connected computing device; and (5 causing, by the first computing device processor, at least a portion of the display screen to display the first software application while the first software application is open on the connected computing device.

In some embodiments, the method further comprises: (1) providing a first software compilation application for installation on the first computing device; (2) providing a second software application compilation application for installation on the connected computing device; and (3) transmitting the listing of one or more software applications available on the connected computing device from the second software compilation application to the first software compilation application. In still other embodiments, the method further comprises: (1) receiving, from a remote computing device, a request to cast a display of the remote computing device to at least a portion of the display screen; and (2) in response to receiving the request to cast the display of the remote computing device to at least a portion of the display screen, causing, by the first computing device processor, at least a portion of the display screen to cast the display of the remote computing device.

In some embodiments, a computer-implemented data processing method for providing a unified listing of software applications available on a plurality of connected computing devices operatively connected to an interactive touch screen display device comprises: (1) receiving, by the one or more processors, a listing of one or more first software applications available on the first connected computing device; (2) receiving, by the one or more processors, a listing of one or more second software applications available on the second connected computing device; (3) aggregating, by the one or more processors, the listing of one or more first software applications and the listing of one or more second software applications into a listing of aggregated available software applications; (4) displaying, by the one or more processors, the listing of aggregated available software applications on the touch-input display screen; (5) receiving, by the one or more processors, a selection of a particular software application from the aggregated available software applications; (6) determining, by the one or more processors, on which of the plurality of connected computing devices the particular software application is available; (7) in response to determining that the particular software application is available on the first connected computing device, causing, by the one or more processors, the first connected computing device to open the particular software application on the first connected computing device; and (8) in response to determining that the particular software application is available on the first connected computing device, causing, by the first computing device processor, at least a portion of the touch-input display screen to display the particular software application while the particular software application is open on the first connected computing device.

In various embodiments, the interactive touch screen display device is a first interactive touch screen display device disposed in a first room of a building, the first interactive touch screen display device comprising a first microphone; and the method further comprises providing a second interactive touch screen display device comprising one or more processors, the second interactive touch screen display device being disposed in a second room of the building and comprising a second microphone. In still other embodiments, the method further comprises: (1) using, by the one or more processors, the first microphone and the second microphone to monitor for a first audio cue; (2) receiving the first audio cue at the first interactive touch screen display device via the first microphone; (3) receiving the first audio cue at the second interactive touch screen display device via the second microphone; (4) analyzing, by the one or more processors, the first audio cue at each of the first interactive touch screen display device and the second interactive touch screen display device; (5) determining a location of a source of the first audio cue relative to the first interactive touch screen display device and the second interactive touch screen display device based on the analysis; and storing the location of the source in computer memory.

An interactive display system according to various embodiments comprises a display device having at least one processor and a display screen. In some embodiments, the at least one processor is configured for: (1) receiving one or more pieces of user interface positioning determination data about a user of the display device, the one or more pieces of user interface positioning determination data comprising at least one reference height; (2) determining whether to modify a default position of at least one user interface on the display device based at least in part on the one or more pieces of user interface positioning determination data; (3) in response to determining to modify the default position of the at least one user interface on the display device, modifying a default spawn position of the at least one user interface, wherein modifying the default spawn position comprises modifying the default spawn position to adjust a height of the default spawn position.

In some embodiments, system is further configured for: (1) displaying a plurality of user-selectable indicia to the user on the display screen, the plurality of user-selectable indicia comprising: (A) a first user-selectable indicium at a first height; and (B) a second user-selectable indicium at a second height that is higher than the first height; (2) receiving, via the interactive touch screen display input, a selection of an indicium of the plurality of user-selectable indicia; (3) in response to receiving a selection of the second user-selectable indicium, modifying the default spawn position to raise the height of the default spawn position; and (4) in response to receiving a selection of the first user-selectable indicium, modifying the default spawn position to lower the height of the default spawn position. In some embodiments, the at least one processor is further configured for: (1) receiving a plurality of user inputs via the interactive touch screen display input; (2) analyzing the plurality of user inputs to determine whether more than a threshold number of the user inputs have an input location that is higher than the at least one reference height; and (3) in response to determining that more than the threshold number of the user inputs have an input location that is higher than the at least one reference height, modifying the default spawn position to lower the height of the default spawn position.

A computer-implemented data processing method for modifying a position of at least one user interface on an interactive touch-screen display device, in particular embodiments, comprises: (1) receiving, by one or more processors, one or more pieces of user interface positioning determination data about a user of the interactive touch-screen display device; (2) determining, by one or more processors, a default position of the at least one user interface based at least in part on the one or more pieces of user interface positioning determination data; and (3) displaying, by one or more processors, the at least one user interface on the interactive touch-screen display device based on the determined default position. In particular embodiments, the method further comprises: (1) receiving, by one or more processors, an input on the at least one user interface at a first location on the interactive touch-screen display device, the input triggering a spawn of a second user interface; (2) in response to receiving the input, defining, by one or more processors, a cone of vision based at least in part on the first location; and (3) causing, by one or more processors, a visual indication of the second user interface to spawn at least temporarily within the cone of vision.

In some embodiments the method further comprises: (1) receiving a plurality of user inputs via the interactive touch-screen display device; (2) analyzing the plurality of user inputs to determine whether more than a threshold number of the user inputs have an input location that is higher than a threshold height; and (3) in response to determining that more than the threshold number of the user inputs have an input location that is higher than the threshold height, modifying the default position to lower the height of the default position.

BRIEF DESCRIPTION OF THE DRAWINGS

Various embodiments of an interactive display system are described below. In the course of this description, reference will be made to the accompanying drawings, which are not necessarily drawn to scale, and wherein.

DETAILED DESCRIPTION

Figure 1:
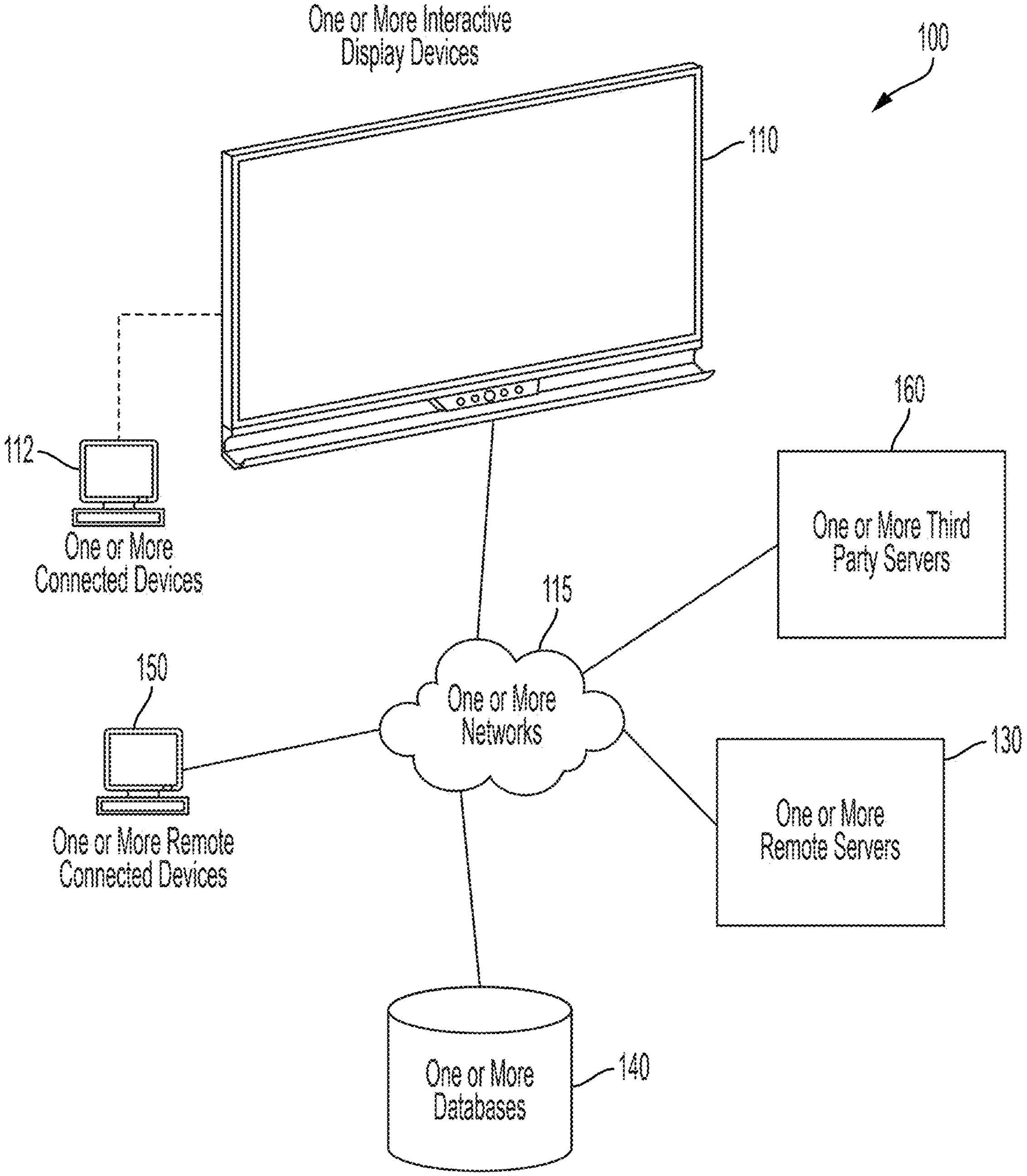
FIG. 1 is a block diagram of an interactive display system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

An interactive display system 100, according to particular embodiments, comprises: (1) one or more interactive display devices 110, which may, for example, include any suitable interactive display device (e.g., such as any suitable Promethean ActivPanel display); and (2) one or more connected computing devices 112 operatively coupled to the one or more interactive display devices 110 (e.g., via any suitable wireless and/or wired connection). In some embodiments, the one or more interactive display devices 110 are configured to display data (e.g., video data, image data, etc.) from the one or more connected computing devices 112 on at least a portion of a display screen of the one or more interactive display devices 110. In particular embodiments, the one or more interactive display devices 110 are configured to pass one or more inputs received at the one or more interactive display devices 110 to the one or more connected computing devices 112.

In particular embodiments, the interactive display system is configured to: (1) process one or more inputs received via one or more input devices (e.g., a touch-screen display) of an interactive display device 110 having one or more connected computing devices 112; (2) determine a final destination of the processed one or more inputs (e.g., by processing the input using a processor of the interactive display device such as a scalar board); and (3) route each respective input to the determined final destination for consumption and/or processing (e.g., by routing each respective input to either the interactive display device or a particular connected computing device of the one or more connected computing devices. As a particular example, the system may be configured to: (1) receive a touch input on an interactive display with a connected computing device (e.g., a Chromebox); (2) process the touch input using the interactive display's processor to determine the final destination of the touch input (e.g., determine whether the final destination of the touch input is the interactive display or the connected computing device; (3) process the touch input as an input on the interactive display in response to determining that the final destination of the touch input is the interactive display; and (4) route the touch input to the connected computing device (e.g., via the input device) for processing at the connected computing device.

In various embodiments, when using a computing device or plurality of connected computing devices (e.g., such as a Chromebox, Apple TV, Microsoft Xbox One; Sony PlayStation, laptop computer, tablet computer, or any other suitable computing device) connected to any suitable display device (e.g., an interactive display device, smart TV, television display, or any other suitable display device), a user may be required to: (1) be aware of which connected computing device has a particular application that the user desires to use: (2) switch an input of the display device to the appropriate connected computing device; and (3) launch the application on the connected computing device.

In some embodiments, the Interactive Display System 100 is configured to aggregate a listing of one or more available applications installed on, running on, or otherwise available on each of the one or more connected devices to a particular computing device (e.g., display device). The system may be further configured to: (1) provide a listing of the aggregated available applications to a user of the particular computing device; (2) receive a selection of a particular application from the aggregated listing of available applications; and (3) automatically cause the particular computing device to display data from the particular application on the particular computing device while the particular application is running on a connected computing device. In various embodiments, from the user's perspective, the selected particular application may appear to be running on the particular computing device (e.g., even though the application is technically running on the connected computing device).

In various embodiments, the interactive display system 100 may be further configured to reduce user fatigue (e.g., as a result of having to reach for different portions of the interactive display, step back to see different portions of the interactive display, crane the user's neck to see different portions of the display, etc.). The system may, for example, be configured to modify and/or adjust one or more user interfaces on the interactive display device based at least in part on one or more user characteristics. The system may, for example, be configured to modify and/or adjust a position, size, etc. of one or more user interfaces based at least in part on the user of the interactive display device. In some embodiments, the system may be further configured to cause user interfaces to pop out based at least in part on a location of an input provided by the user (e.g., such that the system causes the user interface to appear in a location on the display screen such that the user may see the user interface and be able to interact with the user interface substantially without moving (e.g., substantially without having to crane their neck, reposition themselves adjacent the interactive display device, etc.).

In some embodiments, the system may be configured to default user interface features with which a user may interact toward a lower portion of the interactive display, for example, to make the user interface features easier to reach for users. As discussed herein, particular embodiments of an interactive display device may include a particularly large screen which may, for example, have portions of its display that are difficult to reach due to those portions' height relative to a support surface of the user (e.g., the floor).

In particular embodiments, the system is configured to modify and/or adjust user interface positioning, size, etc. based on, for example: (1) user preference data (e.g., which the system may receive and/or determine from a user's profile when the user logs into or otherwise provides such preference data to the interactive display device using any technique described herein); (2) user selection of on screen indicia indicating a preferred location/size for user interfaces; (3) user physical characteristics (e.g., which the system may determine using one or more cameras to identify the user's height, reach, etc.).

In still other embodiments, the system is configured to: (1) track user touches (e.g., inputs) in one or more particular areas of the interactive display device (e.g., one or more areas above a particular height such as shoulder height); (2) automatically modify a default location of one or more user interfaces based at least in part on detecting more than a threshold number of inputs above the particular height. This may, for example, enable the system to reduce user fatigue by modifying user interface positioning (e.g., by lowering the position) to reduce a number of times that a user has to reach above a particular height (e.g., which may reduce injuries, fatigue, etc.).

In any embodiment described herein, the interactive display system is configured to enable a user to login to any particular interactive display in order to apply user-specific settings, preferences, etc. to the particular interactive display, such that the user may walk up to any particular interactive display, log-in, and have the same user experience when using any interactive display. The interactive display may, for example, be configured to: (1) receive user identifying data; (2) optionally authenticate the user (e.g., by requiring the user to enter a password or other unique identifier; (3) in response to receiving the user identifying data and optional authentication data, retrieve user profile data (e.g., from one or more remote servers via a network); (3) apply the user profile data to one or more settings of the interactive display; (4) optionally automatically login to one or more connected computing devices using the user profile data; and/or (5) optionally modify one or more features and/or functionality of the interactive display based at least in part on a role of the logged in user (e.g., whether the user is a teacher, student, administrator, etc.).

In particular embodiments, the interactive display system 100 is configured to provide a plurality of available software applications (e.g., through an app store or similar catalog of available software applications) that includes first party software (e.g., provided by a manufacturer of the interactive display device) as well as approved and/or vetted third party applications for use on the interactive display devices. In particular embodiments, the system is configured to provide an administrator or other authorized user to select particular applications (e.g., and/or content) from the listing of available software applications to make available on one or more interactive display devices for which they are the administrator (e.g., one or more devices within a particular school, school district, etc.). In particular embodiments, the system is configured to generate a curated application store based on the administrator (e.g., or other authorized user) selections that include only those applications selected by the administrator. An individual user of an interactive display that is administrated by the administrator may then select from the curated listing of approved applications for use on a particular interactive display device. In this way, the system may be configured to provide a whitelist of applications from a larger catalog of applications for selection by users (e.g., teachers) in a specific group (e.g., in a specific school, school district, county, city, etc.).

In various embodiments, one or more interactive display devices 110 (e.g., or other computing devices) may be utilized for environmental analysis, with a particular application in the real-time positioning of gun fire in an active shooter scenario. In such embodiments, a plurality of interactive display boards in one or more fixed physical locations, may be configured to performing passive analysis of an audio environment to infer information regarding the environment. In such embodiment's, each of the plurality of interactive display devices may include at least one microphone. By substantially continuously monitoring an audio environment, the plurality of interactive display devices may be configured to: (1) identify at least one audio cue; (2) determine a location of the identified audio cue based on sound data received at one or more of the plurality of interactive display devices; and (3) generate one or more alerts related to the identified audio cue.

Exemplary Technical Platforms

As will be appreciated by one skilled in the relevant field, the present invention may be, for example, embodied as a computer system, a method (e.g., a computer-implemented method, computer-implemented data processing method, etc.), or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium (e.g., a non-transitory computer-readable medium) having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods (e.g., computer-implemented methods), apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of an interactive display system 100 according to particular embodiments. As may be understood from this figure, an interactive display system 100, according to a first embodiment, comprises: (1) one or more interactive display devices 110, which may, for example, include any suitable interactive display device (e.g., such as any suitable Promethean ActivPanel display); and (2) one or more connected computing devices 112 operatively coupled to the one or more interactive display devices 110 (e.g., via any suitable wireless and/or wired connection). In some embodiments, the one or more interactive display devices 110 are configured to display data (e.g., video data, image data, etc.) from the one or more connected computing devices 112 on at least a portion of a display screen of the one or more interactive display devices 110. In particular embodiments, the one or more interactive display devices 110 are configured to pass one or more inputs received at the one or more interactive display devices 110 to the one or more connected computing devices 112.

In various embodiments, the one or more interactive display devices 110 may be operatively coupled (e.g., connected) to the one or more connected computing devices 112 in any suitable manner using any suitable connection type (e.g., wired and/or wireless connection type). For example, in particular embodiments, the one or more interactive display devices 110 may be operatively coupled (e.g., connected) to the one or more connected computing devices 112 via any suitable video cable (e.g., composite video cable(s), s-video cable(s), component video cable(s), VGA cable(s), DVI cable(s), HDMI cable(s), Displayport cable(s), mini-Displayport cable(s), etc.) or combination thereof. In still other embodiments, the one or more interactive display devices 110 may be operatively coupled (e.g., connected) to the one or more connected computing devices 112 via any suitable data cable (e.g., ethernet cable(s), token ring cable(s), coaxial cable(s), optical fiber cable(s), USB cable, etc.) or suitable combination thereof. In still other embodiments, the one or more interactive display devices 110 may be operatively coupled (e.g., connected) to the one or more connected computing devices 112 via any suitable wireless connection (e.g., Bluetooth, WIFI, NFC, low energy Bluetooth, ZigBee, etc.) or combination of wireless connections. In still other embodiments, the one or more interactive display devices 110 may be operatively coupled (e.g., connected) to the one or more connected computing devices 112 via any suitable network discussed herein or any other suitable network. In other embodiments, the one or more interactive display devices 110 may be operatively coupled (e.g., connected) to the one or more connected computing devices 112 via any suitable combination of connection types described herein, or in any other suitable manner.

In various embodiments of an interactive display system 100, the one or more interactive display devices 110 comprises one or more touch screen display devices, which may, for example, comprise any suitable touch screen device configured to receive input via contact on the display device (e.g., via a user's finger or other body part, via a stylus or other pen-like device, etc.). For example, in various embodiments, the one or more interactive display devices 110 comprise one or more resistive touch screen displays (e.g., one or more 5-wire resistive touch screen displays), one or more surface capacitive touch screen displays, one or more projected capacitive touch screen displays, one or more surface acoustic wave touch screen displays, one or more infrared touch screen displays (e.g., which may, for example include one or more touch overlays at least partially embedded in a bezel of the one or more interactive display devices 110), or any other suitable touch screen display. In particular embodiments, the one or more interactive display devices 110 comprise one or more processors and memory. In such embodiments, the one or more interactive display devices 110 may comprise stand-alone computing devices such as handheld computing device (e.g., tablet computers or smartphones), wall mounted display devices (e.g., such as touch-enabled computerized LED and/or LCD displays), etc.

In particular embodiments, the one or more interactive display devices 110 are configured to detect a plurality of simultaneous inputs (e.g., from a plurality of users). In various embodiments, the one or more interactive display devices 110 are configured to enable a user to interact with one or more displayed images as the user would interact with any other computing display device (e.g., by drawing on the one or more projected images), etc. In still other embodiments, the one or more interactive display devices 110 include one or more computing components (e.g., one or more processors and memory) such that the one or more interactive display devices 110 embodies a stand-alone computing device.

In particular embodiments, the one or more interactive display devices 110 are configured to run software locally on the one or more interactive display devices 110. For example, in one embodiment of an interactive display system 100, the one or more interactive display devices 110 may store software applications on local memory associated with the one or more interactive display devices 110, execute software instructions from the interactive overlay software application using one or more local processors associated with the one or more interactive display devices 110, detect inputs locally using any suitable input detection technique for the one or more interactive display devices 110, etc. In particular embodiments, the software applications native to the one or more interactive display devices may include, for example, any suitable software such as: (1) one or more word processing applications; (2) one or more pieces of annotation software; (3) one or more video applications; (4) one or more whiteboard simulating software applications; and/or (5) any other suitable software application.

In particular embodiments, the one or more connected computing devices 112 may include any suitable connected computing device such as, for example, one or more laptop computers, one or more tablet computers, one or more Chromeboxes, one or more Amazon Fire TV devices, one or more Apple TV devices, one or more gaming systems (e.g., one or more Microsoft, Sony, Nintendo, etc. gaming systems), or any other suitable computing and/or video playing device, which may, for example, have one or more pieces of software installed thereon.

In various other embodiments, an interactive display system 100 may utilize one or more suitable cloud computing techniques in order to execute overlay software, underlying software, store and access one or more documents, etc. In such embodiments, one or more computer networks 115 may facilitate communication between the one or more interactive display devices 110, one or more remote servers 130, one or more databases 140, one or more remote computing devices 150, one or more third party servers 160, etc. For example, the one or more networks 115 may facilitate communication between the one or more interactive display devices 110 and the one or more remote servers 130 in order to access profile data for a user of the one or more interactive display devices 110 in order to customize the user's experience while using the one or more interactive display devices 110.

The one or more networks 115 may further facilitate access between the one or more interactive display devices 110 and a suitable document stored in one or more remote database 140 (e.g., stored in one or more remote databases managed by a third-party cloud-based storage service such as Google Drive, Dropbox, or any other suitable service). The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between the one or more interactive display devices 110, the one or more databases 140, and the one or more remote servers 130 may be, for example, implemented via a Local Area Network (LAN) or via the Internet.

Figure 2:
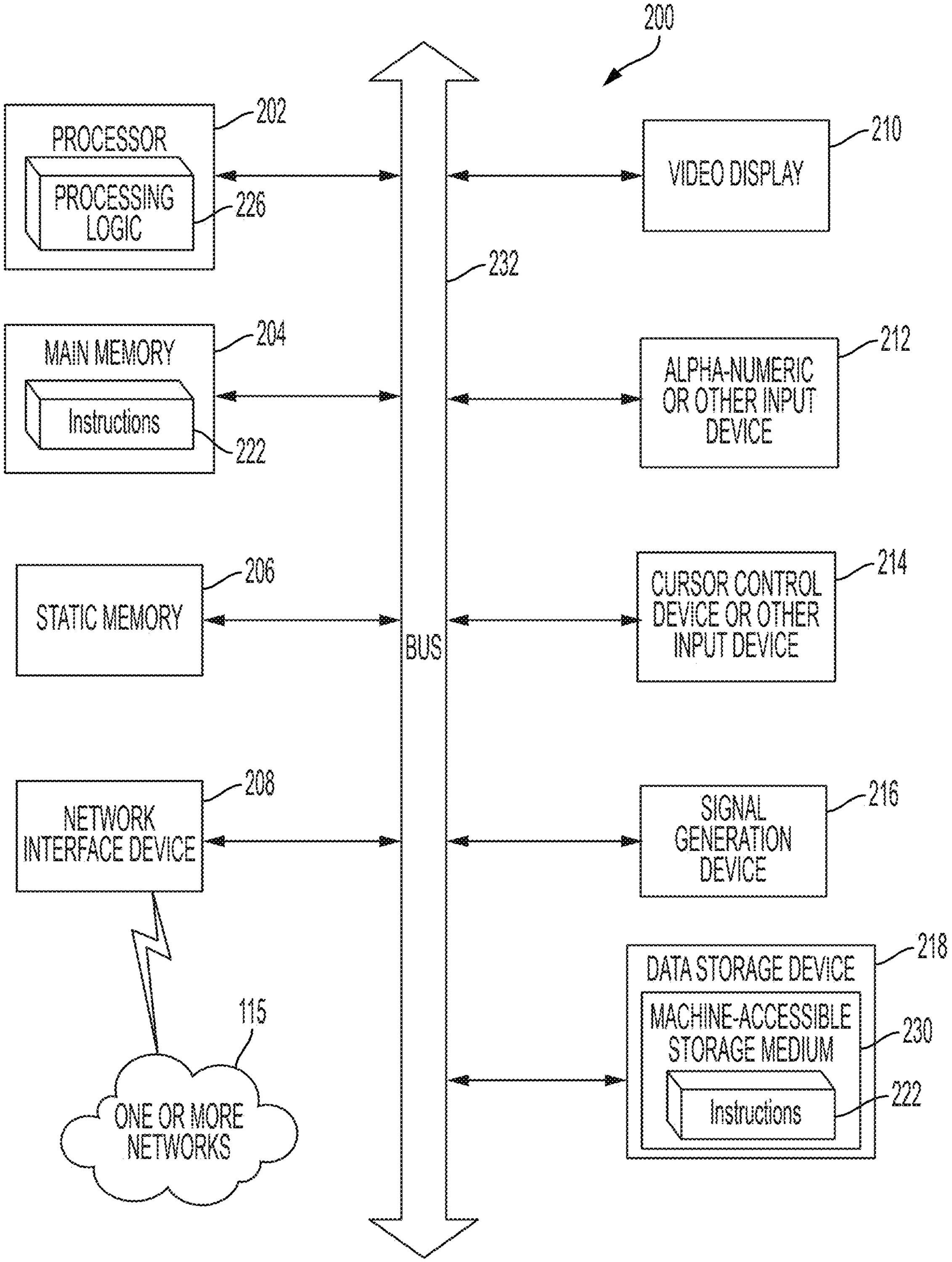
FIG. 2 is a schematic diagram of a computer, such as the one or more interactive display devices of FIG. 1, that is suitable for use in various embodiments.

FIG. 2 illustrates a diagrammatic representation of a computer architecture 200 that can be used within the interactive display system 100, for example, as a client computer (e.g., one or more interactive display devices 110 shown in FIG. 1), or as a server computer (e.g., one or more remote servers 130 shown in FIG. 1). In particular embodiments, the computer 200 may be suitable for use as a computer within the context of the interactive display system 100 that is configured to receive input from an interactive display device (e.g., such as the one or more interactive display devices 110, etc.), determine whether the input is intended for the one or more interactive display devices 110 or for the one or more connected computing devices 112, passing the input through to the proper computing device for processing.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202 (e.g., one or more computer processors), a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, Scalar Board, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD), LED display, OLED display, plasma display, a projector, a cathode ray tube (CRT), any suitable display described herein, or any other suitable display), an alphanumeric or other input device 212 (e.g., a keyboard), a cursor control or other input device 214 (e.g., a mouse, stylus, pen, touch-sensitive input device, etc.), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 200—the main memory 204 and the processing device 202 also constituting computer-accessible storage media. The software 222 may further be transmitted or received over a network 115 via a network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary Interactive Display Device

Figure 3:
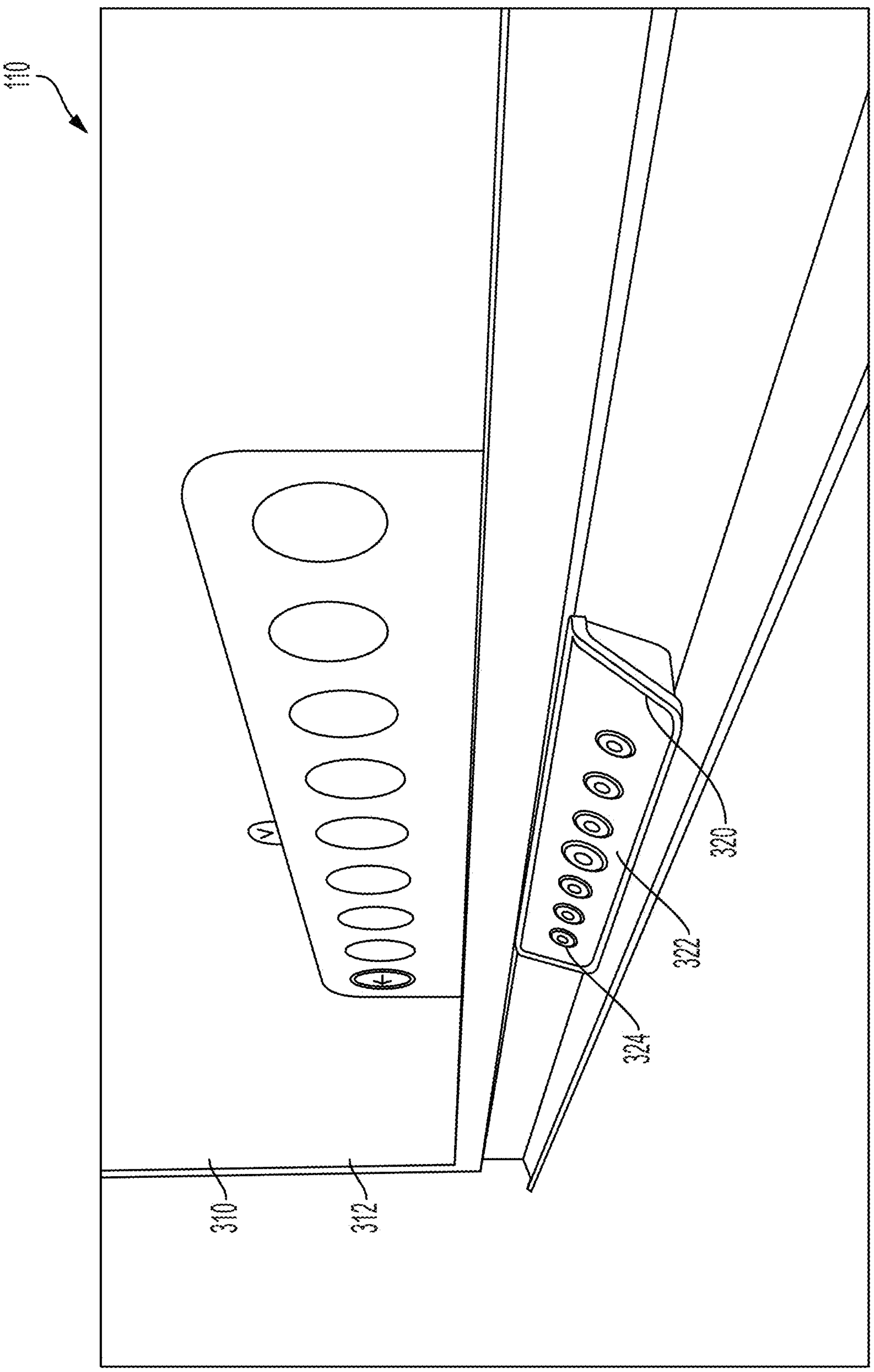
FIG. 3 depicts a perspective view of an interactive display according to a particular embodiment.

FIG. 3 depicts an interactive display device 110 according to a particular embodiment. As may be understood from FIG. 3, the interactive display device 110 in the embodiment shown in this figure comprises an interactive whiteboard that comprises: (1) a display 310; (2) a bezel 312; and (3) a control panel 320.

In various embodiments, the interactive display device 110 comprises one or more touch screen displays 310, which may, for example, comprise any suitable touch screen device configured to receive input via contact on the display device (e.g., via a user's finger or other body part, via a stylus or other pen-like device, etc.). For example, in various embodiments, interactive display device 110 comprises one or more resistive touch screen displays (e.g., one or more 5-wire resistive touch screen displays), one or more surface capacitive touch screen displays, one or more projected capacitive touch screen displays, one or more surface acoustic wave touch screen displays, one or more infrared touch screen displays (e.g., which may, for example include one or more touch overlays at least partially embedded in the bezel 312 of the interactive display device 110), or any other suitable touch screen display 310. In particular embodiments, the interactive display device 110 comprises one or more processors and memory. In such embodiments, the interactive display device 110 may comprise a stand-alone computing device such as a wall mounted display devices (e.g., such as touch-enabled computerized LED and/or LCD displays), etc.

In particular embodiments, the interactive display device 110 is configured to detect a plurality of simultaneous inputs (e.g., from a plurality of users) via the display 310. In various embodiments, the interactive display device 110 is configured to enable a user to interact with one or more displayed images as the user would interact with any other computing display device (e.g., by drawing on the one or more projected images), etc. In still other embodiments, the interactive display device 110 includes one or more computing components (e.g., one or more processors and memory) such that the one or more interactive display devices 110 embodies a stand-alone computing device.

In various embodiments, the interactive display device 110 comprises a control panel 320, which may, for example, be disposed adjacent a lower portion of the interactive display device 110 below the display 310. As may be understood from FIG. 3, the control panel 322 may define a face portion 322 that comprises one or more interactive buttons 324, which may, for example, control one or more functions and/or operations of the interactive display device 110. As may be understood from FIG. 3, the face 322 of the control panel 320 may angle at least partially outward from the front of the interactive display device 110 such that the face 322 forms an angle of between about zero degrees and about forty-five degrees with the display screen 310. In still other embodiments, the face 322 of the control panel 320 may angle at least partially outward from the front of the interactive display device 110 such that the face 322 forms any other suitable angle with the display screen 310 (e.g., about five degrees, about ten degrees, about thirty degrees, about forty-five degrees, up to about sixty degrees, or any suitable angle between about zero degrees and about ninety degrees).

In embodiments in which the face 322 angles at least partially outward from the interactive display device 110, the control panel 320 may be configured such that a user of the interactive display device 110 can see each of the one or more interactive buttons 324 while the user is standing immediately adjacent to the interactive display device 110 (e.g., within arm's reach of the interactive display device 110). As may be understood in light of this disclosure, the interactive display device 110 may be particularly large (e.g., up to about 100 inches measured diagonally or larger). As such, when standing immediately adjacent to the interactive display device 110 (e.g., within arm's reach of the interactive display device 110), it may be difficult for a user to reach and/or see every portion of the display screen 310 or the interactive display device 110. By having the face 322 of the control panel 320 angle at least partially outward, the interactive display device 110 may be configured to enable a user to view each of the one or more interactive buttons 324 without having to step back from the interactive display device 110 (e.g., by looking downward at the face 322 of the control panel 320). In other embodiments in which the one or more interactive buttons 324 were flush with and/or substantially parallel to (e.g., parallel to) the display screen 310, the user may be unable to see the buttons when standing close enough to the display screen 310 to interact with the display screen.

Exemplary System Platform

Various embodiments of an interactive display system 100 may be implemented in the context of any suitable interactive display device, system of interactive display devices, or any other suitable system. For example, particular embodiments may be implemented on an interactive display device, touch screen display device, one or more remote servers, or any other suitable computing device or combination of computing devices. Various aspects of the system's functionality may be executed by certain system modules, including an Input Routing Module 500; a Connected Computing Device Software Integration Module 800; a User Interface Adjustment, Customization, and Placement Module 1300; a Software Availability Curation Module 3100; and Situational Environmental Analysis Module 3100. These modules are discussed in greater detail below.

Although these modules are presented as a series of steps, it should be understood in light of this disclosure that various embodiments of the Input Routing Module 500; Connected Computing Device Software Integration Module 800; User Interface Adjustment, Customization, and Placement Module 1300; Software Availability Curation Module 3100; and Situational Environmental Analysis Module 3100 described herein may perform the steps described below in an order other than in which they are presented. In still other embodiments, the Input Routing Module 500; Connected Computing Device Software Integration Module 800; User Interface Adjustment, Customization, and Placement Module 1300; Software Availability Curation Module 3100; and Situational Environmental Analysis Module 3100 may omit certain steps described below. In various other embodiments, the Input Routing Module 500; Connected Computing Device Software Integration Module 800; User Interface Adjustment, Customization, and Placement Module 1300; Software Availability Curation Module 3100; and Situational Environmental Analysis Module 3100 may perform steps in addition to those described (e.g., such as one or more steps described with respect to one or more other modules, etc.).

Input Routing Module

In particular embodiments, the Interactive Display System 100 is configured to: (1) process one or more inputs received via one or more input devices of a first computing device having one or more connected computing device; (2) determine a final destination of the processed one or more inputs; and (3) route each respective input to the determined final destination for consumption and/or processing (e.g., by routing each respective input to either the first computing device or a particular connected computing device of the one or more connected computing devices. As a particular example, the system may be configured to: (1) receive a touch input on an interactive display with a connected computing device (e.g., a Chromebox); (2) process the touch input using the interactive display's processor to determine the final destination of the touch input (e.g., determine whether the final destination of the touch input is the interactive display or the connected computing device; (3) process the touch input as an input on the interactive display in response to determining that the final destination of the touch input is the interactive display; and (4) route the touch input to the connected computing device (e.g., via the input device) for processing at the connected computing device.

Figure 4:
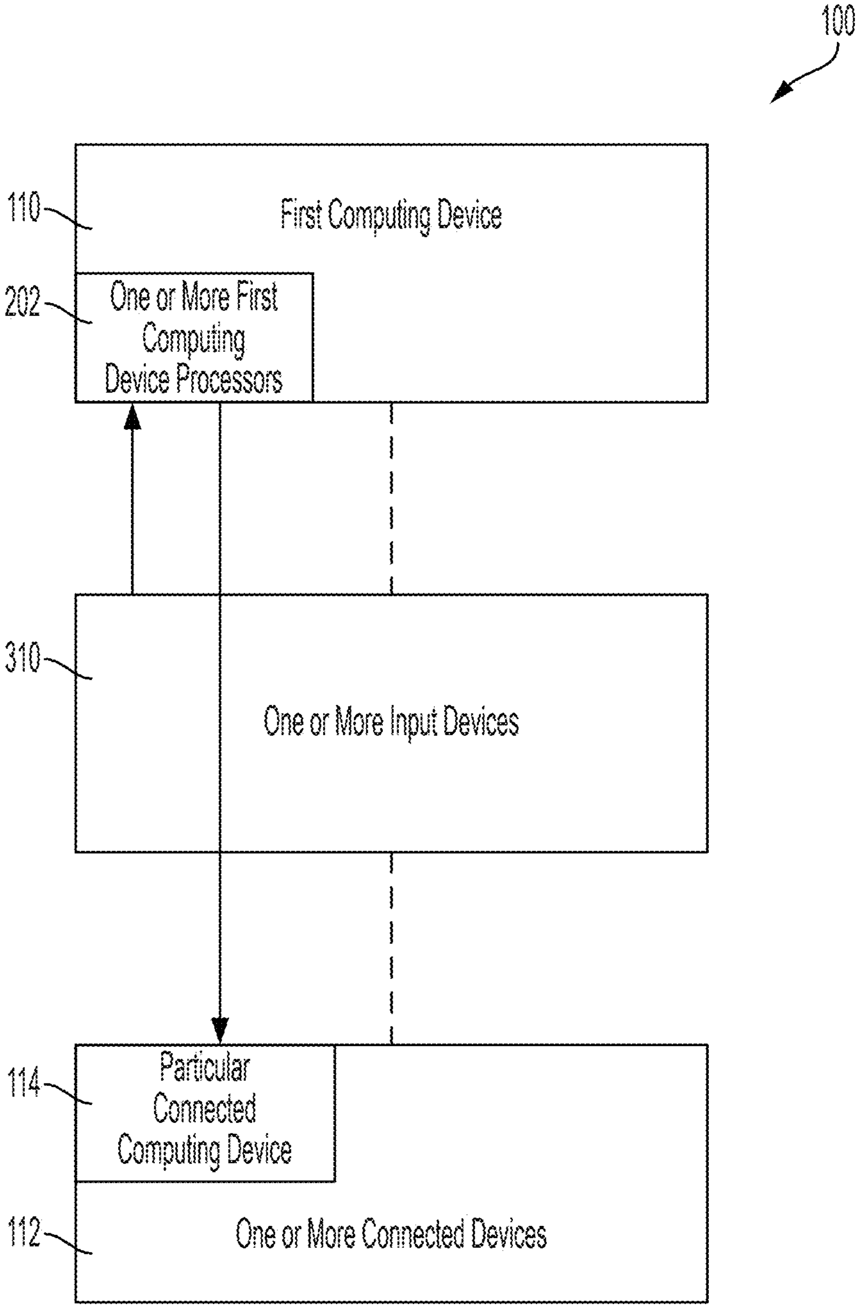
FIG. 4 depicts an input event routing process for a first computing device (e.g., an interactive display) having one or more connected devices according to various embodiments.

Turning to FIG. 4, as may be understood from this figure, a first computing device (e.g., an interactive display device 110) may be operatively connected to one or more connected devices 112. The interactive display device 110 may include one or more input devices (e.g., a touch-screen display 310, bezel 312, or other suitable input device) that are configured to also serve as one or more input devices 310 for the one or more connected devices while the one or more connected devices 112 are operatively connected to the first computing device 110.

Referring to FIG. 4, an interactive display system 100, in the embodiment shown in this figure, is configured to receive all input data via the one or more input devices 310. The input data received by the one or more input devices 310 first flows to one or more first computing device processors 202 of the first computing device 110. The one or more first computing device processors 202 may include any suitable processing device, such as, for example, a scalar board or other suitable computer processor. The one or more first computing device processors 202 may be configured to process the input data received from the one or more input devices 310 to determine where the input should 'land' (e.g., to determine the final destination of the input). The system may be configured to determine the final destination (e.g., the first computing device 110 itself, or any particular connected computing device 114 of the one or more connected devices 112) of each particular input based on, for example, a location of the input. As may be understood in light of this disclosure, the first computing device 110 may display data from the one or more connected devices 112 on at least a portion of the display screen (e.g., in full screen, in a windowed environment on a portion of the screen, etc.). The first computing device 110 may further display one or more overlays or other interactive elements or software applications that are native to the first computing device 110 on one or more other portions of the display. The system may be configured to determine the final destination of each particular input based at least in part on whether the location of the input coincides with: (1) an overlay, menu, software application, or other feature running natively on the interactive display device 110; or (2) data being displayed from the one or more connected devices 112.

In response to determining that the final destination of the input is an overlaying or native application on the first computing device 110, the system is configured to process the input at the first computing device 110 (e.g., using the one or more first computing device processors 202). In response to determining that the final destination is a particular connected computing device 114 of the one or more connected devices 112, the system is configured to transfer data related to the input (e.g., the input location) from the first computing device 110 (e.g., the one or more first computing device processors 202) to the particular connected computing device 114 for consumption by the particular connected computing device 114. In the particular embodiment of an interactive display system 100 shown in this figure, in response to determining that the final destination is the particular connected computing device 114, the system is configured to transfer data related to the input (e.g., the input location) from the first computing device 110 (e.g., the one or more first computing device processors 202) to the particular connected computing device 114 via the one or more input devices 310 (e.g., the bezel 312). For example, the system may transmit an instruction to the one or more input devices 310 to transmit input data related to the input (e.g., location, etc.) directly to the particular connected computing device 114.

Figure 5:
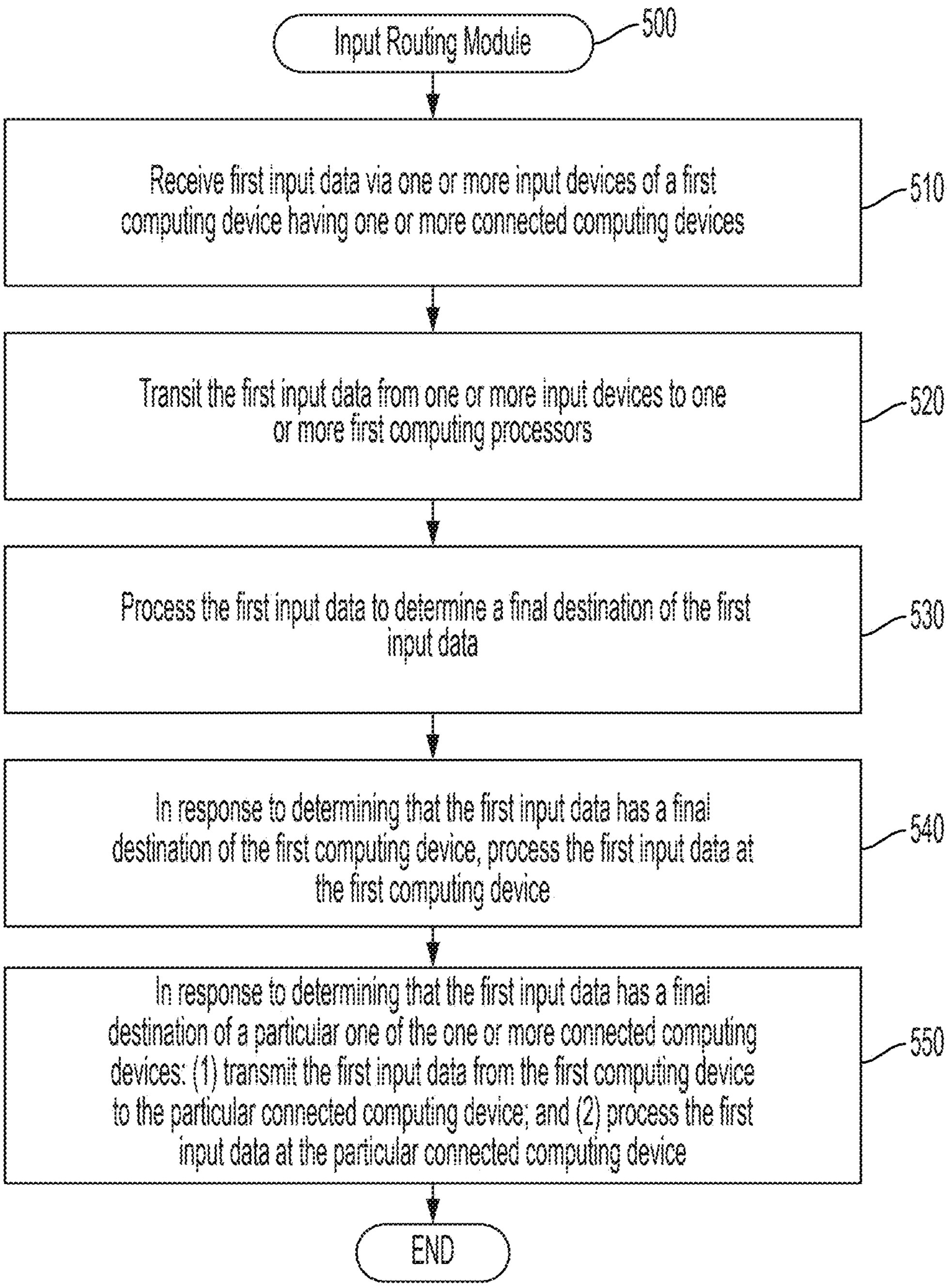
FIG. 5 depicts a flow chart that illustrates various steps executed by a particular embodiment of an Input Routing Module 500 that may, for example, be executed by the One or More Interactive Displays 110 of FIG. 1.

Turning to FIG. 5, in particular embodiments, when executing the Input Routing Module 500, the system is configured to, at Step 510, receive first input data via one or more input devices of a first computing device having one or more connected computing devices. In particular embodiments, the first input data comprises touch input data received via a touch-screen display or other interactive display, such as any suitable interactive display described herein. In other embodiments, the first input data comprises a location of the input on an interactive display device 110.

In various embodiments, the first computing device comprises any suitable computing device described herein (e.g., an interactive display device 110). In some embodiments, the first computing device comprises any suitable display device including at least one processor capable of processing the first input data to determine the destination of an input related to the input data.

In particular embodiments, the one or more connected computing devices include any suitable connected computing devices operatively connected to the first computing device. In various embodiments, the first computing device may be operatively coupled (e.g., connected) to the one or more connected computing devices 112 in any suitable manner using any suitable connection type (e.g., wired and/or wireless connection type). For example, in particular embodiments, the first computing device may be operatively coupled (e.g., connected) to the one or more connected computing devices 112 via any suitable video cable (e.g., composite video cable(s), s-video cable(s), component video cable(s), VGA cable(s), DVI cable(s), HDMI cable(s), Displayport cable(s), mini-Displayport cable(s), etc.) or combination thereof. In still other embodiments, the first computing device may be operatively coupled (e.g., connected) to the one or more connected computing devices 112 via any suitable data cable (e.g., ethernet cable(s), token ring cable(s), coaxial cable(s), optical fiber cable(s), USB cable, etc.) or suitable combination thereof. In still other embodiments, the first computing device may be operatively coupled (e.g., connected) to the one or more connected computing devices 112 via any suitable wireless connection (e.g., Bluetooth, WIFI, NFC, low energy Bluetooth, ZigBee, etc.) or combination of wireless connections. In still other embodiments, the first computing device may be operatively coupled (e.g., connected) to the one or more connected computing devices 112 via any suitable network discussed herein or any other suitable network. In other embodiments, the first computing device may be operatively coupled (e.g., connected) to the one or more connected computing devices 112 via any suitable combination of connection types described herein, or in any other suitable manner.

In particular embodiments, the one or more connected computing devices 112 may include any suitable connected computing device such as, for example, one or more laptop computers, one or more tablet computers, one or more Chromeboxes, one or more Amazon Fire TV devices, one or more Apple TV devices, one or more gaming systems (e.g., one or more Microsoft, Sony, Nintendo, etc. gaming systems), or any other suitable computing and/or video playing device, which may, for example, have one or more pieces of software installed thereon.

Continuing to Step 520, the system is configured to transmit the first input data from the one or more input devices to one or more first computing device processors. As described above, with respect to FIG. 4, the first input data received by the one or more input devices 310 first flows to one or more first computing device processors 202 of the first computing device 110. The one or more first computing device processors 202 may include any suitable processing device, such as, for example, a scalar board or other suitable computer processor. The one or more first computing device processors 202 may be configured to process the input data received from the one or more input devices 310 to determine where the input should 'land' (e.g., to determine the final destination of the input).

Next, at Step 530, the system is configured to process the first input data to determine a final destination of the first input data. The system may be configured to determine the final destination (e.g., the first computing device 110 itself, or any particular connected computing device 114 of the one or more connected devices 112) of each particular input based on, for example, a location of the input. As may be understood in light of this disclosure, the first computing device 110 may display data from the one or more connected devices 112 on at least a portion of the display screen (e.g., in full screen, in a windowed environment on a portion of the screen, etc.). The first computing device 110 may further display one or more overlays, menus, or other interactive elements or software applications that are native to the first computing device 110 on one or more other portions of the display. The system may be configured to determine the final destination of each particular input based at least in part on whether the location of the input coincides with: (1) an overlay, menu, software application, or other feature running natively on the interactive display device 110; or (2) data being displayed from the one or more connected devices 112.

In some embodiments, the system is configured to determine a final destination for an initial contact, and then transmit input data to the appropriate computing device (e.g., via the input device) or consume the input data locally until the contact is released. In this way, the system may perform destination determination only for an initial input, without making such a determination for the continuous inputs (e.g., finger swipe) that extend from the initial contact. In particular embodiments, the system may, during the continuous input, preform a separate location analysis for a second contact point to determine a destination device, and similarly direct input data stemming and continuous from the second contact to the identified device until the second contact ends. In this way, the system may process simultaneous inputs that have at least some crossover with respect to input timing. In other embodiments, the system may direct all input data during a continuous input (e.g., regardless of whether additional separate contacts are made during the continuous input) to the device for which the initial contact was determined to be destined.

Returning to Step 540, in response to determining (e.g., at Step 530) that the first input data has a final destination of the first computing device, the system is configured to process the first input data at the first computing device (e.g., using one or more processors of the first computing device).

At Step 550, in response to determining (e.g., at Step 530) that the first input data has a final destination of a particular one of the one or more connected computing devices, the system is configured to: (1) transmit the first input data from the first computing device to the particular connected computing device (e.g., via the one or more input devices); and (2) cause the particular connected computing device to process the first input data. In still other embodiments, the system is configured to transmit the first input data to the particular connected computing device for processing.

In response to determining that the final destination is a particular connected computing device 114 of the one or more connected devices 112, the system may, for example, be configured to transfer data related to the input (e.g., the input location) from the first computing device 110 (e.g., the one or more first computing device processors 202) to the particular connected computing device 114 for consumption by the particular connected computing device 114. In particular embodiments of an interactive display system 100, in response to determining that the final destination is the particular connected computing device 114, the system is configured to transfer data related to the input (e.g., the input location) from the first computing device 110 (e.g., the one or more first computing device processors 202) to the particular connected computing device 114 via the one or more input devices 310 (e.g., the bezel 312 shown in FIG. 3). The system may, for example, be configured to cause the one or more input devices to provide the input data (e.g., a location of the input) directly to the particular connected computing device. In some embodiments, once an initial contact is identified as having a destination of the particular connected computing device, the system may cause the input device to direct all subsequent inputs (e.g., or all inputs that extend from an initial contact until the initial contact ends) directly to the particular connected computing device until the contact that initiated the input has ceased. In this way, the system may avoid making a determination for every single input as to the final destination, once a contact has been established.

Input Routing User Experience

Figure 6:
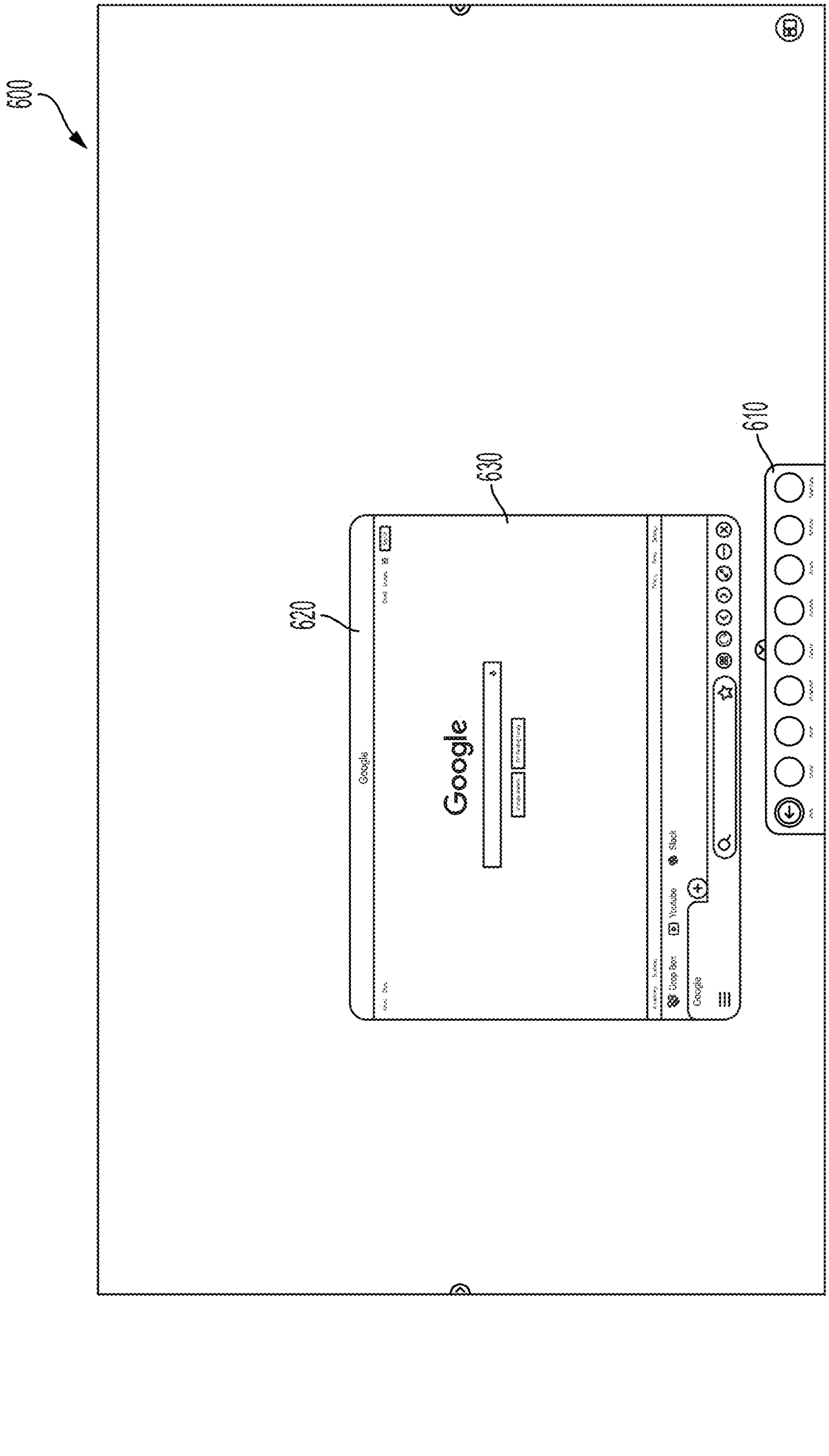
FIGS. 6-7 depict exemplary screen displays and graphical user interfaces (GUIs) according to various embodiments of the system, which may display information associated with the system or enable access to, or interaction with, the system by one or more users (e.g., when using an interactive display to access both functionality that is native to the active display and a software application running on a connected computing device).

FIG. 6 depicts an exemplary display screen 600 that a user may encounter while using an interactive display device 110 with a connected computing device (e.g., a Google Chromebox). As may be understood from the embodiment of a user interface 600 shown in this figure, the user interface includes a menu 610 that is native to the interactive display device (e.g., is running locally on the interactive display device) a windowed interface 630 displaying a software application (e.g., a web browser) that is running on the connected computing device and a wrapper 620 around the windowed interface 630 that is native to the interactive display device.

In particular embodiments, the system is configured to display the menu 610 on top of any source being displayed by the interactive display device (e.g., even when using one or more connected computing devices in full screen mode). In various embodiments, the system is configured to enable the user to expand and collapse the menu 610 using the menu expander 613. In particular embodiments, the system is further configured to enable the user to access the menu 610 on the left and right side of the display screen using respective menu expanders 611, 612. In particular embodiments, when displaying the menu 610 on the left- or right-hand side of the display, the system is configured to spawn the menu lower than the center of the display. This may, for example, facilitate accessibility of the menu when on the left- or right-hand side in the case of larger displays.

In various embodiments, such as the embodiment shown in FIG. 6 when the system is displaying a view of a connected computing device in a windowed interface 630, the system is configured to enable the user to move a position of the windowed interface 630, for example, by selecting and dragging the wrapper 620 around the display screen 600. In this way, the system is configured to enable the user to modify a portion of the display screen 600 of the interactive display device 110 that is displaying one or more images from the connected computing device (e.g., in the windowed interface 630).

As may be understood from FIG. 6, the interactive display device 110 may include a touch-screen display configured to receive user inputs via touch input (e.g., using a finger, pen, or other touch device). The interface 600 shown in this figure may be configured to: (1) receive an input at a particular location; (2) determine the final destination of the input based at least in part on the location; and (3) route the input to the appropriate device for processing. For example, in the interface shown in this figure, the system may be configured to determine that any input on a location of the display screen 600 on the windowed interface 630 has a final destination of the connected computing device. The system may then route the input to the connected computing device for processing at the connected computing device. The system may then update the screen display 600 to show a live version of the software application running on the connected computing device that is shown in the windowed interface 630 to reflect a substantially up-to-date (e.g., live) view of the software application running on the connected computing device (e.g., that reflects any change to the software application running on the connected computing device resulting from the input that was routed to the connected device).

The system may be configured to determine that any input outside of the windowed interface 630 has a final destination of the interactive display device. The system may then be configured to process the input at the interactive display device at the location of the input. For example, the system may be configured to process an input at the menu 610 or wrapper 620 on the interactive display device (e.g., by initiating any particular function or performing any particular action initiated by an input at the detected location).

Figure 7:
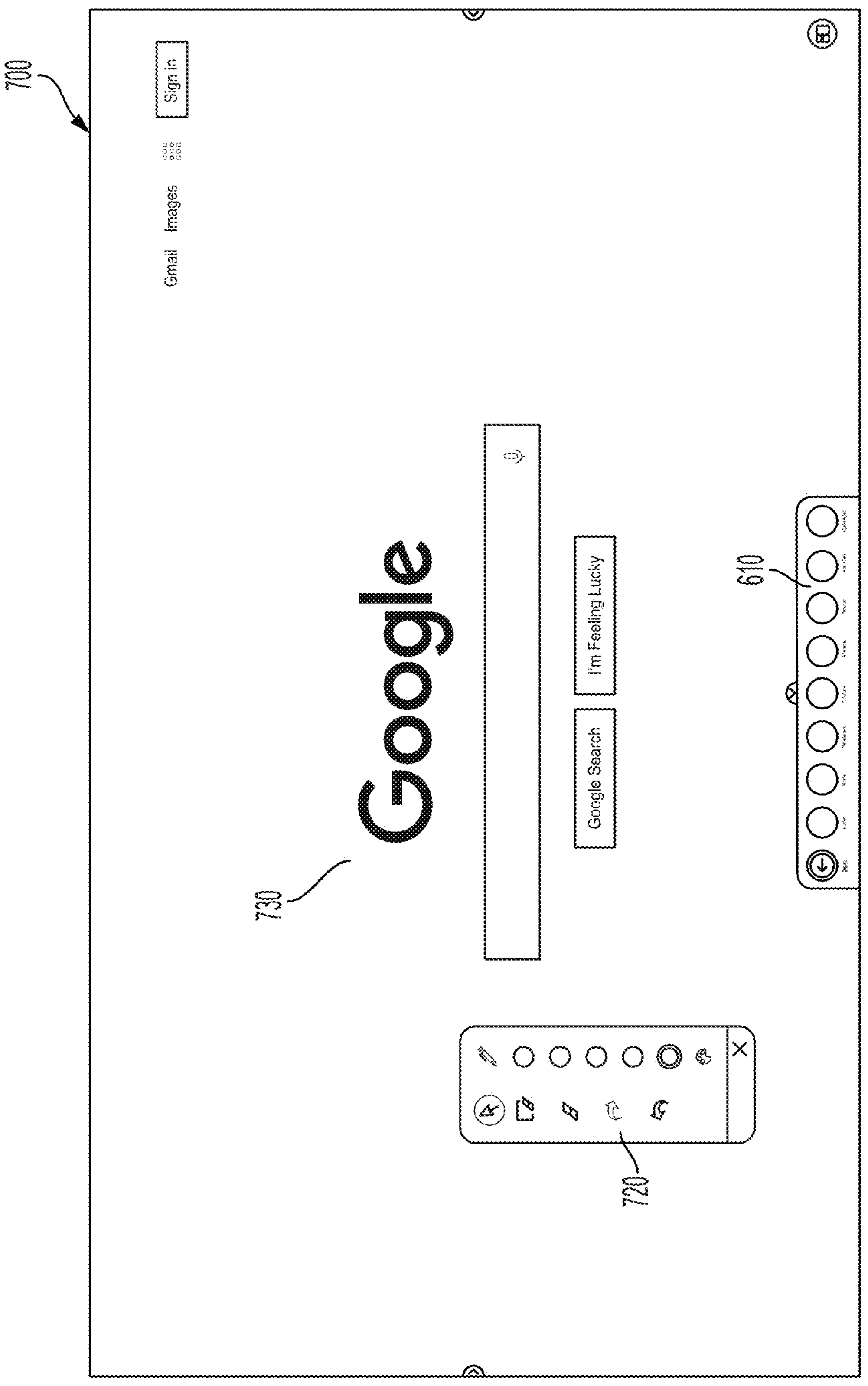

FIG. 7 depicts another exemplary display screen 700 that a user may encounter while using an interactive display device 110 with a connected computing device (e.g., a Google Chromebox). As may be understood from the embodiment of a user interface 700 shown in this figure, the user interface includes a menu 610 that is native to the interactive display device (e.g., is running locally on the interactive display device), an interface 730 displaying a software application (e.g., a web browser) in full screen that is running on the connected computing device (e.g., is being executed by one or more connected computing device processors) and an annotation overlay 720 that is native to the interactive display device 100 (e.g., is running on the interactive display device and/or one or more interactive display device processors). In the embodiment shown in this figure, the interface 730 may include a user interface from a software application running on a connected computing device to a display device (e.g., an interactive display) that is transmitting one or more images from the connected computing device to the interactive display device for display (e.g., using any suitable wired and/or wireless connection described herein.

As may be understood from FIG. 7 and from this disclosure, the interactive display device 110 may include a touch-screen display (e.g., or other display with any suitable input device) configured to receive user inputs via touch or other input (e.g., using a finger, pen, or other touch device). The interface 700 shown in this figure may be configured to: (1) receive an input at a particular location; (2) determine the final destination of the input based at least in part on the location; and (3) route the input to the appropriate device for processing. For example, in the display interface 700 shown in this figure, the system may be configured to determine that any input on a location of the display screen 700 on the connected device interface 730 (e.g., which is running on the connected device and being displayed on the interactive display device in a full-screen setting) has a final destination of the connected computing device. The system may then route the input to the connected computing device for processing at the connected computing device (e.g., such that the connected computing device processes the input as if the input were received by the connected computing device at a location that corresponds to the location at which the input was received on the interface 730).

The system may then update the screen display 730 (e.g., in substantially real-time) to show a live version of the software application running on the connected computing device that is shown in the full-screen interface 730 to reflect a substantially up-to-date (e.g., live) view of the software application running on the connected computing device (e.g., that reflects any change to the software application running on the connected computing device resulting from the input that was routed to the connected device).

The system may further be configured to process any input on the display screen 700 at the location of the input. For example, the system may be configured to process an input at the menu 610 or annotation overlay 720 on the interactive display device itself (e.g., by initiating any particular function or performing any particular action from an input at the detected location). For example, in response to detecting an input at the annotation overlay 720 on the 'pen' icon, the system may be configured to: (1) determine (e.g., using a processor associated with the interactive display device) that the final destination of the input is the interactive display device; and (2) process the input on the interactive display device at the location of the input (e.g., by selecting the 'pen' from the annotation overlay 720). In various embodiments, the system may then be configured to: (1) determine that subsequent inputs while the 'pen' is selected have a final destination of the interactive display device (e.g., even if the user provides input on a portion of the display screen 700 that comprises the connected device interface 730); and (2) process the inputs at the interactive display device by drawing over the underlying connected device interface 730 at one or more input locations. In particular embodiments, the system may be configured to continue to interpret further input as input having a final destination of the interactive display device, until a user de-selects the 'pen' from the annotation menu 720, or otherwise selects any other system option to revert to the input event routing functionality described above. In this way, the system may be configured to interpret (e.g., determine a destination of) particular inputs differently depending on what particular mode the interactive display system is in at a time when the input is received (e.g., whether the interactive display is in a 'normal' mode, an annotation mode, etc.).

Connected Computing Device Software Integration Module

In various embodiments, when using a computing device or plurality of connected computing devices (e.g., such as a Chromebox, Apple TV, Microsoft Xbox One; Sony PlayStation, laptop computer, tablet computer, or any other suitable computing device or combination of computing devices) connected to any suitable display device (e.g., an interactive display device, smart TV, television display, or any other suitable display device), a user may be required to: (1) be aware of which connected computing device has a particular application that the user desires to use: (2) switch an input of the display device to the appropriate connected computing device; and (3) launch the application on the connected computing device (e.g., using an input device associated with the connected computing device.

For example, if a user had a Chromebox with Netflix installed, and the Chromebox were operatively connected to a Samsung SmartTV (e.g., via an HDMI cable), and the user desired to watch a piece of multimedia content using Netflix, the user may have to: (1) power on the Samsung SmartTV (e.g., using an input device such as a remote control for the Samsung SmartTV or pressing a power button located on the physical Samsung SmartTV); (2) power on the Chromebox (e.g., using an input device such as a remote control for the Chromebox, pressing a power button located on the physical Chromebox, etc.); (3) set an input for Samsung SmartTV to the input via which the Chromebox is operatively connected to the Samsung SmartTV (e.g., HDMI 1); and (4) select the Netflix application from the Chromebox using a suitable Chromebox input device (e.g., remote control) that is distinct from the input device for the Samsung SmartTV. Although this may be a common experience for users, the experience of using a software application on a computing device connected to a display device may be further complicated, for example: (1) when the display device has a plurality of connected computing devices, each having respective available applications; (2) when each of the connected computing device is connected to the display device via a different respective input; (3) when the display device itself has at least some applications available for use by the user; and/or (4) etc.

In some embodiments, the Interactive Display System 100 is configured to aggregate a listing of one or more available applications installed on, running on, or otherwise available on each of the one or more connected devices to a particular computing device (e.g., display device). This may, for example, enable a user of the interactive display system 100 to enjoy a more unified user experience when using a display device with one or more connected devices. From the user's perspective, when using the interactive display system 100 described herein, any selected software application (e.g., which may, for example, be running on any computing device connected to the display device) may appear to be running on the display device itself, even though it is technically running on one of the connected devices.

In particular embodiments, the interactive display system may be configured to: (1) provide a listing of the aggregated available applications to a user of a particular display device, where the aggregated available applications includes each application available on any connected computing device in addition to any application available on the display device itself; (2) receive a selection of a particular application from the aggregated listing of available applications; and (3) automatically cause a particular connected computing device (e.g., the particular connected computing device on which the selected particular application is available) to display data from the particular selected application on the particular computing device while the particular application is running on a connected computing device. In various embodiments, from the user's perspective, the selected particular application may appear to be running on the particular display device (e.g., even though the application is technically running on the connected computing device).

Figure 8:
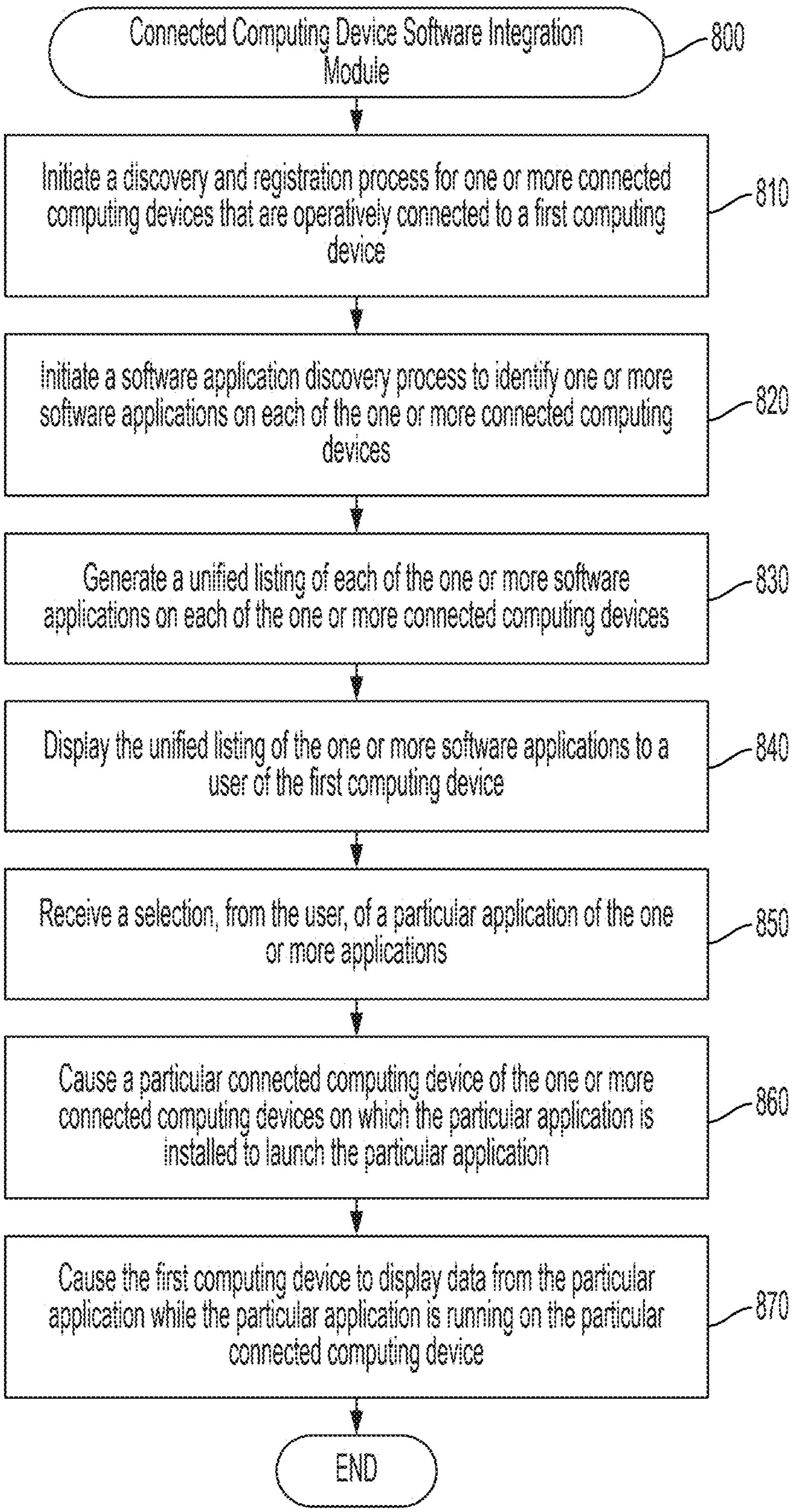
FIG. 8 depicts a flow chart that illustrates various steps executed by a particular embodiment of a Connected Computing Device Software Integration Module 800 that may, for example, be executed by the One or More Interactive Displays 110 of FIG. 1.

Turning to FIG. 8, in particular embodiments, when executing the Connected Computing Device Software Integration Module 800, the system is configured to, at Step 810, initiate a discovery and registration process for one or more connected computing devices that are operatively connected to a first computing device (e.g., display device).

In particular embodiments, the system is configured to register an intent for a particular connected computing device's application(s) to be made available via the first computing device (e.g., display device) to which each of the one or more connected computing devices are operatively connected. The system may, for example, be configured to register each of one or more connected computing devices with the first computing device in order to facilitate a software application discovery process ad described below at Step 820. In various embodiments, the system is configured to receive any suitable piece of data associated with each respective connected computing device in order to register each device. The system may, for example, be configured to receive: (1) a unique device ID for each of the one or more connected computing devices; (2) an IP address of each of the one or more connected computing devices; and/or (3) any other suitable identifier for each particular connected computing device.

In particular embodiments, the display device (e.g., first computing device) is configured to register each of the one or more connected computing devices via any suitable connection (e.g., via a serial connection through a serial port in a backplane of the first computing device or display device). In still other embodiments, the system is configured to establish at least a temporary registration connection between the first computing device (e.g., display device) and each of the one or more connected computing devices, for example, via any suitable wired and/or wireless connection (e.g., WIFI, Bluetooth, etc.). In a particular embodiment, a connected computing device may be configured to transmit unique device information to the display device (e.g., first computing device via one or more encoded pixels (e.g., by transmitting encoded data via a suitable wired connection such as via HDMI). The display device (e.g., a display device processor) may then be configured to receive the unique identifier via the one or more encoded pixels.

In various embodiments, the system is configured to use any suitable discovery protocol to discover the one or more connected devices. The discovery protocol may, for example, include transmission of one or more registration messages between each of the one or more connected computing devices and the first computing device. The one or more registration messages may, for example, include a device ID, IP address or any other suitable information.

Continuing to Step 820, when executing the Connected Computing Device Software Integration Module 800, the system may be configured to initiate a software application discovery process to identify one or more software applications on each of the one or more connected computing devices. In particular embodiments, the system is configured to provide a software application for installation on a particular connected computing device. In various embodiment's, the system is configured to provide the software application during the registration process described above. In various embodiments, the software application is configured to identify and maintain a substantially up-to-date (e.g., an up-to-date) listing of information related to one or more software applications available on the connected computing device (e.g., installed on the connected computing device, available for installation and execution on the connected computing device, or otherwise available for execution by the connected computing device). In some embodiments, the software application is configured to enable communication between the interactive display device and each particular connected computing device.

In particular embodiments, the system is configured to complete a software application discovery process based at least in part on analyzing (e.g., accessing) data associated with a user account associated with the connected computing device. For example, in various embodiments, a user may have a user account for a particular connected computing device (e.g., a user account with a manufacturer of the connected device, a user account with a provider of an operating system for the connected computing device, etc.). In particular embodiments, the user account may include associated data that identifies one or more software applications that the user has downloaded on the connected computing device (e.g., or one or more related computing devices that are also associated with the user account). For example, in particular embodiments, a user may have a Google account that stores data related to one or more applications that the user has downloaded and/or installed on a particular connected computing device (e.g., a Google Chromebox) as well as additional application data that the user has installed on one or more other Google computing devices (e.g., or computing devices that utilize one or more Google operating systems such as Android), even if those applications are not currently installed on the particular connected computing device (e.g., the computing device connected to the display device or interactive touch display device described herein).

Next, at Step 830, the system may be configured to generate a unified listing of each of the one or more software applications on each of the one or more connected computing devices. In particular embodiments, the interactive display system may, for example, be configured to aggregate a listing of one or more available applications on each of a plurality of connected computing devices (e.g., to a particular display device). In some embodiments, a software application on the display device (e.g., the interactive display device) may be configured to: (1) receive application data for each of a plurality of connected devices (e.g., from a respective software application on each particular connected device); and (2) aggregate available application that includes: (a) a respective device on which each particular application is installed; (2) input information for the particular respective device associated with each particular application (e.g., in order to facilitate an automatic transition to an input associated with the respective connected device upon selection, by a user, of an application available on the respective connected device, etc.).

In various embodiments, the display device is configured to communicate with each respective application running on each respective connected device in order to orchestrate a unified experience for the user (e.g., such that from the user's perspective, the system displays an aggregated listing of all applications available on any connected device to the display device that the user is using. In a particular embodiment, a locker application on the display device (e.g., interactive display device) displays a listing of all available applications on any connected device to a user of the display device.

Figure 10:
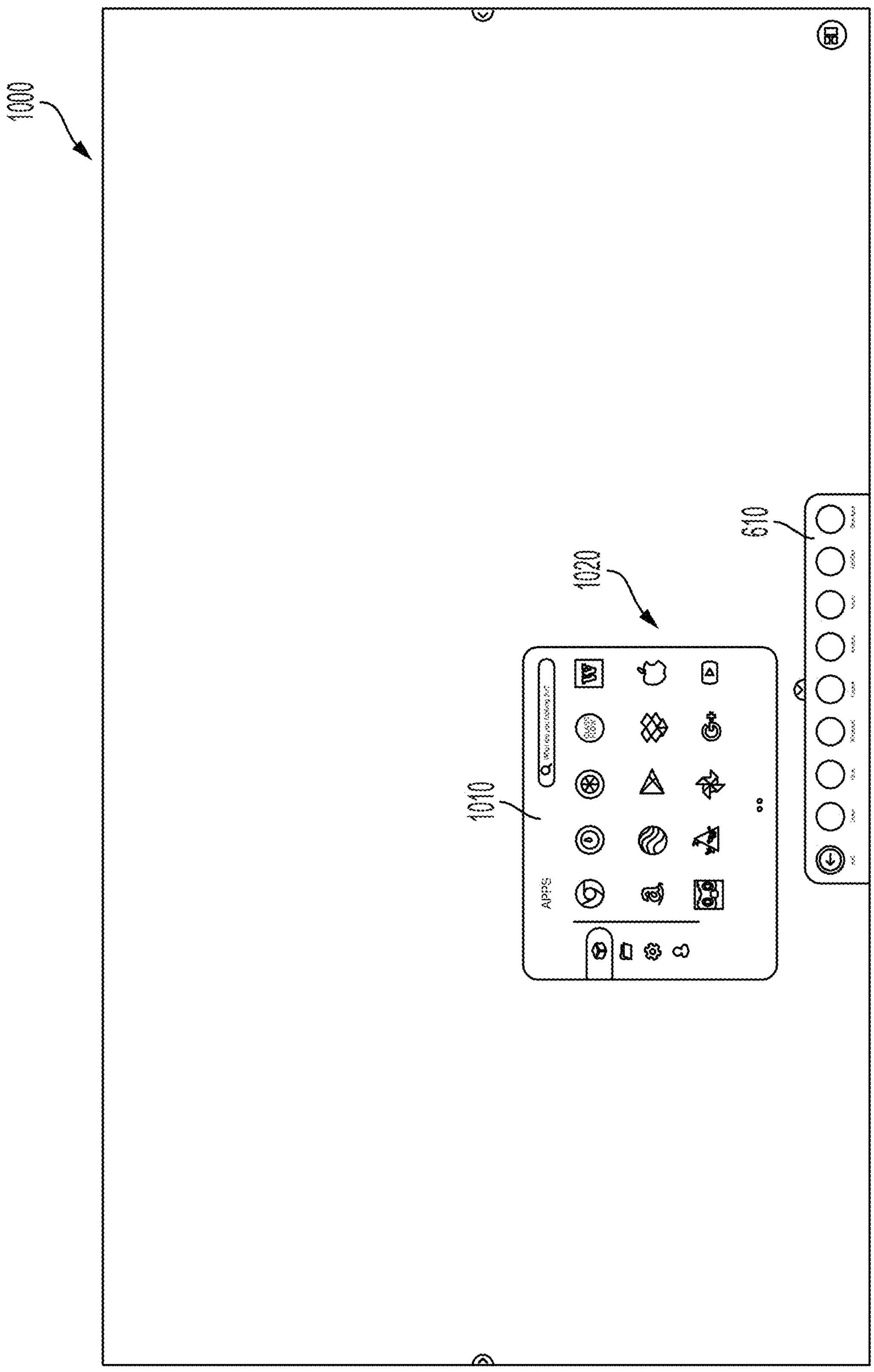
FIGS. 10-12 depict exemplary screen displays and graphical user interfaces (GUIs) according to various embodiments of the system, which may display information associated with the system or enable access to, or interaction with, one or more features of the system by one or more users (e.g., when using an interactive display device to access one or more software applications installed on and/or running on one or more computing devices that are operatively connected to the interactive display device).

Returning to Step 840, the system is configured to display the unified listing of the one or more software applications to a user of the first computing device. For example, FIG. 10 depicts an exemplary screen display showing a unified application locker 1010 (e.g., which may be accessible via the menu 610) that includes an application listing 1020 of all applications available on: (1) any connected devices to the interactive display device; as well as (2) on the interactive display device itself. The system may be configured to display the unified listing in any suitable manner on the first computing device (e.g., display device). For example, the system may be configured to display the unified listing via a suitable menu on the first computing device (e.g., a unified overlay menu), via a software locker application on the first computing device, or in any other suitable manner.

At Step 850, the system is configured to receive a selection, from the user, of a particular application of the one or more software applications. The system may, for example, be configured to receive the selection in response to selection, by the user, of the particular application from a user interface listing each of the available applications (e.g., as shown in FIG. 10). The system may, for example, be configured to receive the selection form one or more input devices of the first computing device (e.g., one or more touch input devices or other suitable input devices).

Continuing to Step 860, the system is configured to cause a particular connected computing device of the one or more connected computing devices on which the particular application is installed to launch the particular application (e.g., in response to receiving the selection at Step 580). The system may, for example, be configured to: (1) determine which of the one or more connected computing devices have the particular applicational available; and (2) cause the determine connected computing device to launch the particular application. In a particular embodiment, the system is configured to cause the connected computing device to launch the particular application using one or more remote intent techniques.

In some embodiments, a plurality of connected computing devices may have the same software application available (e.g., both a connected Chromebox and a connected apple TV may have a Netflix application available for use). In such embodiments, the system may be configured to cause any suitable connected device having the selected software application available to launch the selected software application. In other embodiments, the system is configured to determine which of one or more connected devices having the particular software application is best suited for use to launch the selected particular software application. For example, the system may be configured to determine which of two or more connected devices having the same particular software application for use on the display device: (1) provide the higher resolution output (e.g., 4k vs. 1080p); (2) are operatively coupled to the display device (e.g., first computing device) using a more reliable connection (e.g., HDMI vs. a wireless connection, which may be more prone to packet loss or other issues); (3) have a lower power consumption; (4) already have the available application installed for use (e.g., immediate use); (5) have a more recently updated version of the software application available for launch; and/or (6) make any other suitable determination related to the two or more connected computing devices to determine which of the connected computing devices (e.g., or first computing device) on which to launch the selected software application (e.g., based on processing power, based on connectivity, based at least in part on which connected device the user typically manually selects for the use of the selected particular application, etc.).

At Step 870, the system is further configured to cause the first computing device to display data from the particular application while the particular application is running on the particular connected computing device.

Connected Computing Device Software Integration Experience

Figure 9:
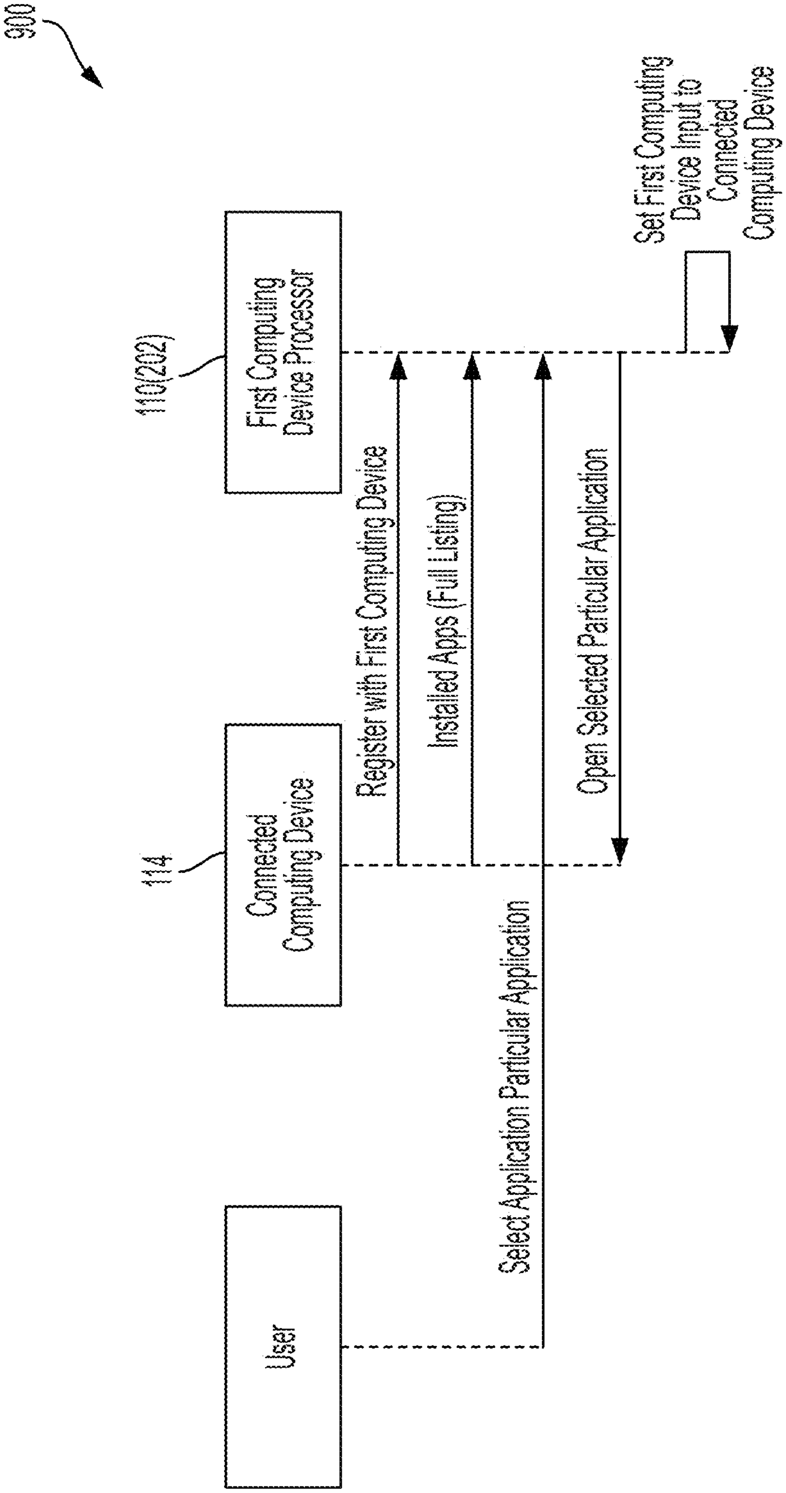
FIG. 9 depicts an exemplary process by which a user may access and use a selected application running on a connected computing device via a first computing device (e.g., an interactive display) to which the connected computing device is operatively connected.

FIG. 9 depicts an exemplary process flow 900 that illustrates a process by which: (1) a connected computing device registers with a first computing device 110 (e.g., first computing device processor 202) to which the connected computing device 114 is operatively coupled; (2) the first computing device 110 (e.g., first computing device processor 202) receives a listing of applications installed on the connected computing device 114; (3) a user selects a particular software application available on the connected computing device 114 using the first computing device 110; (4) the first computing device 110 (e.g., first computing device processor 202) causes the connected computing device to launch, open, or switch to the selected particular application; and (5) the first computing device 110 (e.g., first computing device processor 202) or display sets a first computing device input to the connected computing device 114 (e.g., such that the first computing device 110 or display displays the particular software application running on the connected computing device on at least a portion of a display screen of the first computing device).

FIG. 10 depicts an exemplary screen display 1000 that a user may encounter while using an interactive display device 110 with at least one connected computing device (e.g., a Google Chromebox). As may be understood from FIG. 10, the screen display 1000 includes a menu 610 via which a user may access various features, software, files, etc. on the interactive display device. The screen display 1000 further includes a unified application locker 1010 (e.g., which may be accessible via the menu 610) that includes an application listing 1020 of all applications available on: (1) any connected devices to the interactive display device; as well as (2) on the interactive display device itself. As may be understood in light of this disclosure, in response to the user selecting a particular application from the application listing 1020, the system may be configured to: (1) identify the connected device on which the selected application is available; (2) launch the selected application on the connected device; and (3) sets an input for the interactive display 110 to the connected computing device (e.g., such that the interactive display device displays the selected application running on the connected computing device on at least a portion of a display screen of the interactive display device).

Figure 11:
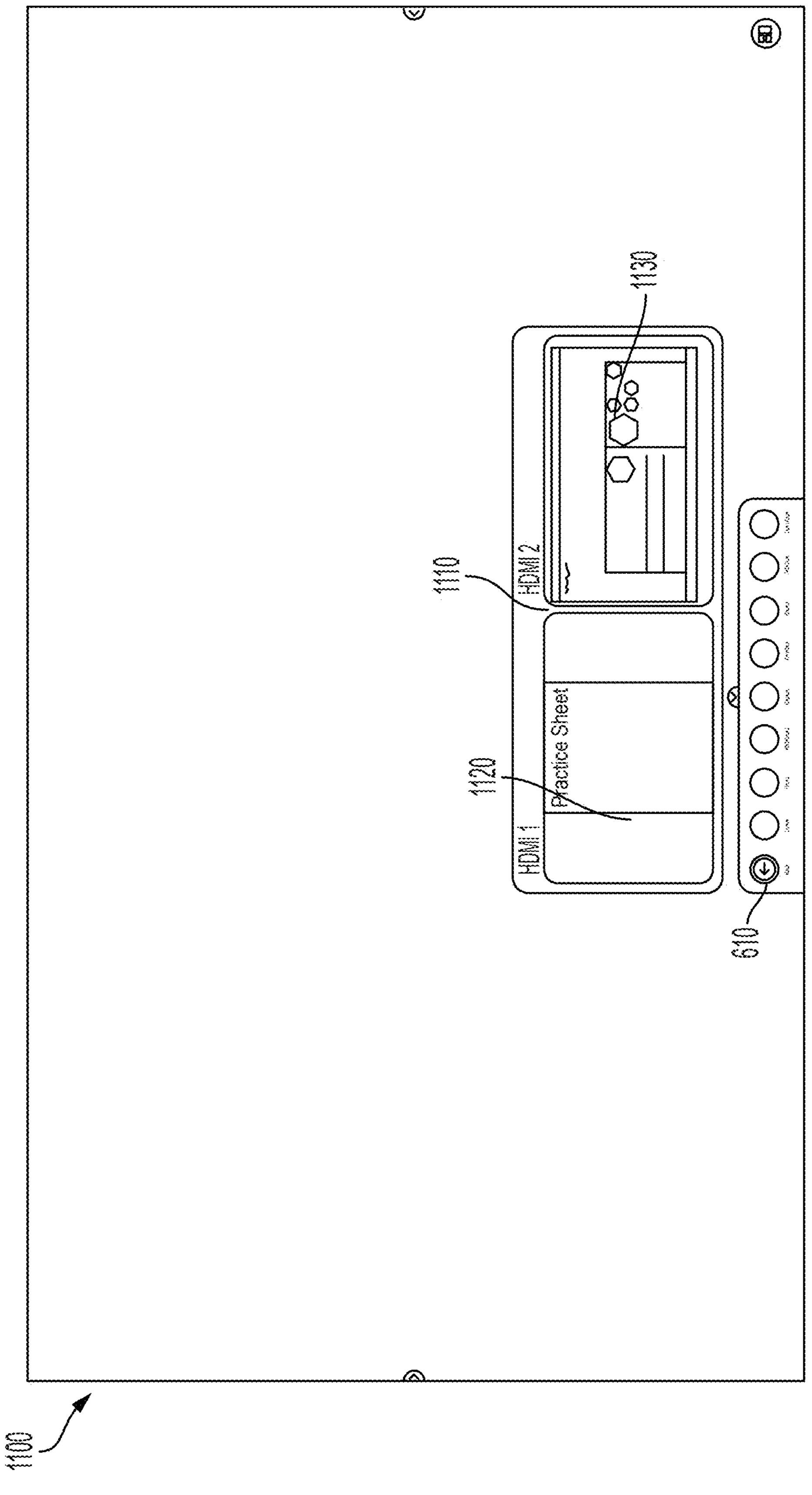

FIG. 11 depicts an exemplary screen display 1100 that a user may encounter while using the interactive display device 110 with at least two connected computing devices (e.g., a Google Chromebox and a laptop computer). As may be understood from FIG. 11, the screen display 1100 includes a menu 610 via which a user may access various features, software, files, etc. on the interactive display device. The screen display 1100 further includes an input menu 1110 (e.g., which may be accessible via the menu 610) that shows a current display of each respective connected device 1120, 1130. As may be understood from this figure, the input menu 1110 may display a substantially current (e.g., current) view of what is currently being displayed by each respective connected device 1120, 1130. As may be understood from the user interface shown in FIG. 11, a user may select a particular input from the input menu 1110 to substantially seamlessly (e.g., seamlessly) switch between connected devices being displayed on the interactive display. In some embodiments, the system is configured to enable the user to select multiple connected devices to display simultaneously on the interactive display device (e.g., on different respective portions of the interactive display screen such as in a windowed or other suitable environment).

Figure 12:
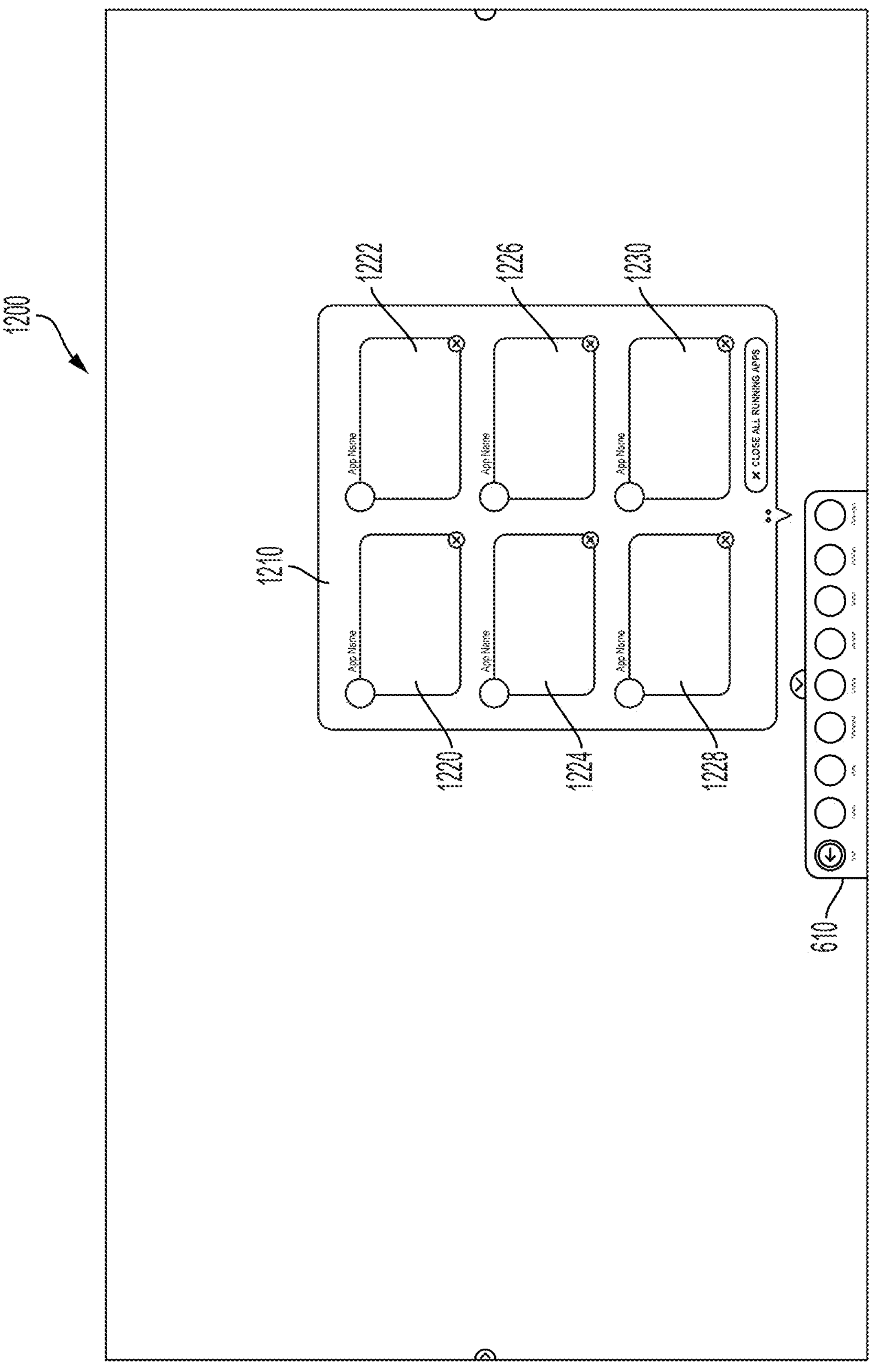

FIG. 12 depicts an exemplary screen display 1200 that a user may encounter while using the interactive display device 110 with at least one connected computing device (e.g., a Google Chromebox). As may be understood from FIG. 12, the screen display 1200 includes a menu 610 via which a user may access various features, software, files, etc. on the interactive display device. The screen display 1200 further includes an open applications menu 1210 (e.g., which may be accessible via the menu 610) that shows a current display of each respective application running on the interactive display or any connected computing device 1220, 1222, 1224, 1226, 1228, 1230. As may be understood from this figure, the open applications menu 1210 may display a substantially current (e.g., current) view of what is currently being displayed by each respective open application 1220, 1222, 1224, 1226, 1228, 1230. As may be understood from the user interface shown in FIG. 12, a user may select a particular application (e.g., application 1224) from the open applications menu 1210 to substantially seamlessly (e.g., seamlessly) switch to the selected application (e.g., and to the connected device on which the selected application is running). In some embodiments, the system is configured to enable the user to select multiple applications to display simultaneously on the interactive display device (e.g., on different respective portions of the interactive display screen such as in a windowed or other suitable environment). As such, the system may be configured to display multiple applications running on multiple different connected devices. The open applications menu 1210 may further include user-selectable indicia for closing each respective open application (e.g., causing the system to close the application on the respective connected device on which it is running), as well as a user-selectable indicia for closing all running applications.

User Interface Adjustment, Customization, and Placement Module

In various embodiments, the interactive display system 100 may be configured to reduce user fatigue (e.g., as a result of having to reach for different portions of the interactive display, step back to see different portions of the interactive display, crane the user's neck to see different portions of the display, etc.). The system may, for example, be configured to modify and/or adjust one or more user interfaces on the interactive display device based at least in part on one or more user characteristics. The system may, for example, be configured to modify and/or adjust a position, size, etc. of one or more user interfaces based at least in part on the user of the interactive display device. In some embodiments, the system may be further configured to cause user interfaces to pop out based at least in part on a location of an input provided by the user (e.g., such that the system causes the user interface to appear in a location on the display screen that the user may see the user interface and be able to interact without user interface substantially without moving (e.g., substantially without having to crane their neck, reposition themselves adjacent the interactive display device, etc.).

In some embodiments, the system may be configured to default a position of one or more user interface features with which a user may interact toward a lower portion of the interactive display, for example, to make the user interface features easier to reach for users. As discussed above, particular embodiments of an interactive display device may include a particularly large screen which may, for example, have portions of its display that are difficult to reach due to those portions' height relative to a support surface of the user (e.g., the floor).

In particular embodiments, the system is configured to modify and/or adjust user interface positioning, size, etc. based on, for example: (1) user preference data (e.g., which the system may receive and/or determine from a user's profile when the user logs into or otherwise provides such preference data to the interactive display device using any technique described herein); (2) user selection of on screen indicia indicating a preferred location/size for user interfaces; (3) user physical characteristics (e.g., which the system may determine using one or more cameras to identify the user's height, reach, etc.).

In still other embodiments, the system is configured to: (1) track user touches (e.g., inputs) in one or more particular areas of the interactive display device (e.g., one or more areas above a particular height such as shoulder height); (2) automatically modify a default location of one or more user interfaces based at least in part on detecting more than a threshold number of inputs above the particular height. This may, for example, enable the system to reduce user fatigue by modifying user interface positioning (e.g., by lowering the position) to reduce a number of times that a user has to reach above a particular height (e.g., which may reduce injuries, fatigue, etc.).

Figure 13:
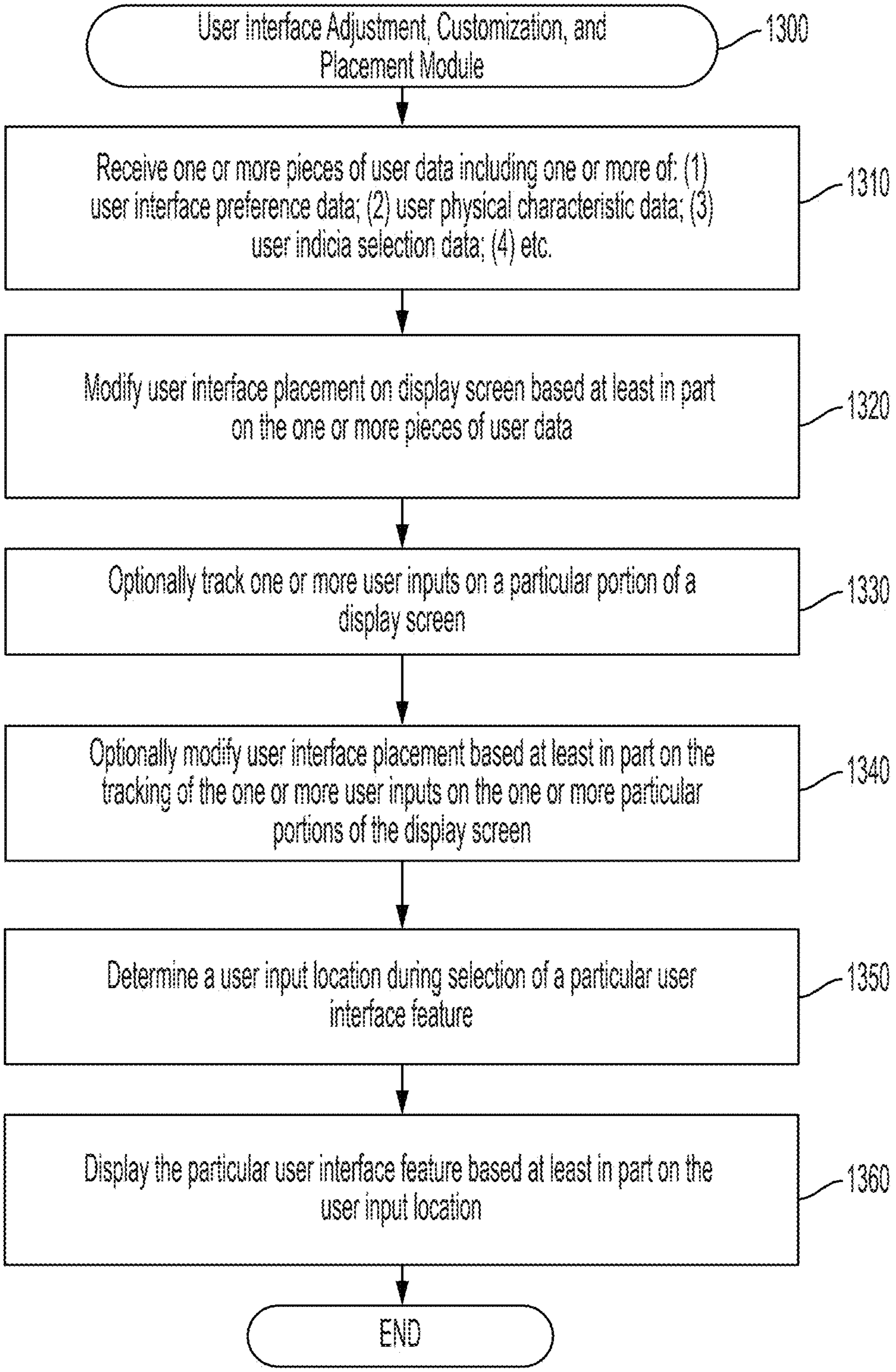
FIG. 13 depicts a flow chart that illustrates various steps executed by a particular embodiment of a User Interface Adjustment, Customization, and Placement Module 1300 that may, for example, be executed by the One or More Interactive Displays 110 of FIG. 1.

Turning to FIG. 13, in particular embodiments, when executing the User Interface Adjustment, Customization, and Placement Module 800, the system is configured to, at Step 1310, receive one or more pieces of user data including one or more of: (1) user interface preference data; (2) user physical characteristic data; (3) user indicia selection data; (4) etc.

The system may, for example, receive user interface preference data in response to a user logging into a particular interactive display (e.g., using any suitable login technique described herein). The system may, for example, be configured to store user interface preference data in association with a user account. The system may be configured to prompt each user to provide user interface location preference data, for example, at any suitable point during an account registration process (e.g., during registration, the first time the user uses an interactive display, etc.). The system may then be configured to store the user preference data in order to apply one or more user settings substantially automatically (e.g., automatically) in response to the user logging into an interactive display device (e.g., at a later time).

In still other embodiments, the system is configured to use one or more imaging devices operatively connected to a particular interactive display device (e.g., one or more cameras) in order to determine a height of a user (e.g., as the user approaches the interactive display board). The system may determine the user's height using any suitable image analysis technique. In particular embodiments, the system is configured to determine a height of any suitable portion of the user's body (e.g., the user's total height, the user's shoulder height, the user's elbow height, etc.). In particular embodiments, the system may be configured to determine, using one or more image analysis techniques a length of one or more of the user's arms. In various embodiments, the system is configured to store height and/or reach data associated with the user in association with a user profile and/or account.

In still other embodiments, the system is configured to provide a user with a selection of one or more selectable indicia on the interactive display screen. The system may be configured to receive user indicia selection data based at least in part on the user's selection of one or more particular indicia. The system may, for example, provide one or more user-selectable indicia at one or more varying positions (e.g., heights) on the interactive display screen. The system may then be configured to receive a user selection of a particular indicium at a particular height.

Continuing to Step 1320, the system is configured to modify user interface placement on a display screen based at least in part on the one or more pieces of user data.

The system may, for example, be configured to store user interface preference data in association with a user account. The system may be configured to prompt each user to provide user interface location preference data, for example, at any suitable point during an account registration process (e.g., during registration, the first time the user uses an interactive display, etc.). The system may then be configured to store the user preference data in order to apply one or more user settings substantially automatically (e.g., automatically) in response to the user logging into an interactive display device (e.g., at a later time).

In particular embodiments, an interactive display device may enable a user to interact with the display using one or more user interfaces. In particular embodiments, the interactive display device may be configured to display various user interfaces at one or more particular default heights. In some embodiments, the system may be configured to modify the position of the various user interfaces based at least in part on the one or more pieces of user data received at Step 1310. For example, the system may be configured to modify a default height of one or more particular user interfaces based at least in part on: (1) stored user preference data; (2) a determined user height and/or reach; and/or (3) a position of a user-selected indicia during the indicia selection process described above. For example, the system may be configured to modify a position of one or more user interface features in response to determining (e.g., using one or more imaging techniques, based on a height of a selected indicia by the user, etc.) that the user is at least a particular height, for example, by modifying the user interface position at least slightly upward on the interactive display device. As another example, the system may be configured to modify a position of one or more user interface features in response to determining (e.g., using one or more imaging techniques, based on a height of a selected indicia by the user, etc.) that the user is less than the particular height, for example, by modifying the user interface position at least slightly downward on the interactive display device.

In still other embodiments, the system is configured to increase and/or decrease a size of one or more user interface features based at least in part on user preference data, user-indicia selection, etc. In still other embodiments, the system is configured to modify a position or configuration of one or more user interfaces based in part on a side-preference of the user (e.g., based at least in part on whether the user is right or left handed).

At Step 1330, the system is configured to optionally track one or more user inputs on one or more particular portions of a display screen (e.g., an interactive display device 110). The particular portions of the display screen may include, for example, a defined 'red zone' that includes one or more areas that may be difficult to reach for the user. The system may define the 'red zone' based at least in part on one or more user characteristics described herein (e.g., arm reach, height, etc.). The system may then optionally modify, at Step 1340, user interface placement based at least in part on the tracking of the one or more user inputs. In such embodiments, the system may be configured to: (1) track user touches (e.g., inputs) in one or more particular areas of the interactive display device (e.g., one or more areas above a particular height such as shoulder height); (2) automatically modify a default location of one or more user interfaces based at least in part on detecting more than a threshold number of inputs above the particular height. This may, for example, enable the system to reduce user fatigue by modifying user interface positioning (e.g., by lowering the position) to reduce a number of times that a user has to reach above a particular height (e.g., which may reduce injuries, fatigue, etc.).

In some embodiments, the system is configured to track the user's input and modify a default position of the one or more interfaces. In other embodiments, the system is configured to track the user's inputs to modify a user-supplied interface positioning preference.

Returning to Step 1350, the system may be configured to determine a user input location during selection of a particular user interface feature. The system may then at Step 1360, display the particular user interface feature based at least in part on the user input location (e.g., and based further in part on one or more user characteristics, cone-of-vision characteristics, etc.). The system may, for example, be configured to modify and/or adjust a position, size, etc. of one or more user interfaces based at least in part on the user of the interactive display device. In some embodiments, the system may be further configured to cause user interfaces to pop out (e.g., spawn) based at least in part on a location of an input provided by the user (e.g., such that the system causes the user interface to appear in a location on the display screen such that the user may see the user interface and be able to interact without user interface substantially without moving (e.g., substantially without having to crane their neck, reposition themselves adjacent the interactive display device, etc.).

In a particular example, the system may be configured to define a cone of vision for the user based at least in part on: (1) one or more cone of vision definitions; (2) a relative height of the input; (3) a relative height of the user; (4) a relative height of the interactive display device; and/or (5) any other suitable factor. The system may, for example, be configured to define a cone of vision for the user that is substantially ovular (e.g., ovular). In various embodiments, the system is configured to define a user's cone of vision based at least in part on a line of sight from the user to a location of a touch input provided by the user. For example, a typical user may have a cone of vision that extends at least about thirty degrees to the left and right, about five degrees upwards, and about forty-five degree downwards to form a substantially ovular (e.g., ovular) cone of vision 2200 as shown in this figure. In various embodiments, the system is configured to pop out any user interfaces within the user's cone of vision, where the user's line of sight is defined as substantially centered on (e.g., centered on) an input location provided by the user (e.g., touch point). In further embodiments, the system may be configured to define the cone of vision based at least in part on a user's reach (e.g., an approximate distance that the user may be standing from the interactive display while providing one or more touch inputs to the interactive display device).

In various embodiments, the system is configured to pop out (e.g., spawn) a user interface feature within a cone of vision defined by a location of a touch input that caused the spawning of the user interface feature. The system may be further configured to define the cone of vision based on one or more of: (1) one or more cone of vision definitions; (2) a relative height of the input; (3) a relative height of the user; (4) a relative height of the interactive display device; and/or (5) any other suitable factor.

In still other embodiments, the system is configured to spawn a user interface feature outside of the defined cone of vision. In such embodiments, the system may be configured to at least initially spawn the user interface feature (e.g., or other visual indication) within the defined cone of vision, and provide a visual indication of the final location of the newly spawned user interface feature. For example, in response to a user selecting a text-entry box, the system may be configured to spawn a keyboard interface in order to enable the user to provide text input via the touch display. In various embodiments, the system is configured cause the interactive display to spawn the on-screen keyboard outside of the cone of vision (e.g., because launching the keyboard within the cone of vision may at least partially block the interface in which the user is attempting to provide text entry). In this example, the system may be configured to display a visual indication of the keyboard interfaces final location by: (1) displaying at least some visual indicator within the defined cone of vision; and (2) tracing a patch from the at least some visual indicator to the final position of the keyboard. The system may be configured to display the transition using any suitable visual animation (e.g., expanding box, arrow, etc.).

In still other embodiments, the system may be configured to at least partially distort (e.g., blur) a view of any portion of the display screen that does not include the most recently accessed user-interface. In this way, the system may be configured to draw a user's eye to a position of the most recently opened interface feature.

User Interface Adjustment, Customization, and Placement User Experience

FIGS. 14-21 depict exemplary screen displays that show particular user interfaces through which a user may provide input to the system that the system may use to determine location and/or sizing for one or more particular user interfaces when displaying the one or more user interfaces to the user.

Figure 14:
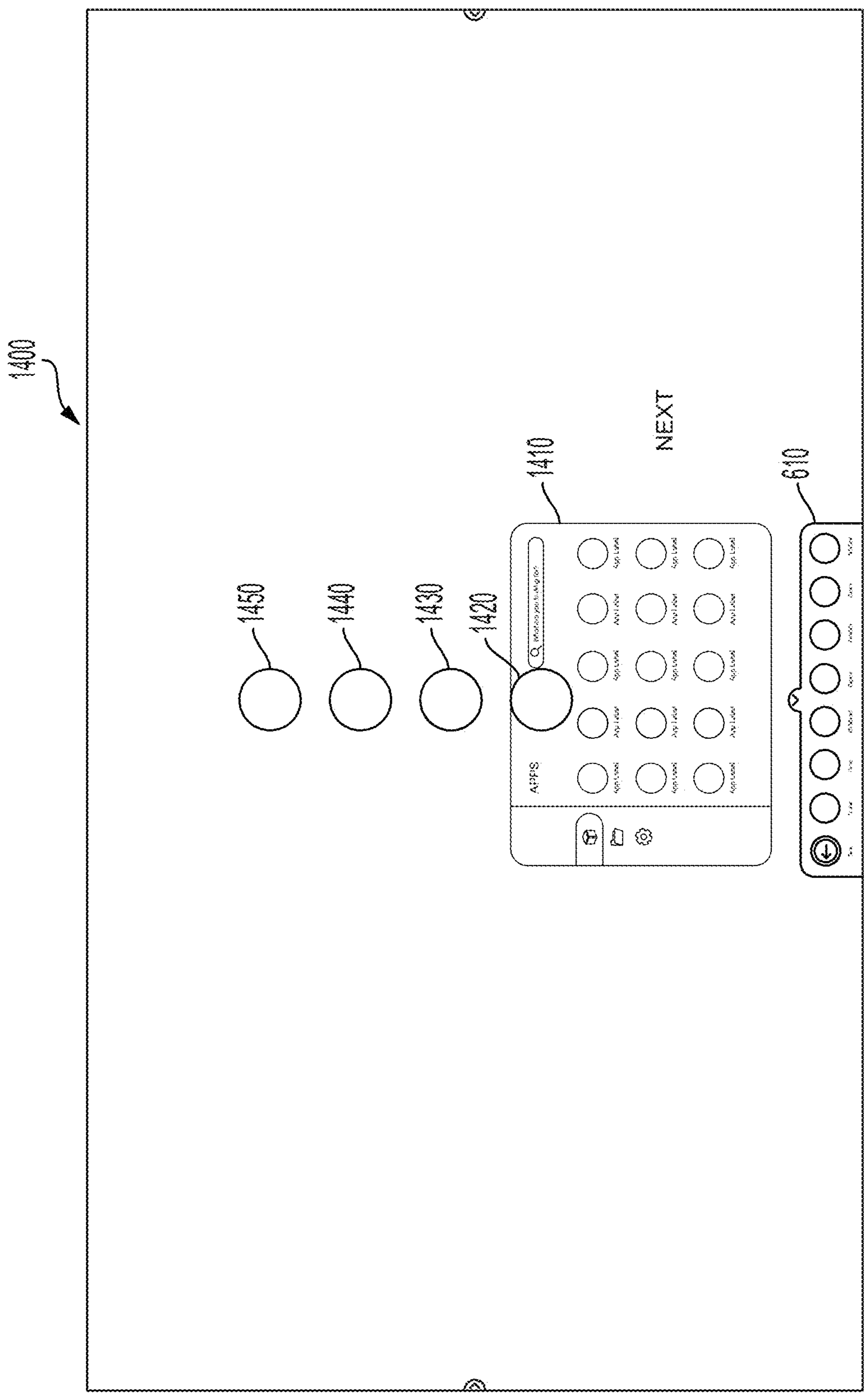
FIG. 14-30 depict exemplary screen displays and graphical user interfaces (GUIs) according to various embodiments of the system, which may display information associated with the system or enable access to, or interaction with, one or more features of the system by one or more users.
Figure 15:
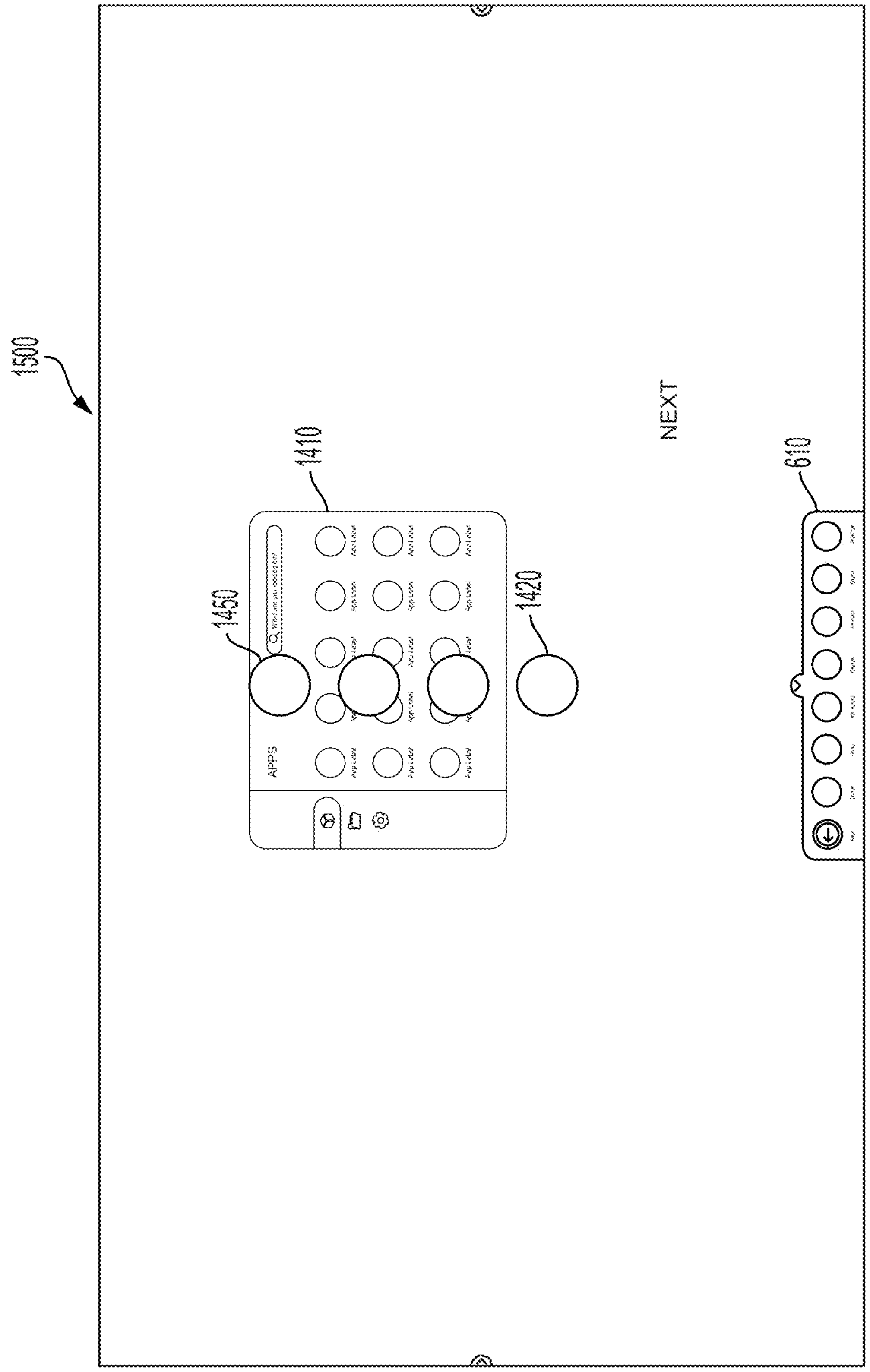

As shown in FIG. 14, the display screen 1400 includes a user interface 1410, and a plurality of user-selectable indicia 1420, 1430, 1440, 1450 at varying heights. As may be understood in light of this disclosure, the system may be configured to instruct the user to select a particular indicium of the user-selectable indicia 1420, 1430, 1440, 1450 that is at a 'comfortable height' (e.g., elbow height, below shoulder height, etc.). The system may then be configured to modify a position of the user interface 1410 based at least in part on the selected user-selectable indicium 1420, 1430, 1440, 1450. For example, in response to the user selecting a relatively low indicium (e.g., 1420), the system may be configured to display user interfaces (1410) at a relatively lower height. In response to the user selecting a relatively low indicium (e.g., 1450), the system may be configured to display user interfaces (1410) at a relatively higher height as shown in FIG. 15. As may be understood from the screen displays shown in FIGS. 14 and 15, the system may be configured to modify a height of user interfaces based on the user-provided indicia-selection. In various embodiments, the system is configured to provide the user with the user-selectable indicia 1420, 1430, 1440, 1450 at varying heights during the user's first use of an interactive display device. In some embodiments, the system may then retrieve the user height preference data and apply the user preferences during subsequent uses of an interactive display device by the user. In some embodiments, when applying user preference settings regarding user-interface positioning (e.g., height, size, orientation, etc.) to a particular interactive display device, the system may be configured to modify one or more interface positions based further in part on an installation height of the particular interactive display device. For example, when applying height settings for one or more user interfaces on the display device, the system may be configured to factor in a height of the display device via which the user initially provided his or her preferences (e.g., using the indicia shown in FIGS. 14 and 15) compared to a height of a second display device that the user uses at a later time.

Figure 16:
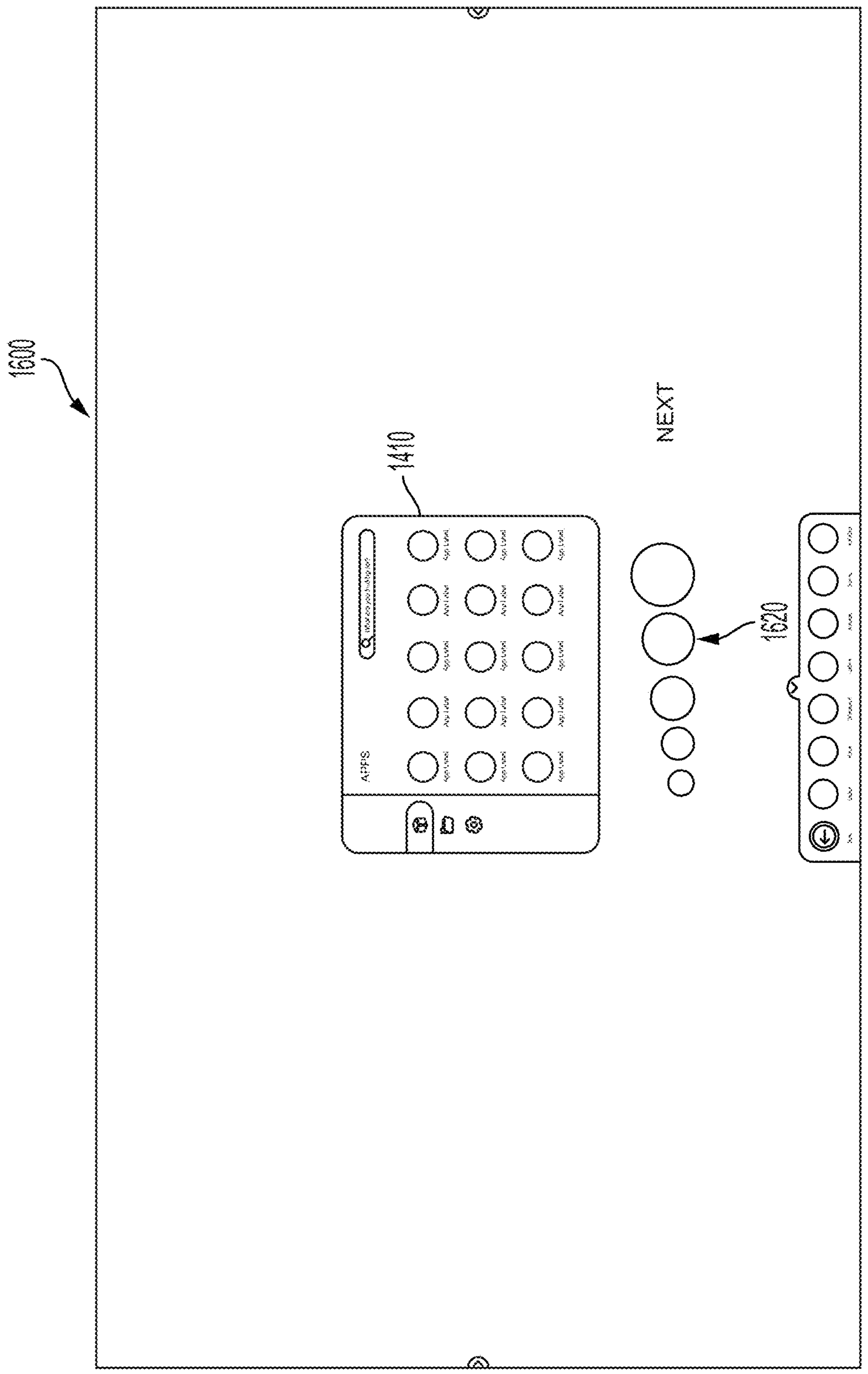
Figure 17:
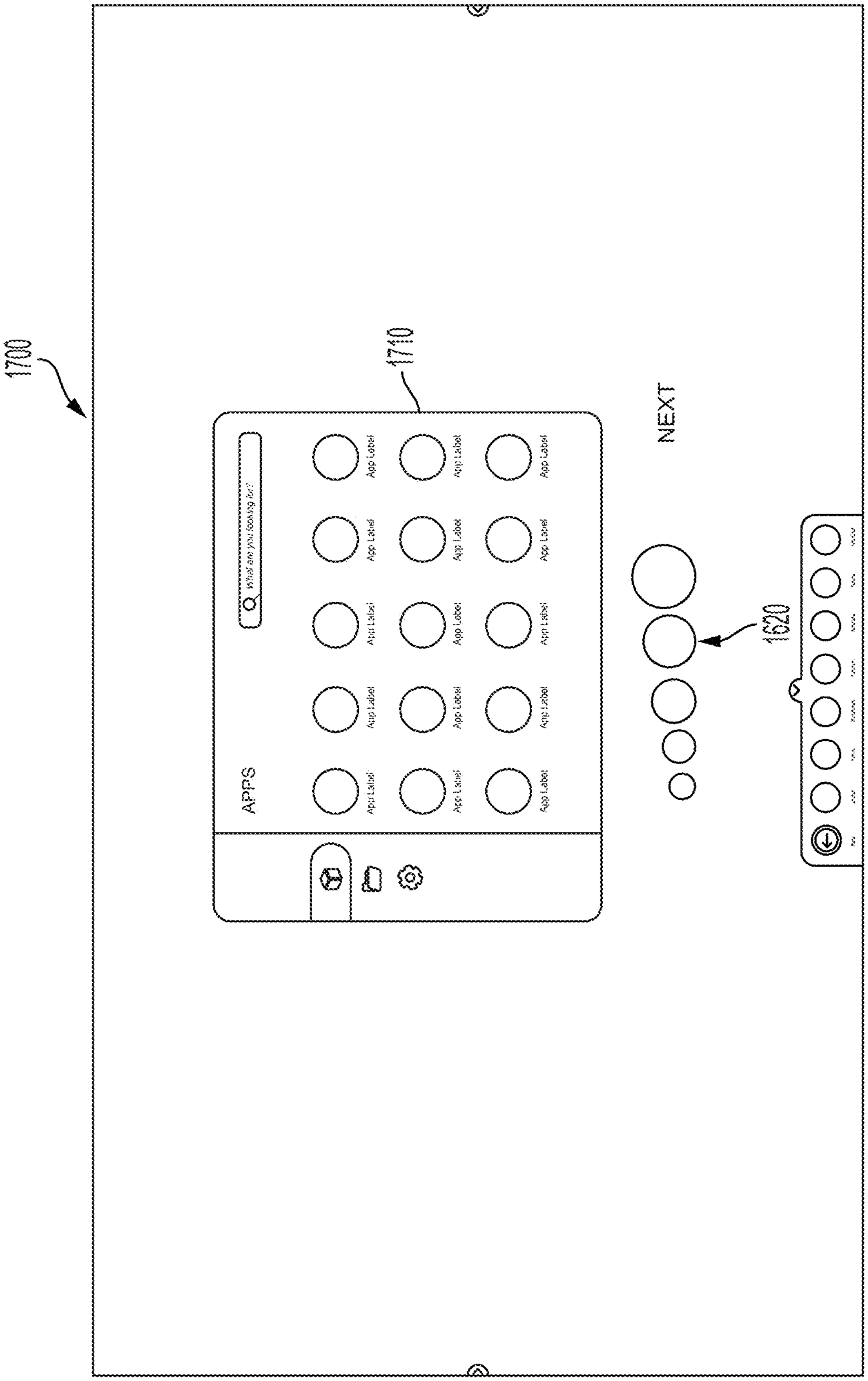

FIGS. 16 and 17 depict screen displays 1600, 1700 that a user may encounter when providing user interface size preferences to the system. The system may, for example, display a user interface 1410 along with a plurality of size selection indicia. As may be understood from FIGS. 16 and 17, selection, by the user, of a different size selection indicium 1620 may cause the system to modify a display size of one or more system interface features (e.g., icons). FIG. 16 depicts a user interface 1410 that the system may provide in response to selection, b the user, of a relatively smaller (e.g., small) size selection indicium 1620. FIG. 17 depicts an exemplary user interface 1720 that the system may be configured to display in response to selection, by the user, of a relatively larger (e.g., large) size selection indicium 1620.

Figure 18:
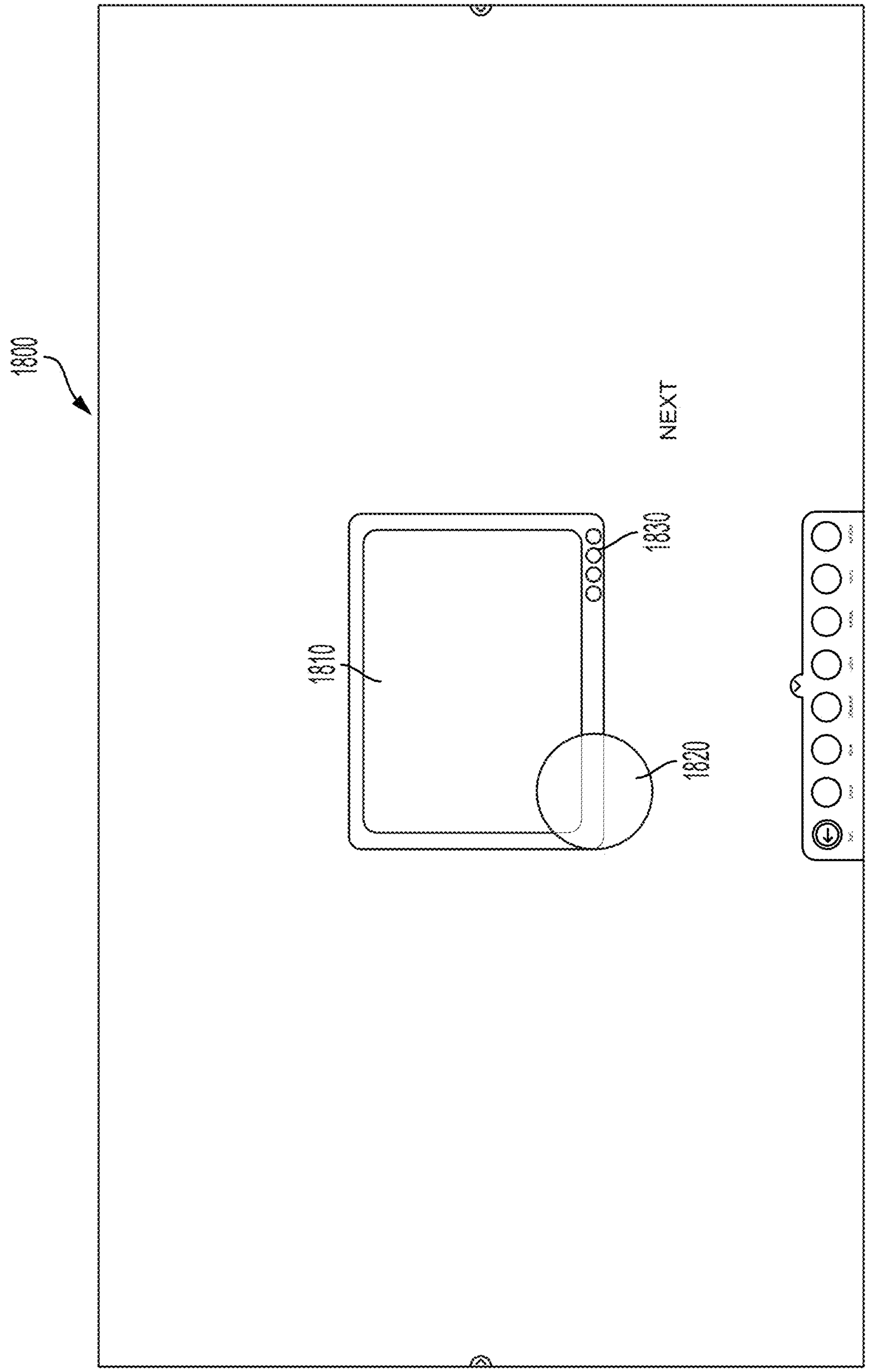
Figure 19:
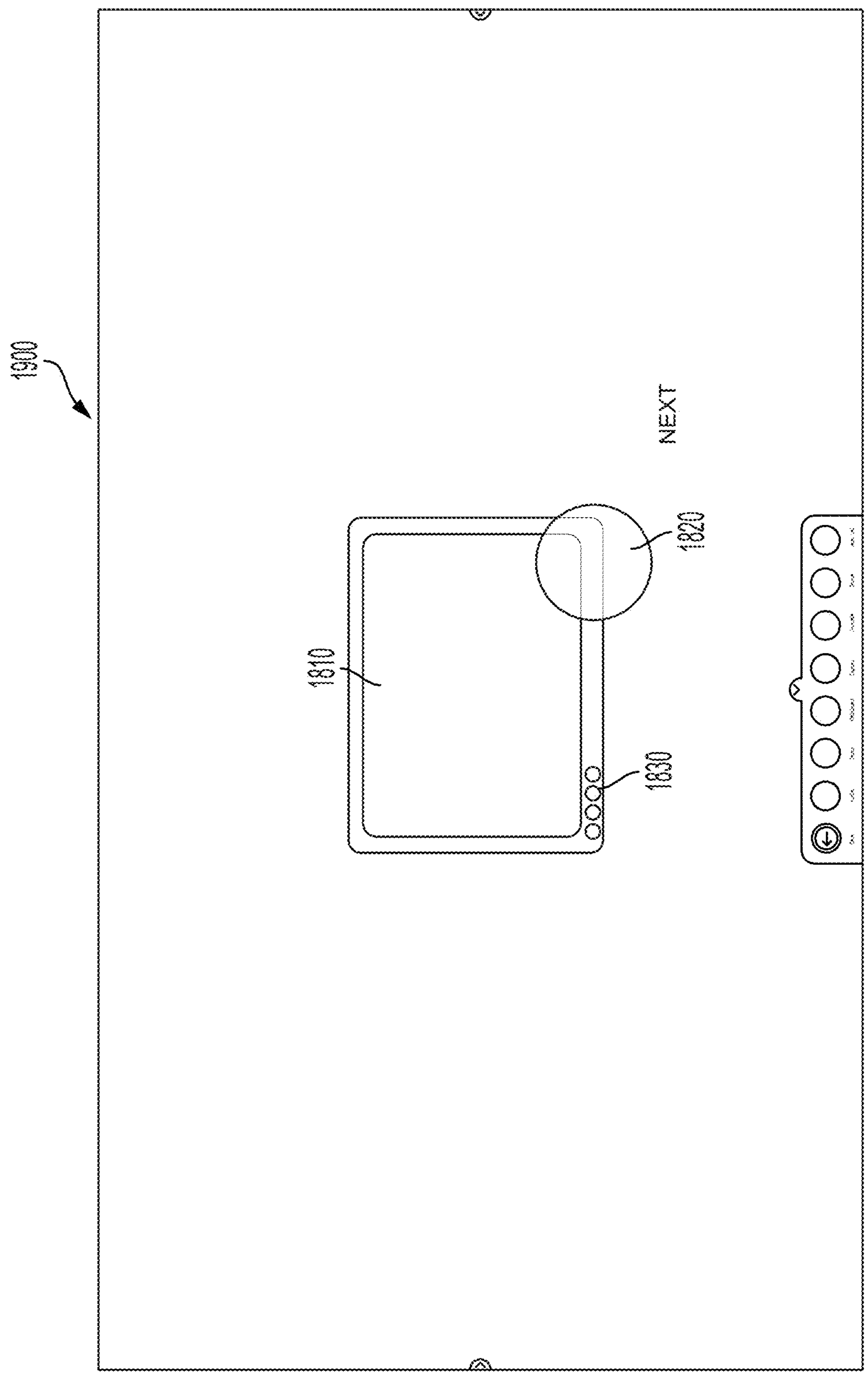

FIGS. 18 and 19 depict exemplary screen displays 1800, 1900 that a user may encounter when providing one or more user interface positioning preferences to the system. As may be understood from FIGS. 18 and 19, a screen display may include a user interface 1800 with one or more user selectable buttons 1830. As may be understood from these figures, the system may be configured to enable a user to modify (e.g., and/or automatically modify) a default position of such user selectable buttons 1830 within the user interface 1810. The sister may, for example, be configured to enable the user to select a different position 1820 for placement of the user selectable buttons 1830 within the user interface. In this way, the system may be configured to provide a user with more accessible user interface features based at least in part on: (1) a preference of the user; (2) a handedness of the user; and/or (3) any other suitable factor.

Figure 20:
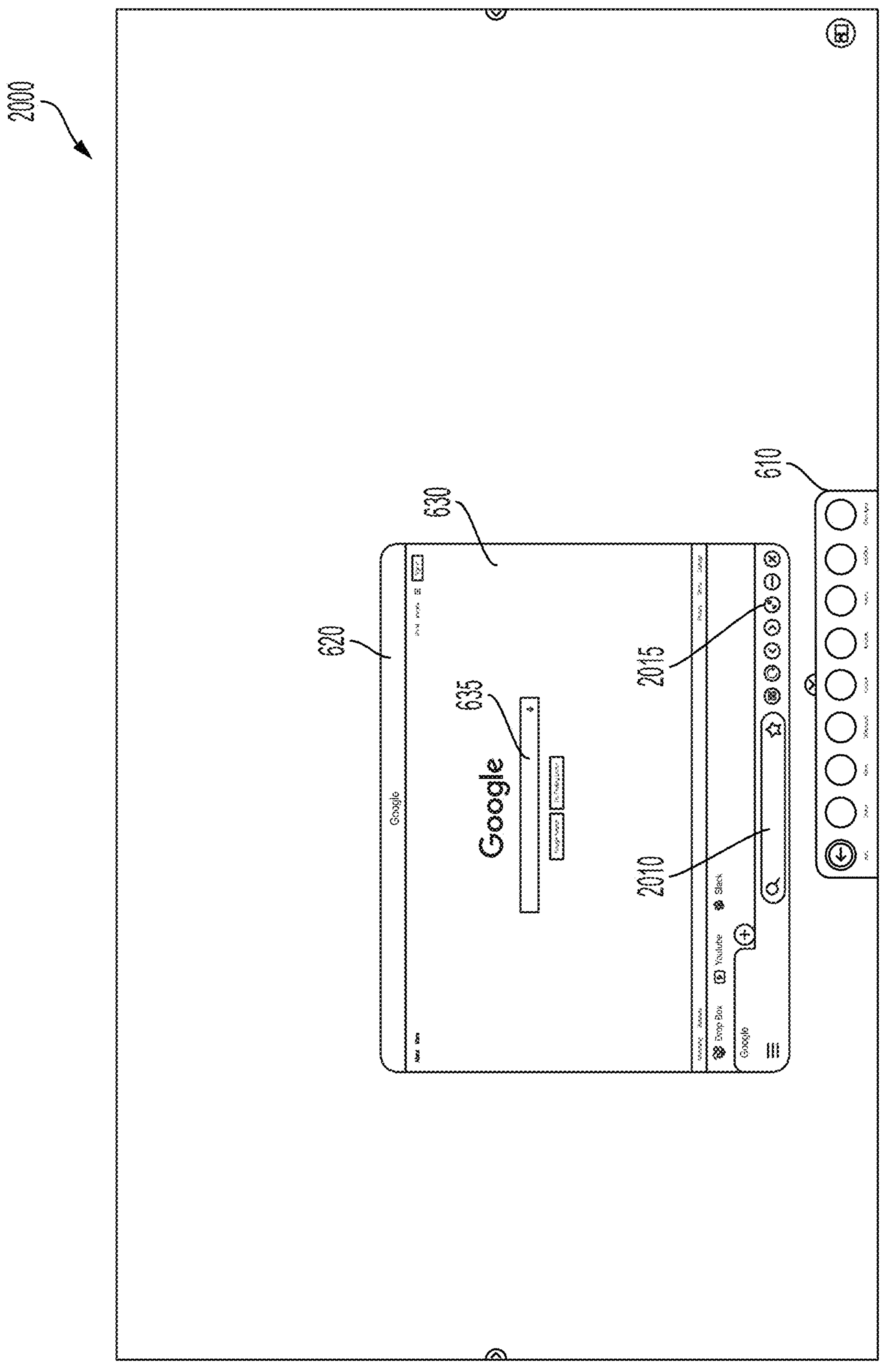

FIG. 20 depicts an exemplary display screen 2000 that a user may encounter while using an interactive display device 110 with a connected computing device (e.g., a Google Chromebox). As may be understood from the embodiment of a user interface 2000 shown in this figure, the user interface includes a menu 610 that is native to the interactive display device (e.g., is running locally on the interactive display device) a windowed interface 630 displaying a software application (e.g., a web browser) that is running on the connected computing device and a wrapper 620 around the windowed interface 630 that is native to the interactive display device. As may be understood form this figure, the wrapper 620 comprises a plurality of user-selectable buttons 2015, which may, for example, be configured to perform any suitable function (e.g., closing the windowed interface, minimizing the user interface, etc.). In some embodiments, the wrapper 620 may comprise a text entry box 2010 which may, for example, be configured to mirror one or more text entry boxes 635 within the windowed interface 630 displaying a software application (e.g., a web browser) that is running on the connected computing device. In this way, the system may be configured to receive text entry box 635 data from the connected computing device and display the text entry data in a text entry box 2010 in the wrapper for easier viewing by the user. The user may, for example, be able to view what the user is typing in the software application being displayed in the windowed interface 630 within the wrapper. In particular embodiments, the system is configured to transmit and receive information to/from both the text entry box 2010 in the wrapper 620 and the text entry box 635 on the software application 630 running on the connected device. In this way, a user may be able to easily view, via the screen display 2000, information via whichever text entry box is more readily visible based on, for example: (1) where the user is standing relative to the interactive display device; (2) how close the user is standing to the interactive display device; (3) etc.

In particular embodiments, the system is configured to interpret one or more inputs received at the wrapper 620 (e.g., that is running on the interactive display device itself) as one or more inputs for the software application 630 running on the connected computing device. The one or more buttons 2015, may, for example, include a back button, favorites button, etc., which may, for example, be configured to cause the connected device to execute certain functionality on the software application 630 running on the connected device (e.g., even though the system receives an input at a location that coincides with an application (e.g., the wrapper 620) running locally on the interactive display device. In this way, the system may be configured to provide, via the wrapper 620, certain functionality via one or more buttons 2015 that are located physically lower on the display (e.g., at a base portion of the wrapper 620).

In various embodiments, as described herein, the interactive display device 110 may be particularly large (e.g., up to about 100 inches measured diagonally or larger). As such, when standing immediately adjacent to the interactive display device 110 (e.g., within arm's reach of the interactive display device 110), it may be difficult for a user to reach and/or see every portion of the display screen 310 or the interactive display device 110. As such, by providing one or more inputs (e.g., a text entry box 2010 and/or one or more buttons 2015) that are configured to transmit functionality or other inputs to the software application 630 running on the connected computing device, the system is configured to enable the user to more easily reach particular functions of the software application 630 (e.g., which may typically be positioned at an upper portion of an interface for the software application 630).

Figure 21:
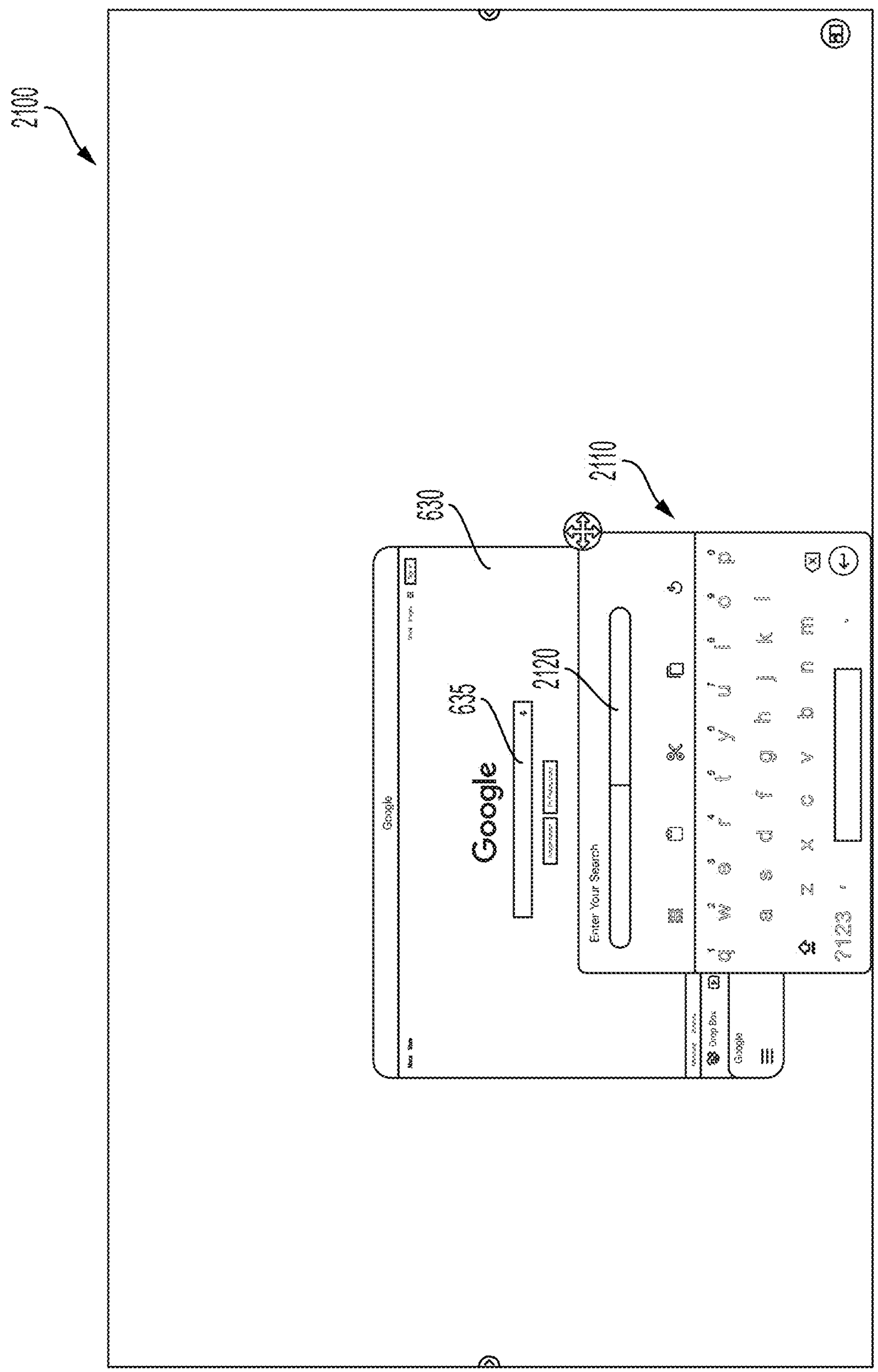

FIG. 21 depicts the screen display 2100 of FIG. 20 with an on-screen keyboard 2110 for inputting text via a text entry box 2120 that the system may be configured to transmit to a text entry box 635 of a software application 630 running on a connected device and being displayed on the interactive display screen. For example, in response to a user selecting a text-entry box 635, the system may be configured to spawn a keyboard interface in order to enable the user to provide text input via the touch display. In various embodiments, the system is configured cause the interactive display 2110 to spawn the on-screen keyboard within the user's cone of vision (e.g., as discussed above). In other embodiments, the system may be configured to spawn the on-screen keyboard outside of the cone of vision (e.g., because launching the keyboard within the cone of vision may at least partially block the interface in which the user is attempting to provide text entry). In this example, the system may be configured to display a visual indication of the keyboard interfaces final location by: (1) displaying at least some visual indicator within the defined cone of vision; and (2) tracing a patch from the at least some visual indicator to the final position of the keyboard. The system may be configured to display the transition using any suitable visual animation (e.g., expanding box, arrow, etc.).

In some embodiments, the on-screen keyboard 620 may comprise a text entry box 2110 which may, for example, be configured to mirror one or more text entry boxes 635 within the windowed interface 630 displaying a software application (e.g., a web browser) that is running on the connected computing device. In this way, the system may be configured to receive text entry box 635 data from the connected computing device and display the text entry data in a text entry box 2120 in the on-screen keyboard 2110 for easier viewing by the user. The user may, for example, be able to view what the user is typing in the software application 630 being displayed in the windowed interface 630 within the on-screen keyboard 2110. In particular embodiments, the system is configured to transmit and receive information to/from both the text entry box 2120 in the on-screen keyboard 2110 and the text entry box 635 on the software application 630 running on the connected device. In this way, a user may be able to easily view, via the screen display 2100, information via whichever text entry box is more readily visible based on, for example: (1) where the user is standing relative to the interactive display device; (2) how close the user is standing to the interactive display device; (3) etc.

Figure 22:
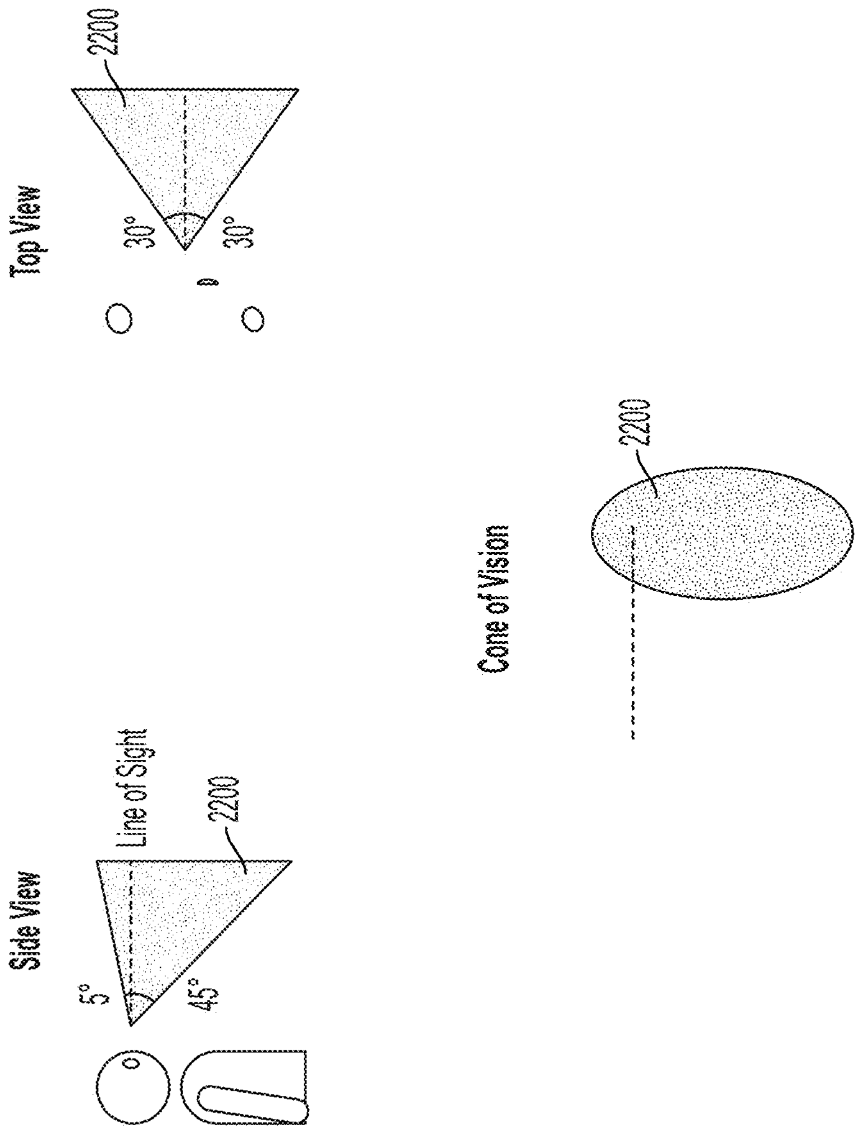

FIG. 22 depicts an exemplary representation of a user's cone of vision. As may be understood from this figure, the system may be configured to define a user's cone of vision based at least in part on a line of sight from the user to a location of a touch input provided by the user. For example, a typical user may have a cone of vision that extends at least about thirty degrees to the left and right, about five degrees upwards, and about forty-five degree downwards to form a substantially ovular (e.g., ovular) cone of vision 2200 as shown in this figure. In various embodiments, the system is configured to pop out any user interfaces within the user's cone of vision, where the user's line of sight is defined as substantially centered on (e.g., centered on) an input location provided by the user (e.g., touch point).

Single Login User Experience

In particular embodiments, the interactive display system is configured to enable a user to login to any particular interactive display in order to apply user-specific settings, preferences, etc. to the particular interactive display, such that the user may walk up to any particular interactive display, log-in, and have the same user experience when using any interactive display.

In various embodiments, each particular interactive display device is configured to run in at least two modes: (1) a logged in mode, in which a user has at least temporarily logged into the device; and (2) a non-signed in mode, in which the interactive display board is configured to run using one or more default settings.

In some embodiments, the system is configured to enable the user to login using a username and password (e.g., associated with a user account that the user has previously created). In some embodiments, the system is configured to enable the user to register a user account on the interactive display device. In still other embodiments, the system is configured to enable the a user to register a user account in any other suitable location (e.g., at a website associated with a developer of the interactive display device, using a software application provided by a developer of the interactive display device, using a different computing device, etc.).

Figure 23:
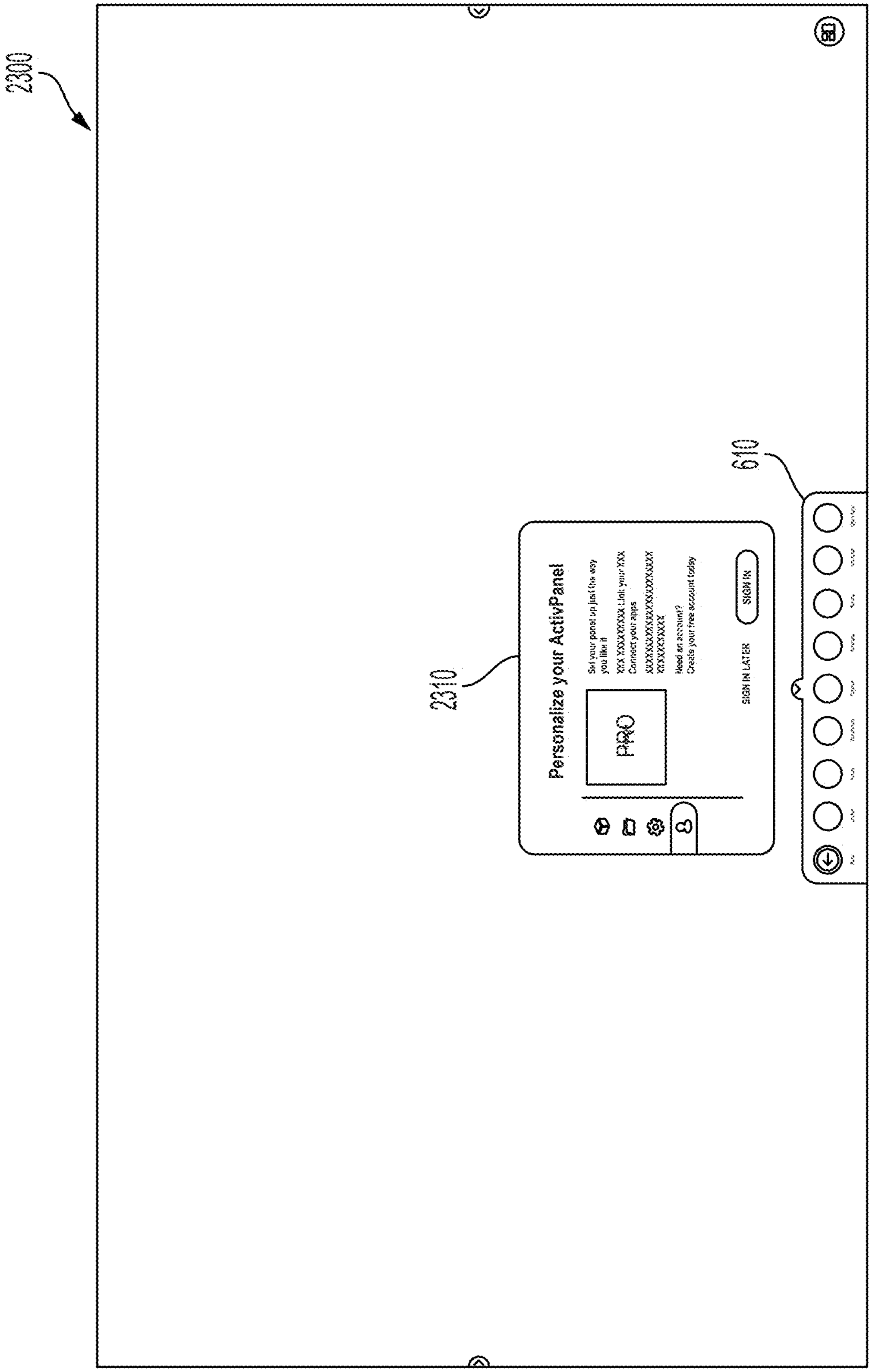

FIG. 23 depicts an exemplary screen display 2300 that a user may encounter when logging into an interactive display device. As may be understood from this figure, the system may, for example, be configured to provide a user interface 2310 via which a user may login to the system (e.g., by logging in directly on the interactive display device).

In some embodiments, the system is configured to enable the user to login using any other suitable technique. For example, in some embodiments, the system is configured to receive identifying data (e.g., profile data) for a user via one or more remote computing devices (e.g., a mobile computing device) via which the user is logged into a user account. For example, the system may be configured provide a companion application for installation on a mobile computing device (e.g., smartphone) associated with the user. In response to determining that a user is attempting to login to the interactive display device using a logged in mobile computing device (e.g., or other suitable computing device), the system may be configured to automatically log the user into the interactive display device as well. For example, the system may be configured to receive data wireless from the mobile computing device (e.g., via Bluetooth, NFC, etc.) indicating that the user is logged into the companion application.

Figure 24:
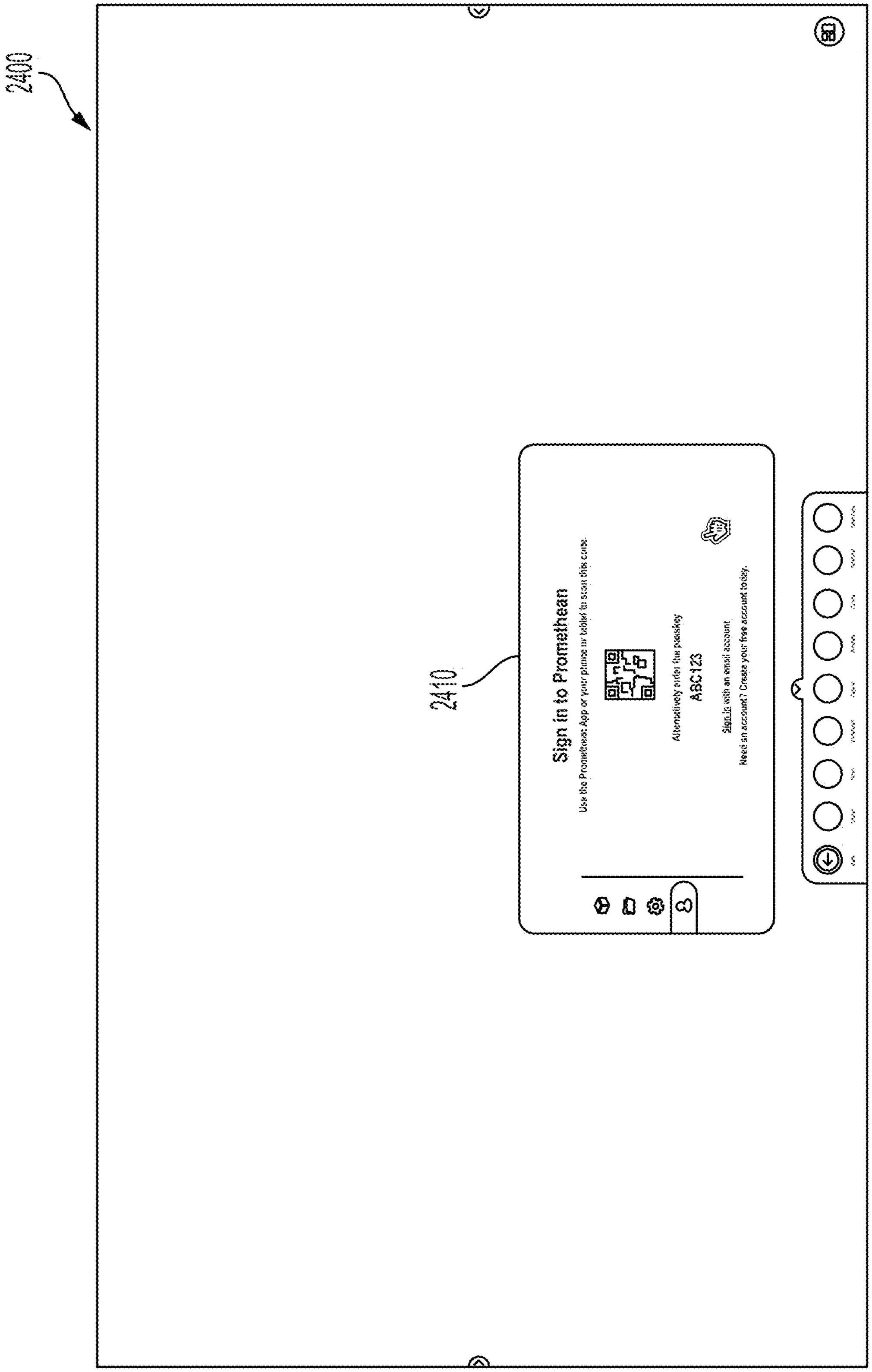

In still other embodiments, the system is configured to automatically log the user into the interactive display device in response to the user scanning a machine-readable indicium on the interactive display device using a companion application to which the user is logged in on a remote computing device (e.g., smart phone). For example, as shown in FIG. 24, the system may display a user login interface 2410 that includes a machine-readable indicium (e.g., a QR code, linear barcode, or any other suitable machine-readable indicium). The user may then, using their remote computing device having at least one imaging device (e.g., camera), scan the machine-readable indicium. In response to receiving the scan of the machine-readable indicium, the interactive display system may be configured to identify the interactive display device based on the machine-readable indicium and automatically log the user into the interactive display device. In some embodiments, the machine-readable indicium is unique to the interactive display device.

In still other embodiments, the system is configured to log the user into the interactive display device using any other suitable technique such as, for example: (1) one or more facial recognition techniques (e.g., using one or more imaging devices operatively connected to the interactive display device); (2) one or more suitable voice recognition techniques (e.g., suing one or more microphones operatively connected to the interactive display device; and or (3) any other technique for identifying the user in order to retrieve account/profile/preference data for the user.

In particular embodiments, in response to the system login a particular user into a particular interactive display device, the system is configured to: (1) retrieve one or more settings and/or preferences associated with the user; (2) apply the one or more settings and/or preferences to the particular interactive display device. The settings and or preferences may include, for example: (1) one or more user interface settings discussed herein; (2) brightness and other hardware settings; (3) volume settings, etc. In some embodiments, the system is configured to retrieve account data for one or more accounts connected to the interactive display user account of the user. For example, the system may be configured to enable the user to associate one or more third party accounts with the user's interactive display device account. The system may be configured to store one or more third party account credentials in association with the user's account, and automatically log the user into one or more third party services or applications available on the interactive display device. For example, the system may be configured to automatically log the user into a cloud storage account on the interactive display device and be configured to make one or more files from the user's associated cloud storage account available to the user via the interactive display device while the user is logged into the interactive display device.

In particular embodiments, while the user is logged into the interactive display device, the system is configured to provide one or more pieces of functionality via a companion application installed on a secondary computing device (e.g., mobile computing device). For example, using the companion application described above that the system may be configured to use to enable the user to easily log into an interactive display device, the system may be configured to provide one or more inputs to the interactive display device via the connected companion application. The system may, for example, be configured to transmit user interface selections and inputs made via the companion application to the interactive display device in any suitable manner (e.g., via a suitable wireless and/or wired connection). In some embodiments, the companion application may, for example, provide an on-screen keyboard for entering text on the interactive display device, or any other suitable functionality. In some embodiments the companion application is configured to provide functionality based at least in part on a software application that the user is currently using on the interactive display device (e.g., whether the application is running natively on the interactive device or on one or more connected computing devices as described herein).

In some embodiments, the system is configured to substantially automatically log the user into one or more connected computing devices in response to the user logging into the interactive display device as well. For example, the system may be configured to automatically log the user into a third-party computing device (e.g., using third party user profile and/or account data that the system stores in association with the user's interactive display device account). For example, a user may link their google account to their interactive display device account such that the system may automatically log the user into a google Chromebox operatively connected to the interactive display device in response to the user logging into the interactive display device.

Figure 25:
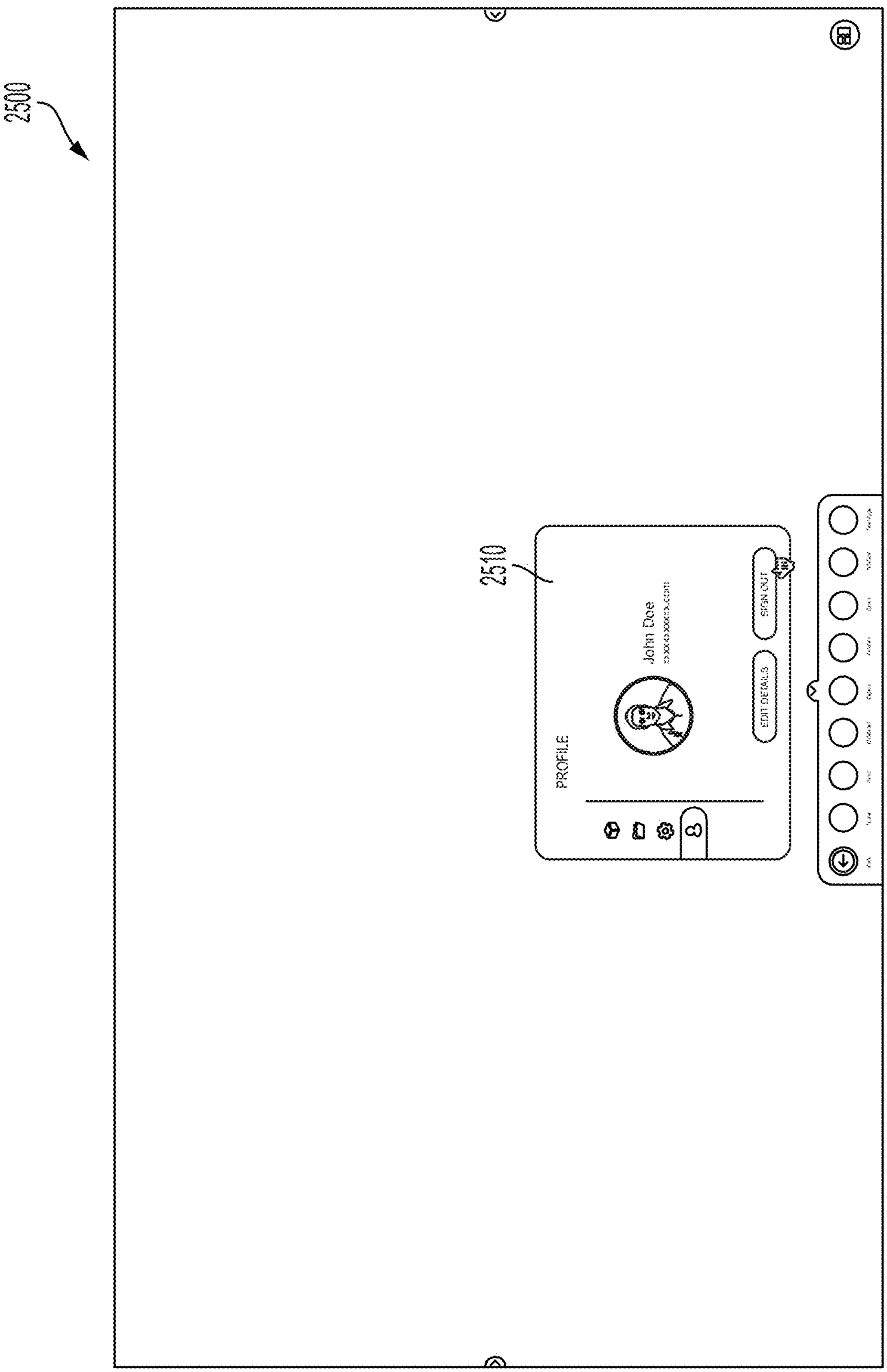

FIGS. 23-25 depict exemplary user interfaces which a user may encounter when logging into a particular interactive display. The interactive display may, for example, be configured to: (1) receive user identifying data; (2) optionally authenticate the user (e.g., by requiring the user to enter a password or other unique identifier; (3) in response to receiving the user identifying data and optional authentication data, retrieve user profile data (e.g., from one or more remote servers via a network); (3) apply the user profile data to one or more settings of the interactive display; (4) optionally automatically login to one or more connected computing devices using the user profile data; and/or (5) optionally modify one or more features and/or functionality of the interactive display based at least in part on a role of the logged in user (e.g., whether the user is a teacher, student, administrator, etc.).

In particular embodiments (e.g., in an educational setting), enabling a user to easily walk up to an interactive display device and easily log in, have access to any applications that the user typically uses, have access to any files that the user may need, etc. In various embodiments, the system is configured to enable a user to walk up to any interactive display device and enjoy the same experience in terms of applications, content, preferences, etc. available via the.

In some embodiments, the system is configured to substantially automatically (e.g., automatically) log users out according to a particular schedule (e.g., at the same time every day, such as in the evening). In other embodiments, the system is configured to enable a user to log out once the user is finished using the interactive display device. In some embodiments, logging out may cause the system to automatically log the user out of any third-party services and/or connected devices as well.

In various embodiments, the system is configured to modify one or more functions of the interactive display device based at least in part on a role of the logged in user. For example, the system may modify functionality based on whether the logged in user is a teacher, student, IT person, administrator, etc.

Casting User Experience

Figure 26:
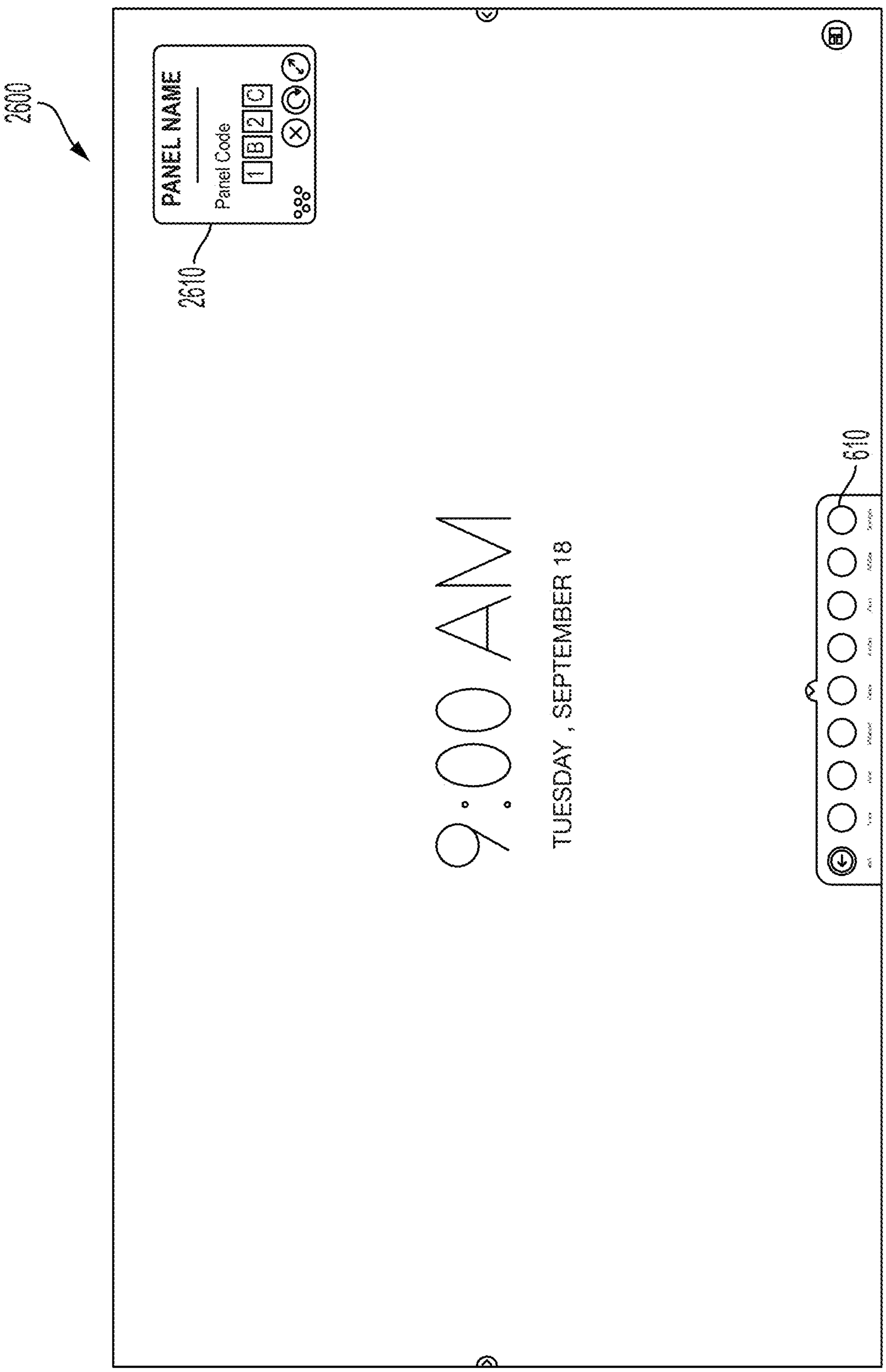
Figure 27:
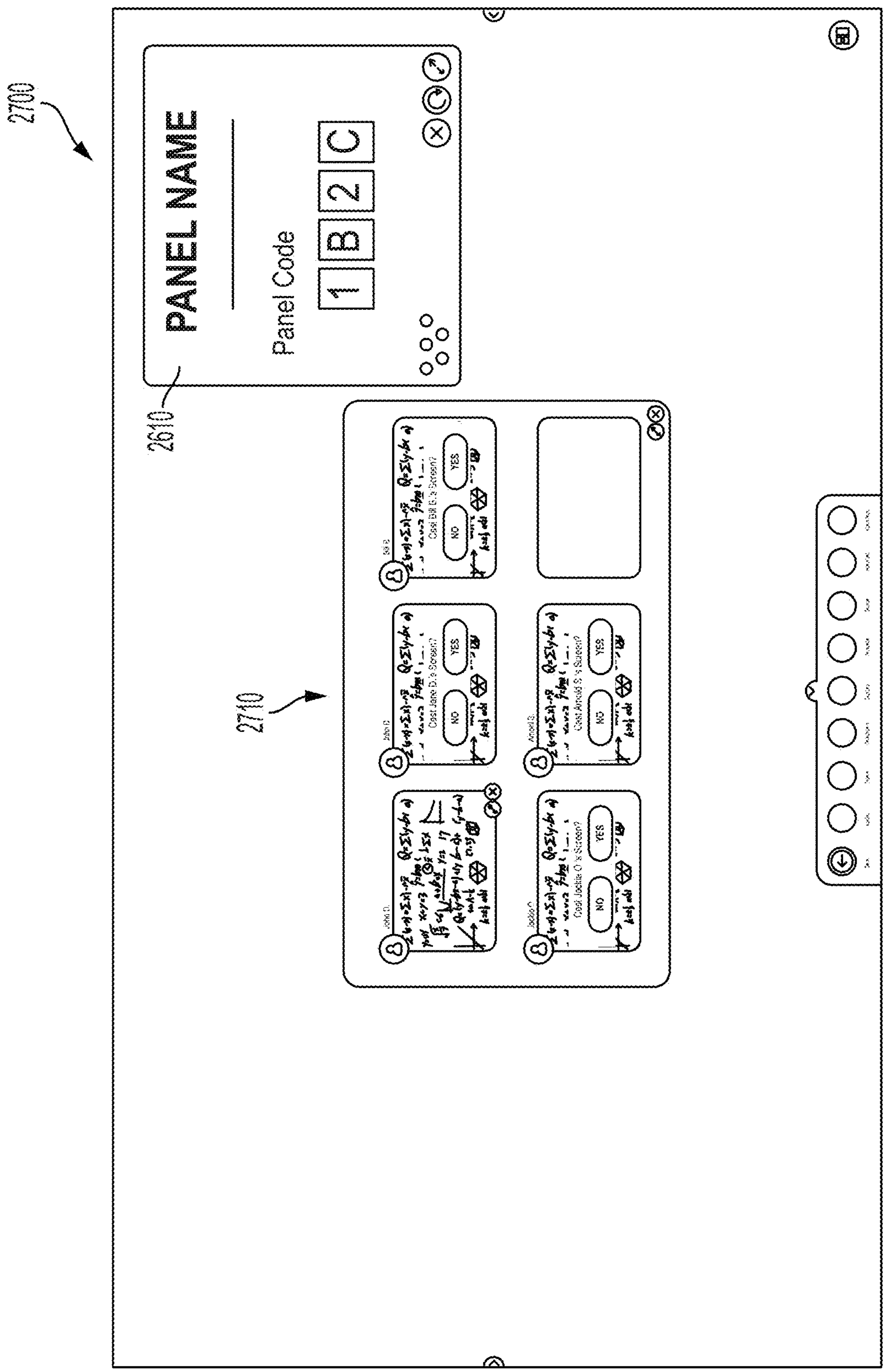

FIGS. 26 and 27 depict exemplary screen displays 2600, 2700 that a user may encounter while using the interactive display device 110 to cast a remote computing device 150 to the interactive display device 110. During casting, the system may be configured to cause a wireless touchback from the interactive display device 110 to the remote computing device 150 that is casting to the interactive display device 110, while the remote computing device 150 is casting to the interactive computing device. For example, a student may cast a worksheet that the student completed from their tablet computer to the interactive display device (e.g., via any suitable network described herein).

In some embodiments, the system is configured to cast (e.g., wirelessly) a remote computing device on at least a portion of the display screen of the interactive display device. I various embodiments, the system is configured to transfer data from the remote computing device to the interactive display device via a software application on the remote computing device. The system may, for example: (1) provide a unique interactive display device identifier; (2) receive the unique interactive display device identifier at a remote computing device (e.g., via a software application on the remote computing device); and (3) in response to receiving the unique interactive display device identifier at the remote computing device initiate a casting of at least a portion of a display screen of the remote computing device (e.g., or one or more software applications running on the remote computing device) from the remote computing device to the interactive display device. As shown in FIG. 26, the system may, for example, display a unique panel code on the interactive display device. A user may then enter the panel code on a remote computing device to initiate casting.

In some embodiments, the system is configured to display a live preview of one or more devices that are attempting to cast to a particular interactive display device. As shown in FIG. 27, the system may display a thumbnail of each of a plurality of devices attempting to cast to the interactive display device. A user of the interactive display device may then select a particular remote device for casting.

In various embodiments, the system is configured to facilitate a connection between the interactive display device and each particular remote computing device using any suitable technique (e.g., a wired and/or wireless connection, via a direct connection, over a network, using an ad-hoc network, etc.).

Additional User Experience Description

Figure 28:
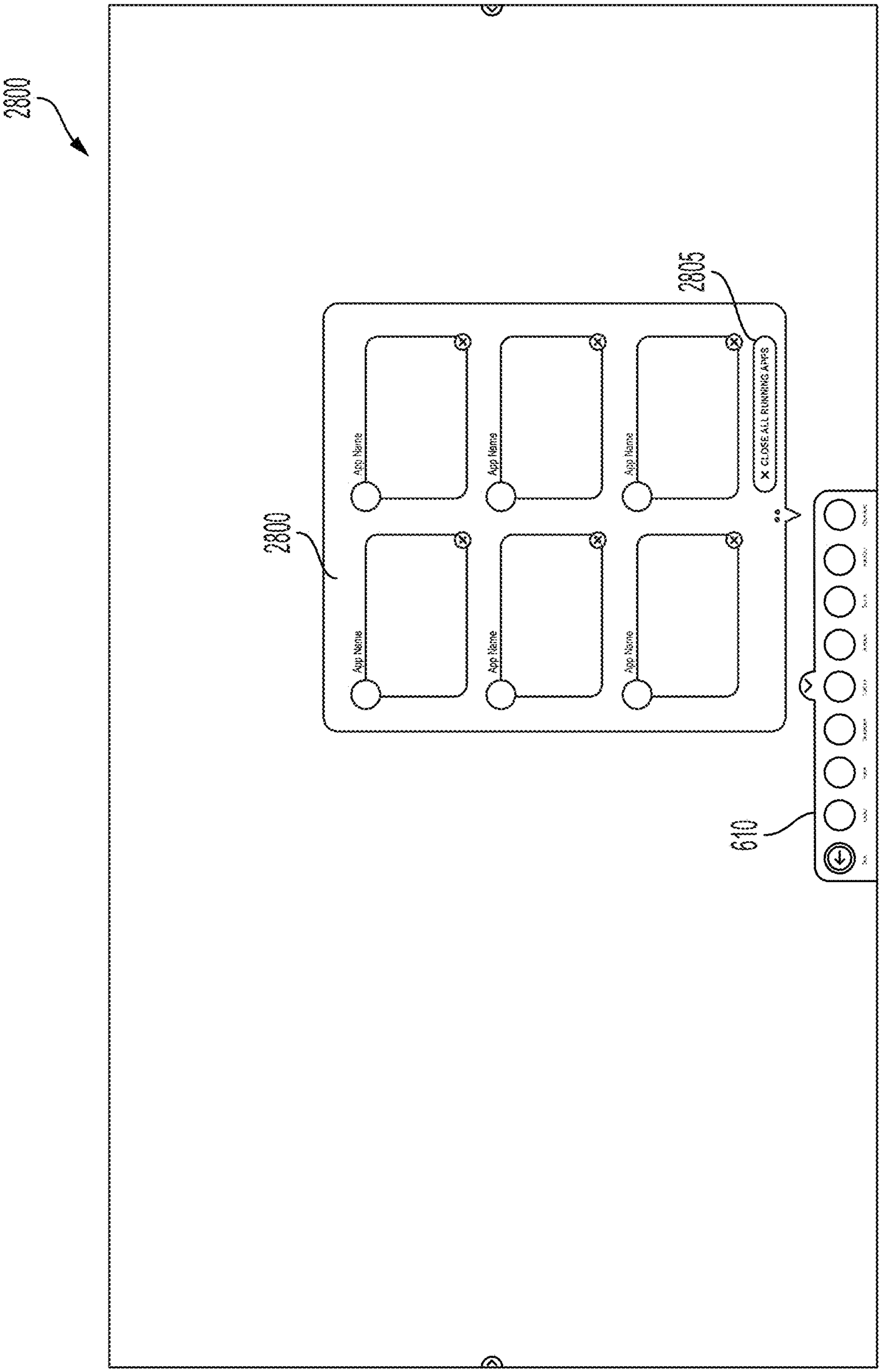
Figure 29:
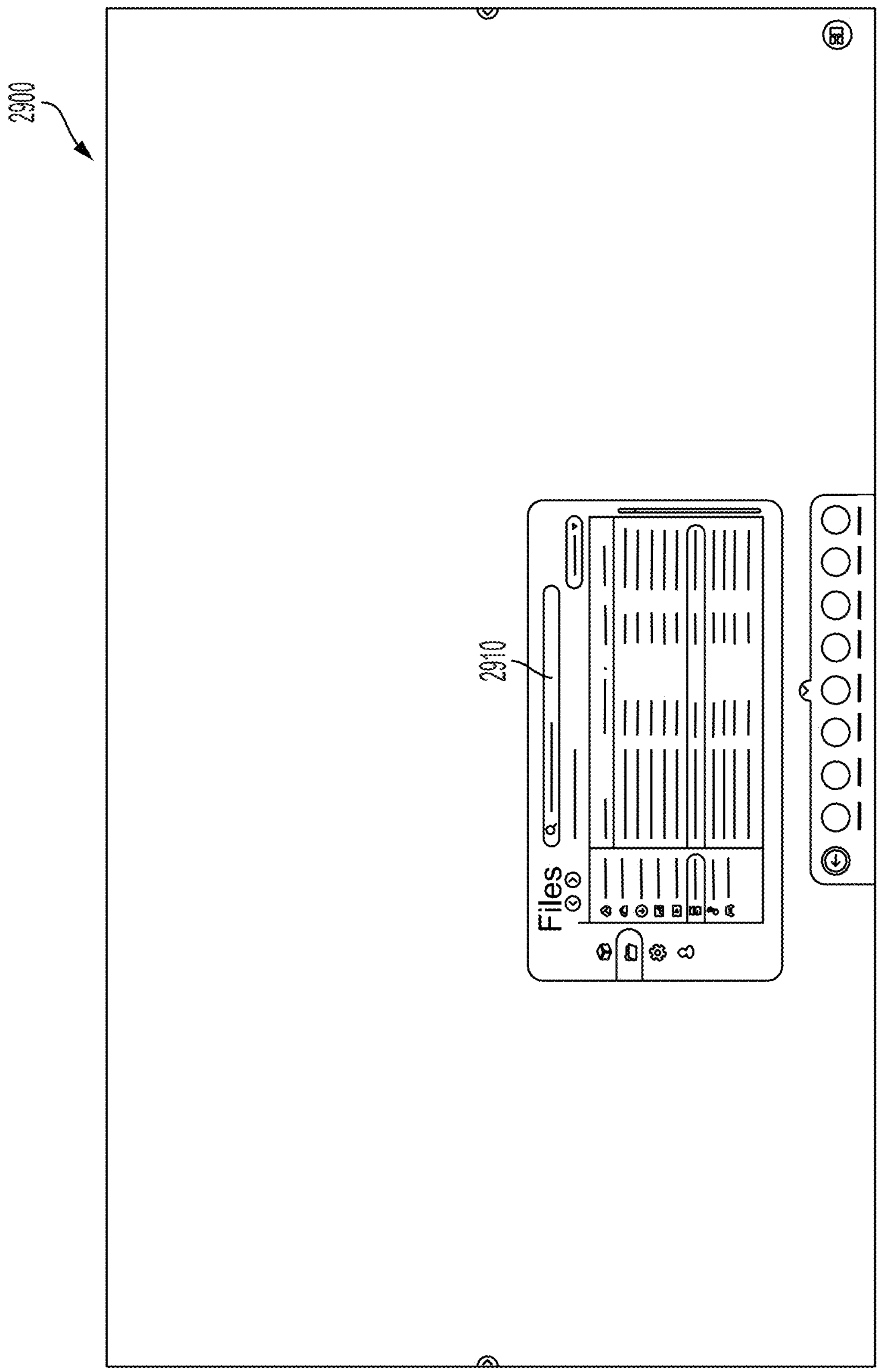
Figure 30:
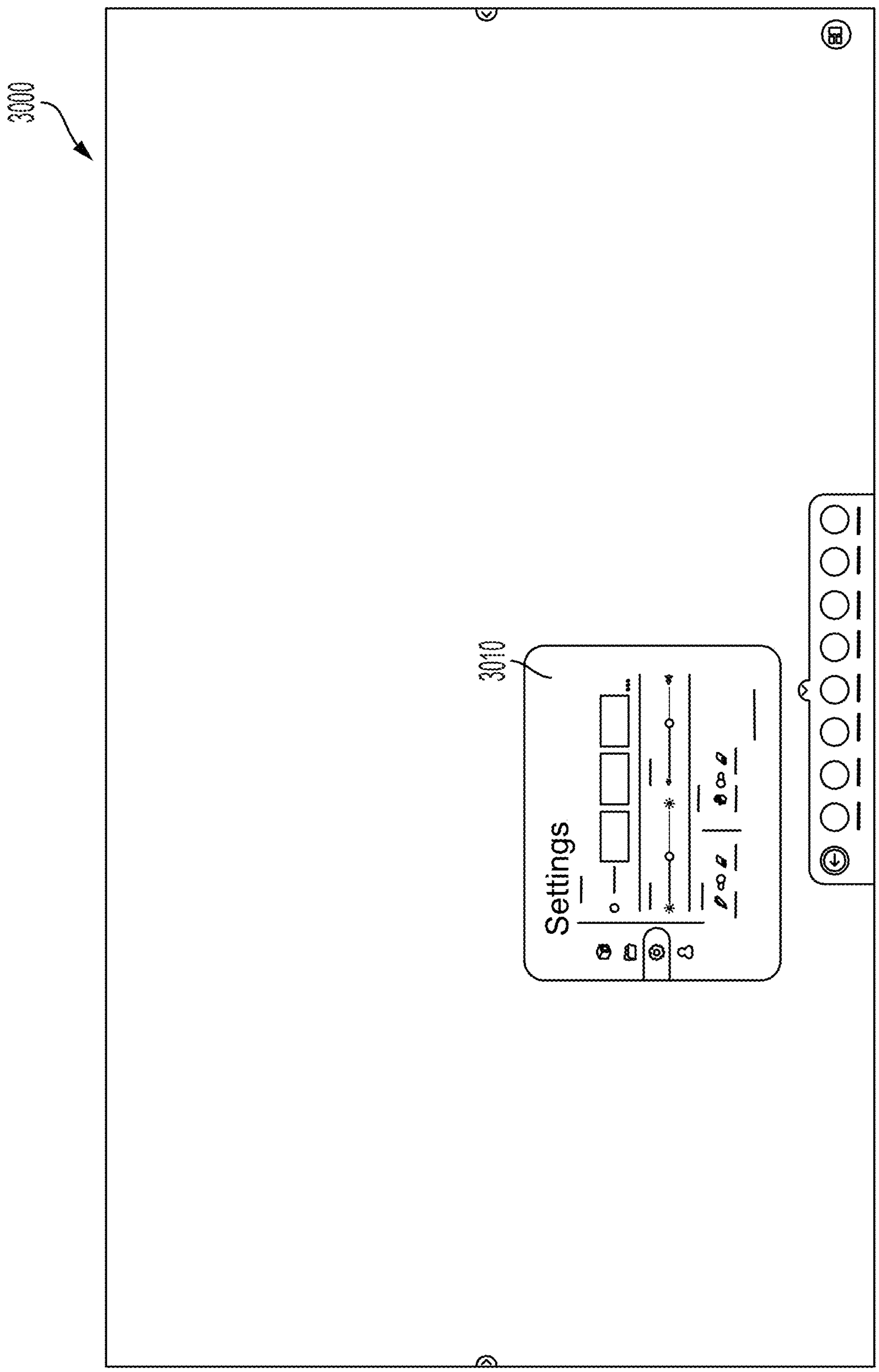

FIGS. 28-30 depict exemplary screen displays that a user may encounter when accessing various other features of the system, these features are discussed more fully below.

FIG. 28 depicts an exemplary screen display 2800 that a user may encounter while using the interactive display device 110 with at least one connected computing device (e.g., a Google Chromebox). As may be understood from FIG. 28, the screen display 2800 includes a menu 610 via which a user may access various features, software, files, etc. on the interactive display device. The screen display 2800 further includes an open applications menu 2800 (e.g., which may be accessible via the menu 610) that shows a current display of each respective application running on the interactive display or any connected computing device. As may be understood from this figure, the open applications menu 2800 may display a substantially current (e.g., current) view of what is currently being displayed by each respective open application. As may be understood from the user interface shown in FIG. 28, a user may select a particular application from the open applications menu 2800 to substantially seamlessly (e.g., seamlessly) switch to the selected application (e.g., and to the connected device on which the selected application is running). In some embodiments, the system is configured to enable the user to select multiple applications to display simultaneously on the interactive display device (e.g., on different respective portions of the interactive display screen such as in a windowed or other suitable environment). As such, the system may be configured to display multiple applications running on multiple different connected devices. The open applications menu 2800 may further include user-selectable indicia for closing each respective open application (e.g., causing the system to close the application on the respective connected device on which it is running), as well as a user-selectable indicia for closing all running applications 2805.

FIG. 29 depicts an exemplary screen display 2900 that a user may encounter while using the interactive display device 110. As may be understood from FIG. 29, the screen display 2900 includes a menu 610 via which a user may access various features, software, files, etc. on the interactive display device. The screen display 2900 further includes a file locker menu 2910 (e.g., which may be accessible via the menu 610). In the embodiment shown in this figure, the system may be configured to aggregate a plurality of files store: (1) locally on the interactive display device; (2) remotely in one or more remote storage locations; (3) in a cloud storage or similar third-party file storage service; (4) etc. In various embodiments, the system is configured to enable the user to access any such files via the file locker menu 2910 show in FIG. 29.

FIG. 30 depicts an exemplary screen display 3000 that a user may encounter while using the interactive display device 110. As may be understood from FIG. 30, the screen display 3000 includes a menu 610 via which a user may access various features, software, files, etc. on the interactive display device. The screen display 3000 further includes a settings menu 3010, which the user may utilize to, for example: (1) modify one or more settings of the interactive display device; (2) modify one or more settings of one or more of the connected computing devices; (3) etc.

In some embodiments, the system is configured to automatically modify system settings (e.g., and one or more connected device settings) in response to a user logging into the interactive display device as discussed herein). In response to a user modifying one or more settings vie the settings menu 3010, the system may be configured to modify profile data (e.g., preference data) associated with a user account and/or profile of the user to reflect the changes (e.g., such that the system may automatically implement similar changes to the settings on future logins by the user).

Software Availability Curation Module

In particular embodiments, the interactive display system 100 is configured to provide a plurality of available software applications (e.g., through an app store or similar catalog of available software applications) that includes first party software (e.g., provided by a manufacturer of the interactive display device) as well as approved and/or vetted third party applications for use on the interactive display devices. In particular embodiments, the system is configured to provide an administrator or other authorized user to select particular applications (e.g., and/or content) from the listing of available software applications to make available on one or more interactive display devices for which they are the administrator (e.g., one or more devices within a particular school, school district, etc.). In particular embodiments, the system is configured to generate a curated application store based on the administrator (e.g., or other authorized user) selections that include only those applications selected by the administrator. An individual user of an interactive display that is administrated by the administrator may then select from the curated listing of approved applications for use on a particular interactive display device. In this way, the system may be configured to provide a whitelist of applications from a larger catalog of applications for selection by users (e.g., teachers) in a specific group (e.g., in a specific school, school district, county, city, etc.).

Figure 31:
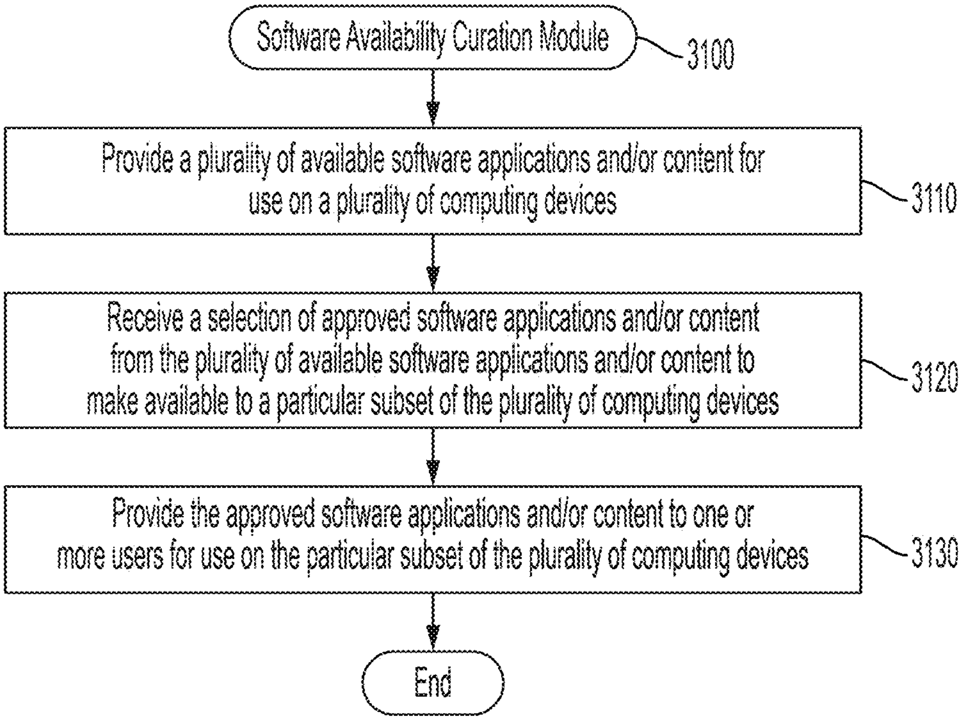
FIG. 31 depicts a flow chart that illustrates various steps executed by a particular embodiment of a Software Availability Curation Module 3100 that may, for example, be executed by the One or More Remote Servers 130 of FIG. 1.
Figure 32:
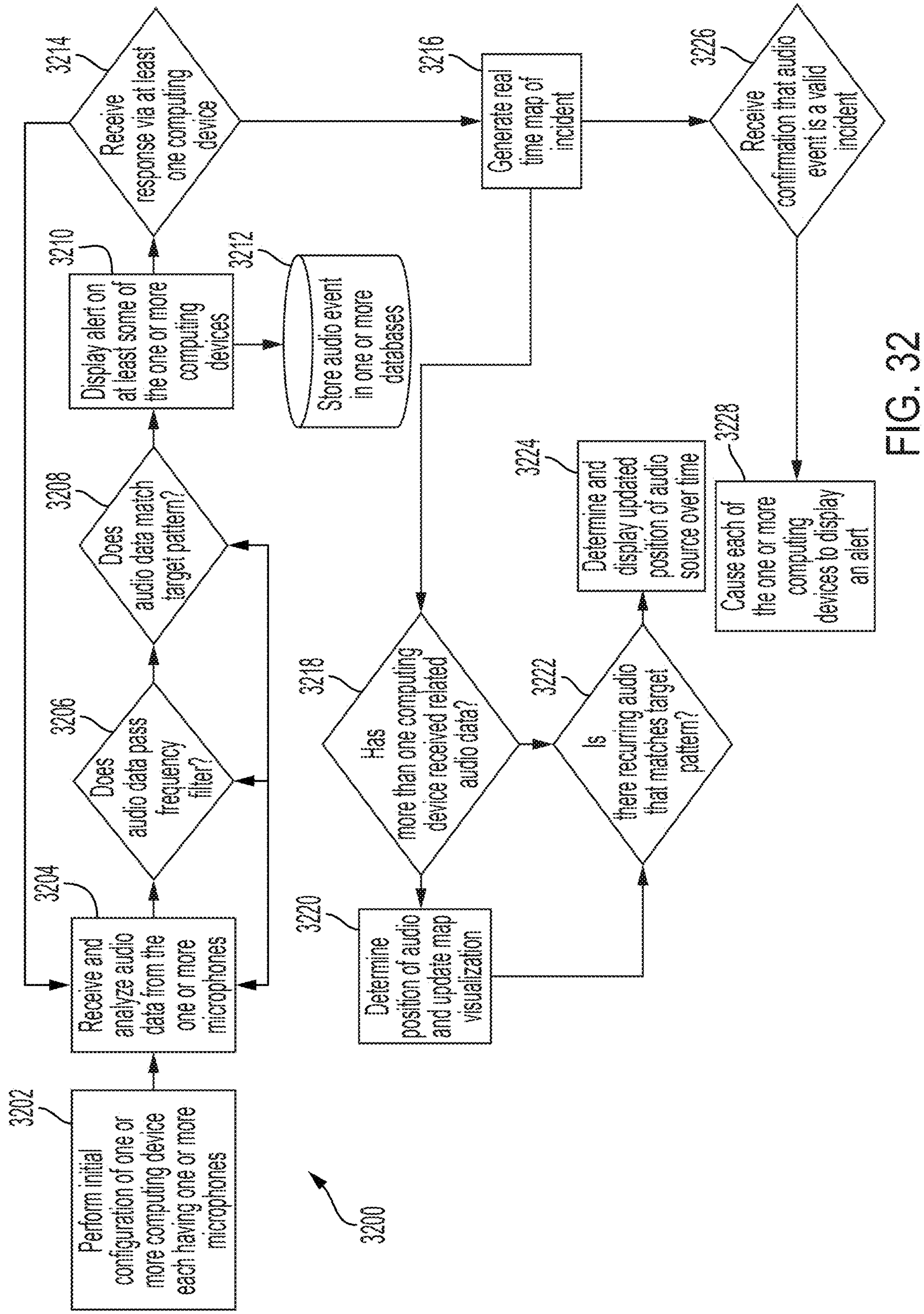
FIG. 32 depicts a flow chart that illustrates various steps executed by a particular embodiment of a Situational Environmental Analysis Module 3100 that may, for example, be executed by the One or More Interactive Displays 110 and/or the One or More Remote Servers 130 of FIG. 1.

Turning to FIG. 31, in particular embodiments, when executing the Software Availability Curation Module 3100, the system is configured to, at Step 3110, provide a plurality of available software applications and/or content for use on a plurality of computing devices.

Next, at Step 3120, the system is configured to receive a selection of approved software applications and/or content from the plurality of available software applications and/or content to make available to a particular subset of the plurality of computing devices.

Returning to Step 3130, the system is configured to provide the approved software applications and/or content to one or more users for use on the particular subset of the plurality of computing devices.

In some embodiments, the system is configured to generate a curated app store may include already-subscribed-to and purchased apps as well as approved apps/content that a teacher/user may select to purchase. In some embodiments, an administrator may also select what information is transmitted to one or more app developers (e.g., usernames, e-mail addresses, etc.) from the interactive display device. In particular embodiments, the system is configured to make in-house content available (e.g., within a particular school district/school). In still other embodiments, the system is configured to make teacher/student created apps available, for example, via the curated app store.

In some embodiments, the system is configured to enable a plurality of users to form a cohort for the sources of apps and/or content (e.g., a cohort of social studies teachers in the Atlanta school district). In some embodiments, relying on a school administrator to select particular apps may enable an app store provider to fulfill various legal obligations related to privacy. By providing consent to use particular applications and enabling sub-users to select from the approved listing of applications, a school administrator may be providing the necessary consent on behalf of the ultimate users of one or more interactive display devices (e.g., having an app store of at least some available apps).

Situational Environmental Analysis Module

In various embodiments, one or more interactive display devices 110 (e.g., or other computing devices) may be utilized for environmental analysis, with a particular application in the real-time positioning of gun fire in an active shooter scenario. In such embodiments, a plurality of interactive display boards in one or more fixed physical locations, may be configured to performing passive analysis of an audio environment to infer information regarding the environment. In such embodiment's, each of the plurality of interactive display devices may include at least one microphone. By substantially continuously monitoring an audio environment, the plurality of interactive display devices may be configured to: (1) identify at least one audio cue; (2) determine a location of the identified audio cue based on sound data received at one or more of the plurality of interactive display devices; and (3) generate one or more alerts related to the identified audio cue. Although the following example will generally be described with regard to identifying and analyzing the sound of gun fire, it should be understood that in other embodiment's, the system may be configured to identify any other suitable audio cue. In such embodiment's, the one or more additional audio cues may include, for example, glass break, a smoke alarm, detecting certain words (e.g., "help", "fire", etc.).

In various embodiments, the system is configured to analyze an identified audio cue using any suitable technique. For example, the system may be configured to utilize one or more audio fast Fourier transform techniques. When utilizing one or more audio fast Fourier transform techniques, the system may be configured to filter an audio spectrum to analyze only those regions of sound which match a frequency and loudness of what the system is set to monitor for (e.g., gunshot, etc.). Fast Fourier transforms may, for example, enable low latency passive monitoring, while maintaining privacy of the interactive display device users. In various embodiments, with fast Fourier transforms, the interactive display devices may be configured to listen all the time to the room, but ignore every human sound, only focusing on the selected audio cues.

In still other embodiments, the system may be configured to use one or more sound triangulation techniques in order to identify a location of a registered audio cue. For example, the system may be configured to use a plurality of audio microphones (e.g., in a plurality of interactive display devices spread throughout a building, for example, in various different classrooms) to compare differences between the same sound source to their known geo-coordinates to determine its geographical position.

In response to identifying a particular audio cue, such as a gunshot, the audio cue may pass through the fast Fourier transform system and trigger each interactive display device that detected the audio cue to compare the sound with other interactive display devices in the area. Each interactive display device that registers the audio cue may use the registered loudness at each device to infer the audio cue's position in space.

Illustrative Examples of Situational Environmental Analysis Process

Figure 33:
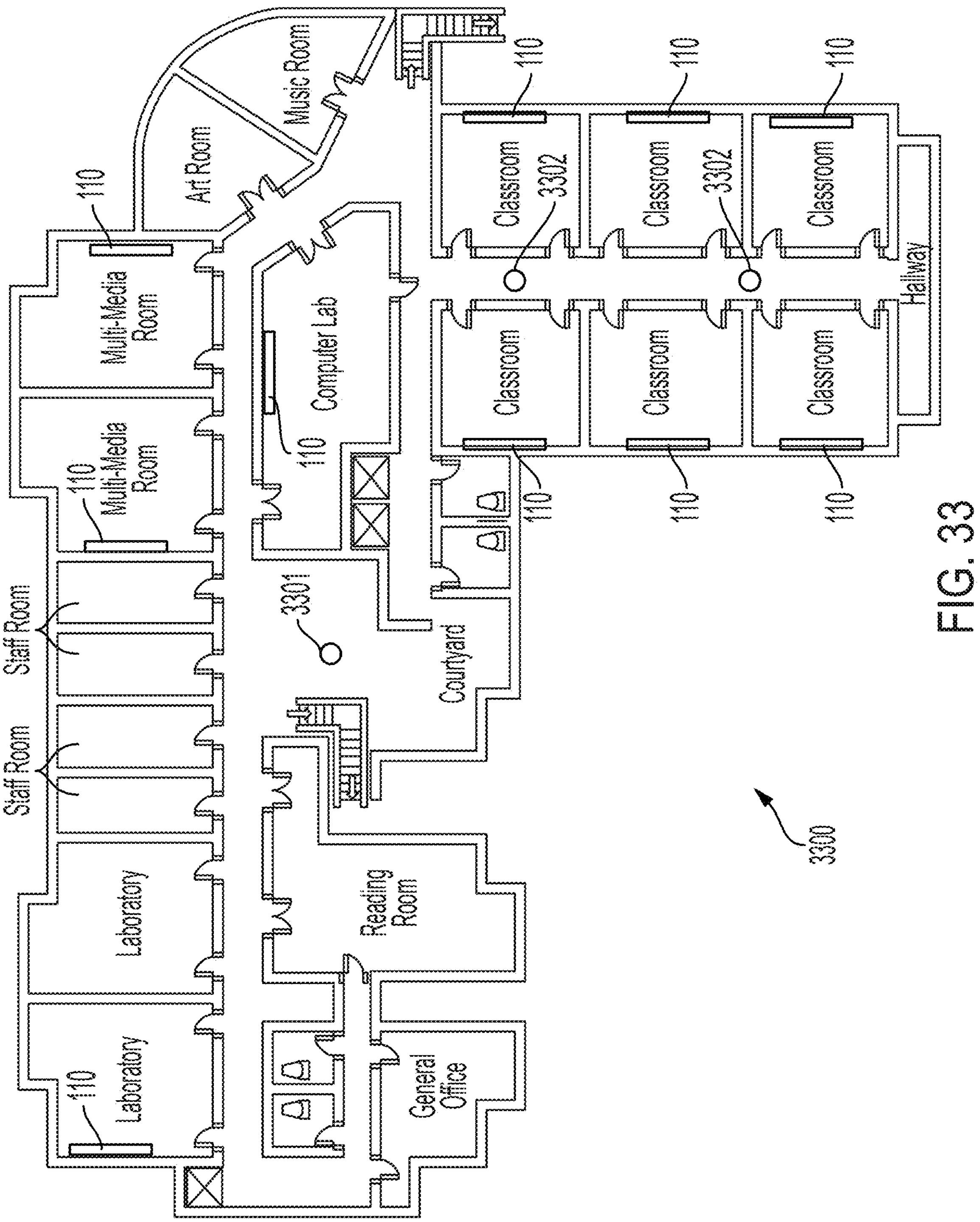
FIG. 33 depicts an overhead plan view of a building (e.g., a school building) with a plurality of interactive display devices during an exemplary incident that one or more of the plurality of interactive display devices may identify using one or more suitable techniques described herein.

FIG. 33 depicts an overhead plan view of a school 3300. As shown in this figure, the school 3300 has a plurality of interactive display devices 110 installed in various rooms throughout the school (e.g., classrooms, media rooms etc.). As shown in FIG. 33, an audio cue may be located in various positions throughout the school 3301, 3302, 3303. The audio cue may initially be identified at a first position 3301, and then later identified at a second position 3302. This may, for example, indicate that the source of the audio cue (e.g., an active shooter) may be moving throughout the school. The system may then transmit substantially up-to-date location information to law enforcement officials or others.

Conclusion

Many modifications and other embodiments of the invention will come to mind to one skilled in the art to which this invention pertains having the benefit of the teachings presented in the foregoing descriptions and the associated drawings. While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, while some steps may be described as occurring in response to (e.g., or at least partially in response to) particular other steps, it should be understood that, in other embodiments, such steps may occur independent of (e.g., or coincident with) one another. In certain circumstances, multitasking and parallel processing may be advantageous. Moreover, the separation of various system components in the embodiments described above should not be understood as requiring such separation in all embodiments, and it should be understood that the described program components and systems may be generally integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for the purposes of limitation.

What is claimed is:

1. An interactive display system comprising:

an input device comprising an interactive touch screen display input;

a display device having at least one display processor and a display screen; and one or more connected computing devices operatively connected to the input device, each of the one or more connected computing devices having a respective connected computing device processor, wherein the at least one display processor is configured for:

displaying, on the display screen, content from at least a particular connected computing device of the one or more computing devices and the display device simultaneously;

receiving, via the input device, a touch input at a first location on the display screen;

determining, based at least in part on the first location, a final destination for the touch input;

in response to determining that the final destination is the display device, processing the touch input; and in response to determining that the final destination is the particular connected computing device, routing the touch input from the display device to the particular connected computing device via the input device for processing by the respective connected computing device processor by causing the input device to provide the first location directly to the particular connected computing device.

2. The interactive display system of claim 1, wherein routing the touch input from the interactive touch screen display device to the particular connected computing device via the interactive touch screen display input for processing by the respective connected computing device processor comprises transmitting an instruction from the at least one display processor to the interactive touch screen display input to cause the interactive touch screen display input to provide the input directly to the respective connected computing device processor.

3. The interactive display system of claim 1, wherein determining the final destination for the touch input comprises determining whether the first location coincides with the content from the particular connected computing device or the interactive touch screen display device.

4. The interactive display system of claim 1, wherein the at least one display processor is further configured for:

receiving, via the input device, a second touch input at a second location on the display screen at a second time;

determining, based at least in part on the second location, a second final destination for the second touch input; and in response to determining that the second final destination is the particular connected computing device, routing the second touch input from the interactive touch screen display device to the particular connected computing device via the interactive touch screen display input for processing by the respective connected computing device processor.

5. The interactive display system of claim 4, wherein:

receiving, via the input device, the touch input at the first location on the display screen comprises receiving the touch input at a first time; and the second time is the first time.

6. The interactive display system of claim 1, wherein determining the final destination for the touch input comprises determining whether the first location coincides with the content from the particular connected computing device or display device.

7. The interactive display system of claim 1, wherein causing the input device to provide the first location directly to the particular connected computing device comprises transmitting an instruction to the input device to transmit the first location directly to the particular connected computing device.

8. The interactive display system of claim 1, wherein:

the touch input is a first touch input;

the first touch input is received at a first time; and the at least one display processor is configured for:

receiving, via the input device, a second touch input at a second location on the display screen at a time that coincides with the first time;

determining, based at least in part on the second location, a second final destination for the second touch input;

in response to determining that the second final destination is the display device, processing the second touch input; and in response to determining that the second final destination is the particular connected computing device, routing the second touch input from the display device to the particular connected computing device via the input device for processing by the respective connected computing device processor by causing the input device to provide the second location directly to the particular connected computing device.

* * * * *